US012348840B2

(12) United States Patent
Sharma et al.

(10) Patent No.: US 12,348,840 B2
(45) Date of Patent: Jul. 1, 2025

(54) RECYCLING METHODS AND SYSTEMS, AND RELATED PLASTIC CONTAINERS

(71) Applicant: Digimarc Corporation, Beaverton, OR (US)

(72) Inventors: Ravi K. Sharma, Portland, OR (US); Tomas Filler, Beaverton, OR (US); Vojtech Holub, Lafayette, CO (US); Osama M. Alattar, Tigard, OR (US); Hugh L. Brunk, Portland, OR (US); John D. Lord, West Linn, OR (US); William Y. Conwell, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 18/635,783

(22) Filed: Apr. 15, 2024

(65) Prior Publication Data

US 2024/0364982 A1   Oct. 31, 2024

Related U.S. Application Data

(63) Continuation of application No. 17/371,964, filed on Jul. 9, 2021, now Pat. No. 11,962,875, which is a
(Continued)

(51) Int. Cl.
*G06K 9/00* (2022.01)
*G06F 21/16* (2013.01)
(Continued)

(52) U.S. Cl.
CPC ............ *H04N 23/00* (2023.01); *G06F 21/16* (2013.01); *G09C 5/00* (2013.01);
(Continued)

(58) Field of Classification Search
None
See application file for complete search history.

(56) References Cited

U.S. PATENT DOCUMENTS

| 4,248,389 | A | 2/1981 | Thompson |
| 4,250,405 | A | 2/1981 | Ashcroft |

(Continued)

FOREIGN PATENT DOCUMENTS

| EP | 0240078 A1 | 10/1987 |
| EP | 0255861 | 2/1988 |

(Continued)

OTHER PUBLICATIONS

Shahbudin et al., "Support vector machines for automated classification of plastic bottles." In 6th International Colloquium on Signal Processing and Its Applications (CSPA), pp. 1-5. 2010. (Year: 2010).*

(Continued)

*Primary Examiner* — Feng Niu
(74) *Attorney, Agent, or Firm* — Klarquist Sparkman, LLP

(57) ABSTRACT

A plastic item, such as a beverage bottle, conveys two distinct digital watermarks, encoded using two distinct signaling protocols. A first, printed label watermark conveys a retailing payload, including a Global Trade Item Number (GTIN) used by a point-of-sale scanner in a retail store to identify and price the item when presented for checkout. A second, plastic texture watermark conveys a recycling payload, including data identifying the composition of the plastic. The use of two different signaling protocols assures that a point-of-sale scanner will not spend its limited time and computational resources working to decode the recycling watermark, which lacks the data needed for retail checkout. In some embodiments, a recycling apparatus makes advantageous use of both types of watermarks to
(Continued)

identify the plastic composition of the item (e.g., relating GTIN to plastic type using an associated database), thereby increasing the fraction of items that are correctly identified for sorting and recycling. A great number of other features and arrangements are also detailed.

18 Claims, 18 Drawing Sheets

Related U.S. Application Data continuation of application No. 16/435,292, filed on Jun. 7, 2019, now abandoned.

(60) Provisional application No. 62/854,754, filed on May 30, 2019, provisional application No. 62/845,230, filed on May 8, 2019, provisional application No. 62/836,326, filed on Apr. 19, 2019, provisional application No. 62/830,318, filed on Apr. 5, 2019, provisional application No. 62/818,051, filed on Mar. 13, 2019, provisional application No. 62/814,567, filed on Mar. 6, 2019, provisional application No. 62/812,711, filed on Mar. 1, 2019.

(51) Int. Cl.
*G09C 5/00* (2006.01)
*H04N 21/2389* (2011.01)
*H04N 21/44* (2011.01)
*H04N 21/8358* (2011.01)
*H04N 23/00* (2023.01)

(52) U.S. Cl.
CPC . *H04N 21/23892* (2013.01); *H04N 21/44008* (2013.01); *H04N 21/8358* (2013.01); *H04L 2209/34* (2013.01); *H04L 2209/608* (2013.01)

(56) References Cited

U.S. PATENT DOCUMENTS

| | | | |
|---|---|---|---|
| 4,263,504 A | 4/1981 | Thomas | |
| 4,558,212 A | 12/1985 | Hampson | |
| 4,558,775 A | 12/1985 | Labarge | |
| 4,600,105 A | 7/1986 | Van Zyl | |
| 4,601,395 A | 7/1986 | Juvinall | |
| 4,644,151 A | 2/1987 | Juvinall | |
| 4,680,457 A | 7/1987 | Robertson | |
| 4,691,231 A | 9/1987 | Fitzmorris | |
| 4,745,269 A | 5/1988 | Van Gils | |
| 4,771,165 A | 9/1988 | van Hulzen | |
| 4,784,251 A | 11/1988 | Dewoolfson | |
| 4,967,906 A | 11/1990 | Morello | |
| 5,028,769 A | 7/1991 | Claypool | |
| 5,100,005 A | 3/1992 | Noble | |
| 5,134,291 A | 7/1992 | Ruhl, Jr. | |
| 5,150,307 A | 9/1992 | McCourt | |
| 5,209,355 A | 5/1993 | Mindermann | |
| 5,301,238 A | 4/1994 | Apter | |
| 5,314,072 A | 5/1994 | Frankel | |
| 5,361,913 A | 11/1994 | Melchionna | |
| 5,461,972 A | 10/1995 | Pekka | |
| 5,485,964 A | 1/1996 | Booth | |
| 5,499,718 A | 3/1996 | Bhatia | |
| 5,612,525 A | 3/1997 | Apter | |
| 5,615,778 A | 4/1997 | Kaiser | |
| 5,628,409 A | 5/1997 | Thomas | |
| 5,718,457 A | 2/1998 | Weinstock | |
| 5,732,147 A | 3/1998 | Tao | |
| 5,862,260 A * | 1/1999 | Rhoads | H04N 1/32144 707/E17.112 |
| 5,894,939 A | 4/1999 | Frankel | |
| 5,926,556 A | 7/1999 | Douglas | |
| 5,960,402 A | 9/1999 | Embutsu | |
| 5,965,858 A | 10/1999 | Suzuki | |
| 5,988,054 A | 11/1999 | Wieglus | |
| 6,012,588 A | 1/2000 | Steidel | |
| 6,060,677 A | 5/2000 | Ulrichsen | |
| 6,233,347 B1 | 5/2001 | Chen | |
| 6,332,031 B1 | 12/2001 | Rhoads | |
| 6,390,368 B1 | 5/2002 | Edwards | |
| 6,418,232 B1 | 7/2002 | Nakano | |
| 6,441,380 B1 | 8/2002 | Lawandy | |
| 6,442,284 B1 | 8/2002 | Gustafson | |
| 6,516,079 B1 | 2/2003 | Rhoads | |
| 6,533,181 B1 | 3/2003 | Roxby | |
| 6,539,475 B1 | 3/2003 | Cox | |
| 6,557,103 B1 | 4/2003 | Boncelet | |
| 6,590,996 B1 | 7/2003 | Reed | |
| 6,611,599 B2 | 8/2003 | Natarajan | |
| 6,614,914 B1 | 9/2003 | Rhoads | |
| 6,791,592 B2 | 9/2004 | Assa | |
| 6,882,738 B2 | 4/2005 | Davis | |
| 6,901,163 B1 | 5/2005 | Pearce | |
| 6,947,571 B1 | 9/2005 | Rhoads | |
| 7,013,021 B2 | 3/2006 | Sharma | |
| 7,044,395 B1 | 5/2006 | Davis | |
| 7,113,614 B2 | 9/2006 | Rhoads | |
| 7,159,780 B2 * | 1/2007 | Christian | G06K 7/14 235/494 |
| 7,253,422 B2 | 8/2007 | Smith | |
| 7,277,468 B2 | 10/2007 | Tian | |
| 7,317,962 B2 | 1/2008 | Whittier | |
| 7,412,072 B2 | 8/2008 | Sharma | |
| 7,480,393 B2 | 1/2009 | Gustafson | |
| 7,531,703 B2 | 5/2009 | Ramesh | |
| 7,577,273 B2 | 8/2009 | Rhoads | |
| 7,623,673 B2 | 11/2009 | Mercier | |
| 7,720,249 B2 | 5/2010 | Rhoads | |
| 7,801,325 B1 | 9/2010 | Hetzel | |
| 7,936,899 B2 | 5/2011 | Kim | |
| 8,059,858 B2 | 11/2011 | Brundage | |
| 8,087,583 B2 | 1/2012 | Hawes | |
| 8,091,025 B2 | 1/2012 | Ramos | |
| 8,117,069 B2 | 2/2012 | Law | |
| 8,140,848 B2 | 3/2012 | Brundage | |
| 8,208,683 B2 | 6/2012 | Yamamoto | |
| 8,385,590 B1 | 2/2013 | Moorer | |
| 8,418,914 B2 | 4/2013 | Cormack | |
| 8,574,384 B1 | 11/2013 | Lee | |
| 8,727,220 B2 | 5/2014 | Key | |
| 8,976,190 B1 | 3/2015 | Westerhoff | |
| 9,010,640 B2 | 4/2015 | Yoshida | |
| 9,033,237 B1 | 5/2015 | Chi | |
| 9,090,399 B2 | 7/2015 | Sundholm | |
| 9,486,814 B2 | 11/2016 | Prahlad | |
| 9,563,831 B2 | 2/2017 | Sharma | |
| 9,749,607 B2 | 8/2017 | Boles | |
| 10,026,030 B2 | 7/2018 | Chen | |
| 10,121,246 B2 | 11/2018 | Kitamura | |
| 10,201,939 B1 | 2/2019 | Pare | |
| 10,225,518 B2 | 3/2019 | Hodge | |
| 10,298,893 B2 | 5/2019 | Moule | |
| 10,438,035 B2 | 10/2019 | Francesco | |
| 10,589,556 B2 | 3/2020 | Roger | |
| 10,657,780 B1 | 5/2020 | Kline | |
| 10,664,722 B1 | 5/2020 | Sharma | |
| 10,883,879 B2 | 1/2021 | Ackley | |
| 10,885,336 B1 | 1/2021 | Davis | |
| 10,958,807 B1 | 3/2021 | Holub | |
| 11,048,892 B2 | 6/2021 | Zur | |
| 2001/0037455 A1 | 11/2001 | Lawandy | |
| 2002/0012445 A1 | 1/2002 | Perry | |
| 2002/0016916 A1 | 2/2002 | Natarajan | |
| 2002/0033844 A1 | 3/2002 | Levy | |
| 2002/0050332 A1 | 5/2002 | Cantwell | |
| 2002/0053975 A1 | 5/2002 | Fitzgibbon | |
| 2002/0057823 A1 | 5/2002 | Sharma | |
| 2002/0099943 A1 | 7/2002 | Rodriguez | |
| 2002/0126869 A1 | 9/2002 | Wang | |
| 2002/0136428 A1 | 9/2002 | Sugahara | |
| 2002/0145759 A1 | 10/2002 | Miller | |

(56) References Cited

U.S. PATENT DOCUMENTS

| | | |
|---|---|---|
| 2002/0157005 A1 | 10/2002 | Brunk |
| 2002/0161708 A1 | 10/2002 | Offer |
| 2002/0164053 A1* | 11/2002 | Seder ............... G06Q 10/10 382/100 |
| 2002/0170966 A1 | 11/2002 | Hannigan |
| 2002/0176116 A1 | 11/2002 | Rhoads |
| 2002/0188841 A1 | 12/2002 | Jones |
| 2002/0191812 A1* | 12/2002 | Kim ............... G06T 1/0028 382/100 |
| 2003/0015461 A1 | 1/2003 | Miyamoto |
| 2003/0021443 A1* | 1/2003 | Haitsma ............ G06T 1/0092 382/232 |
| 2003/0026453 A1 | 2/2003 | Sharma |
| 2003/0033530 A1 | 2/2003 | Sharma |
| 2003/0057280 A1 | 3/2003 | Mandile |
| 2003/0128861 A1 | 7/2003 | Rhoads |
| 2003/0141225 A1 | 7/2003 | Liddle |
| 2003/0150922 A1 | 8/2003 | Hawes |
| 2003/0161496 A1 | 8/2003 | Hayashi |
| 2003/0185417 A1 | 10/2003 | Alattar |
| 2003/0187798 A1 | 10/2003 | McKinley |
| 2003/0223584 A1 | 12/2003 | Bradley |
| 2003/0223616 A1* | 12/2003 | D'Amato ............ B42D 25/328 382/100 |
| 2004/0004126 A1* | 1/2004 | Christian ............ G06K 7/1452 235/462.25 |
| 2004/0044436 A1 | 3/2004 | Arleth |
| 2004/0049401 A1 | 3/2004 | Carr |
| 2004/0064586 A1 | 4/2004 | Weigand |
| 2004/0064702 A1 | 4/2004 | Yu |
| 2004/0086151 A1 | 5/2004 | Brundage |
| 2004/0120547 A1 | 6/2004 | Mampe |
| 2004/0133484 A1 | 7/2004 | Kreiner |
| 2004/0153649 A1 | 8/2004 | Rhoads |
| 2004/0156529 A1 | 8/2004 | Davis |
| 2004/0181671 A1 | 9/2004 | Brundage |
| 2004/0195308 A1 | 10/2004 | Wagner |
| 2004/0258274 A1 | 12/2004 | Brundage |
| 2005/0036651 A1 | 2/2005 | Wen |
| 2005/0040240 A1 | 2/2005 | Jones |
| 2005/0067487 A1 | 3/2005 | Brundage |
| 2005/0078851 A1 | 4/2005 | Jones |
| 2005/0138648 A1 | 6/2005 | Ahmed |
| 2005/0169496 A1 | 8/2005 | Perry |
| 2005/0226489 A1 | 10/2005 | Beach |
| 2005/0262351 A1 | 11/2005 | Levy |
| 2005/0271246 A1 | 12/2005 | Sharma |
| 2006/0013395 A1 | 1/2006 | Brundage |
| 2006/0070928 A1 | 4/2006 | Lovhaugen |
| 2006/0156029 A1 | 7/2006 | Algazi |
| 2006/0163397 A1 | 7/2006 | Baker |
| 2006/0163492 A1 | 7/2006 | Mennicken |
| 2006/0175232 A1 | 8/2006 | Voloshyn |
| 2006/0208090 A1 | 9/2006 | Dahl |
| 2006/0222203 A1 | 10/2006 | Mercier |
| 2006/0235769 A1 | 10/2006 | Cheng |
| 2007/0029232 A1 | 2/2007 | Cowling |
| 2007/0083068 A1 | 4/2007 | Ramesh |
| 2007/0108287 A1 | 5/2007 | Davis |
| 2007/0158245 A1 | 7/2007 | Kenny |
| 2007/0177760 A1 | 8/2007 | Rhoads |
| 2007/0185788 A1 | 8/2007 | Dillon |
| 2007/0186417 A1 | 8/2007 | Smyth |
| 2007/0192176 A1* | 8/2007 | Onischuk ............ G07C 13/00 705/12 |
| 2007/0204078 A1 | 8/2007 | Boccon-Gibod |
| 2007/0208455 A1 | 9/2007 | Bollegraaf |
| 2007/0236720 A1 | 10/2007 | Tamada |
| 2007/0262878 A1 | 11/2007 | Maruca |
| 2007/0278139 A1 | 12/2007 | Cowling |
| 2007/0295814 A1 | 12/2007 | Tanaka |
| 2008/0023546 A1 | 1/2008 | Myodo |
| 2008/0025564 A1 | 1/2008 | Kim |
| 2008/0049971 A1 | 2/2008 | Ramos |
| 2008/0104179 A1 | 5/2008 | Agrawal |
| 2008/0154683 A1 | 6/2008 | Kawada |
| 2008/0192987 A1 | 8/2008 | Helgason |
| 2008/0211637 A1 | 9/2008 | Smith |
| 2008/0226125 A1 | 9/2008 | Van Leest |
| 2008/0257793 A1 | 10/2008 | Valerio |
| 2009/0074242 A1 | 3/2009 | Yamamoto |
| 2009/0095047 A1 | 4/2009 | Patel |
| 2009/0152173 A1 | 6/2009 | Miller |
| 2009/0218401 A1 | 9/2009 | Moran |
| 2009/0306816 A1 | 12/2009 | Champel |
| 2010/0029380 A1 | 2/2010 | Rhoads |
| 2010/0065643 A1 | 3/2010 | Leyvraz |
| 2010/0072114 A1 | 3/2010 | Briane |
| 2010/0102032 A1 | 4/2010 | Bathelet |
| 2010/0128321 A1 | 5/2010 | Wang |
| 2010/0135525 A1 | 6/2010 | Tian |
| 2010/0213250 A1 | 8/2010 | Mallett |
| 2010/0222917 A1 | 9/2010 | Bohlig |
| 2010/0282646 A1 | 11/2010 | Looy |
| 2011/0005977 A1 | 1/2011 | Maggio |
| 2011/0034176 A1 | 2/2011 | Lord |
| 2011/0108627 A1 | 5/2011 | Bathelet |
| 2011/0150266 A1 | 6/2011 | Hohndel |
| 2011/0161086 A1 | 6/2011 | Rodriguez |
| 2011/0164707 A1 | 7/2011 | Luo |
| 2011/0172955 A1 | 7/2011 | Herrmann |
| 2011/0186623 A1 | 8/2011 | Truesdale |
| 2011/0214044 A1 | 9/2011 | Davis |
| 2011/0238598 A1 | 9/2011 | Borowski |
| 2011/0240739 A1 | 10/2011 | Delaigle |
| 2012/0038950 A1 | 2/2012 | Tanaka |
| 2012/0046071 A1 | 2/2012 | Brandis |
| 2012/0047080 A1 | 2/2012 | Rodatos |
| 2012/0072731 A1 | 3/2012 | Winograd |
| 2012/0078989 A1 | 3/2012 | Sharma |
| 2012/0148087 A1 | 6/2012 | Xu |
| 2012/0158550 A1 | 6/2012 | Rhoads |
| 2012/0163653 A1 | 6/2012 | Anan |
| 2012/0168354 A1 | 7/2012 | Sundholm |
| 2012/0209783 A1 | 8/2012 | Smith, Jr. |
| 2012/0245257 A1 | 9/2012 | Fascio |
| 2013/0024252 A1 | 1/2013 | Sicklick |
| 2013/0079918 A1 | 3/2013 | Spencer |
| 2013/0126399 A1 | 5/2013 | Wolff |
| 2013/0148843 A1 | 6/2013 | Doerr |
| 2013/0151856 A1 | 6/2013 | Petrovic |
| 2013/0168300 A1 | 7/2013 | Malone |
| 2013/0180892 A1 | 7/2013 | Marrapodi |
| 2013/0223673 A1 | 8/2013 | Davis |
| 2013/0229510 A1 | 9/2013 | Killmann |
| 2013/0282597 A1 | 10/2013 | Martin |
| 2013/0292303 A1 | 11/2013 | Prahlad |
| 2013/0334086 A1 | 12/2013 | Meadows |
| 2013/0341228 A1 | 12/2013 | Click et al. |
| 2014/0015960 A1 | 1/2014 | Niedermeier |
| 2014/0015964 A1 | 1/2014 | Chew |
| 2014/0050397 A1 | 2/2014 | Baadholm |
| 2014/0103111 A1 | 4/2014 | Xie |
| 2014/0116911 A1 | 5/2014 | Bryant |
| 2014/0210967 A1 | 7/2014 | Kirkerud |
| 2014/0263674 A1 | 9/2014 | Cerveny |
| 2014/0293091 A1 | 10/2014 | Rhoads |
| 2014/0305851 A1 | 10/2014 | Hubbell |
| 2014/0350718 A1 | 11/2014 | Felse |
| 2014/0364663 A1 | 12/2014 | Ramesh |
| 2014/0365381 A1 | 12/2014 | Borowski |
| 2014/0378810 A1 | 12/2014 | Davis |
| 2015/0012226 A1 | 1/2015 | Skaff |
| 2015/0016664 A1 | 1/2015 | Rodriguez |
| 2015/0016712 A1 | 1/2015 | Rhoads |
| 2015/0028110 A1 | 1/2015 | Bryant |
| 2015/0030201 A1 | 1/2015 | Holub |
| 2015/0144537 A1 | 5/2015 | Skaff |
| 2015/0254828 A1 | 9/2015 | Beach |
| 2016/0001297 A1 | 1/2016 | Qiu |
| 2016/0070999 A1 | 3/2016 | Pranov |
| 2016/0077020 A1 | 3/2016 | Leconte |
| 2016/0212103 A1 | 7/2016 | Rhoads |

(56) References Cited

U.S. PATENT DOCUMENTS

| | | |
|---|---|---|
| 2016/0228920 A1 | 8/2016 | Doublet |
| 2016/0253856 A1 | 9/2016 | Foucha |
| 2016/0260050 A1 | 9/2016 | Silver |
| 2016/0275326 A1 | 9/2016 | Falkenstern |
| 2016/0356726 A1 | 12/2016 | Bathelet |
| 2016/0364634 A1 | 12/2016 | Davis |
| 2017/0004597 A1 | 1/2017 | Boles |
| 2017/0024840 A1 | 1/2017 | Holub |
| 2017/0061350 A1 | 3/2017 | Smith |
| 2017/0124442 A1 | 5/2017 | Nishizaki |
| 2017/0174439 A1 | 6/2017 | Ripley |
| 2017/0225199 A1 | 8/2017 | Koistinen |
| 2017/0232479 A1 | 8/2017 | Pietzka |
| 2017/0357737 A1 | 12/2017 | Li |
| 2018/0001352 A1 | 1/2018 | Huber |
| 2018/0005343 A1 | 1/2018 | Rhoads |
| 2018/0056336 A1 | 3/2018 | Castelli |
| 2018/0075417 A1 | 3/2018 | Gordon |
| 2018/0100810 A1 | 4/2018 | Sahu |
| 2018/0167630 A1 | 6/2018 | Zhao |
| 2018/0285611 A1 | 10/2018 | D'Ercoli |
| 2018/0333975 A1 | 11/2018 | Bollström |
| 2018/0338068 A1 | 11/2018 | Weaver |
| 2018/0339323 A1 | 11/2018 | Bullock |
| 2018/0345323 A1 | 12/2018 | Kerver |
| 2018/0349864 A1 | 12/2018 | Tsutsumi |
| 2019/0017863 A1 | 1/2019 | Saltzman |
| 2019/0030571 A1 | 1/2019 | Horowitz |
| 2019/0056541 A1 | 2/2019 | Roberts |
| 2019/0084722 A1 | 3/2019 | Browning, Jr. |
| 2019/0130560 A1 | 5/2019 | Horowitz |
| 2019/0188431 A1 | 6/2019 | Zur |
| 2020/0171547 A1 | 6/2020 | Torriere |
| 2020/0286045 A1 | 9/2020 | Ripley |
| 2021/0001377 A1 | 1/2021 | Sutton |
| 2022/0004832 A1 | 1/2022 | Doheny, II |
| 2022/0339673 A1 | 10/2022 | Mosslein |
| 2023/0153657 A1* | 5/2023 | Sagi-Dolev ........... G06F 18/217 706/14 |

FOREIGN PATENT DOCUMENTS

| | | | |
|---|---|---|---|
| EP | 4148684 | 3/2023 | |
| GB | 2229809 | 10/1990 | |
| GB | 2348414 A * | 10/2000 | ............. B65D 23/00 |
| JP | 2000002651 A * | 1/2000 | ............. G01N 21/21 |
| NL | 1006668 C2 | 1/1999 | |
| WO | 2000044508 | 8/2000 | |
| WO | WO-02081341 A1 * | 10/2002 | ............. B65F 1/1484 |
| WO | 2004006438 | 1/2004 | |
| WO | WO-2005091547 A2 * | 9/2005 | ......... G06Q 20/3823 |
| WO | 2016204619 A2 | 12/2016 | |
| WO | 2018182437 | 10/2018 | |
| WO | 19043231 | 3/2019 | |
| WO | 2020186234 | 9/2020 | |
| WO | 2021058063 | 4/2021 | |
| WO | 2021078842 A1 | 4/2021 | |
| WO | 2021089602 | 5/2021 | |

OTHER PUBLICATIONS

GB-2348414-A (machine translation) (Year: 2000).*
JP-2000002651-A (machine translation) (Year: 2000).*
WO-2005091547-A2 (machine translation) (Year: 2005).*
Jul. 14, 2021 Second Amendment After Final, Jul. 8, 2021 Amendment after Final, Jul. 8, 2021 Final Office Action, May 4, 2021 Amendment, Feb. 4, 2021 non-final Office Action, all from grandparent U.S. Appl. No. 16/435,292 (now abandoned).
Anonymous, "Learning About Manufacturing in Different Places—the Importance of Draft Angles and Rounded Edges in Injection Molded Parts", (Dec. 25, 2018), URL: http://aosrbs.com/2018/12/25/the-importance-of-draft-angles-and-rounded-edges-in-injection-molded-parts/, (Jun. 18, 2020), XP055706538.
DE102006019248 with machine translation, 2007.
DE102017118367 (with machine translation), Feb. 14, 2019.
DE19734851 (with machine translation), 1998.
DE3934969 with machine translation, 1991.
DE4330815 (with machine translation), 1995.
Debelder, Gian, HolyGrail—Global project on Markers and Digital Watermarks to promote sustainable management of plastic (packaging) waste, Petcore Europe Conference, Feb. 2019, 27 pp.
EP0388785 (with machine translation), 1990.
EP0557738A1 (with machine translation), 1993.
European Patent Office extended search report in U.S. Appl. No. 22/194,461 (published as EP4148684A1), Jan. 30, 2023, 10 pages.
Holy Grail: Tagging Packaging forAccurate Sorting and High-Quality Recycling, 5 pp., May 29, 2019.
Hyper Spectral Imaging (HSI) for Separation of PET bottles from PET Trays, Steinhert Press Release, Mar. 23, 2016,.
International Search Report and Written Opinion for App. No. PCT/US2020/022801, dated Aug. 28, 2020, 18 pages.
ISO/DTR 17350, Direct marking on plastic returnable transport items, Jun. 8, 2012.
JP2000085783A 2000_(with machine translation), cited but not applied in applicant's JP application 2021-554677).
JP2003094024A, 2003 (with machine translation), cited but not applied in applicant's JP application 2021-554677).
JP2003137348A 2003 (with machine translation), cited but not applied in applicant's JP application 2021-554677).
JP2006182352A 2006 (with machine translation), cited but not applied in applicant's JP application 2021-554677).
JP2010231797A, 2010 (with machine translation), cited but not applied in applicant's JP application 2021-554677).
JP2014069474A 2014 (with machine translation), cited but not applied in applicant's JP application 2021-554677).
JP2015127892A 2015 (with machine translation), cited but not applied in applicant's JP application 2021-554677).
Lukac et al., Color Imaging Processing, Chapter 17: Spectral Imaging and Applications, CRC Press, 2007.
Machine Readable entry from Open Data Handbook, Web Archive version dated Aug. 16, 2018.
Machine Readable entry from PC Magazine Encyclopedia, 2023.
Machine-Readable entry from Merriam Webster online dictionary, 2023.
McKinlay et al., Reflex Project, A Summary Report on the Results and Findings from the Reflex Project, Axion Consulting, 22 pp., Nov. 2016.
NL1006668 (with machine translation), 1999.
NL1018825 (with machine translation), 2003.
Paben, Stakeholders Advance Project to Coordinate Marker Technologies, Plastics Recycling Update, Resource Recycling, Inc., 2 pp., Jun. 15, 2018.
Packnews.tv: "Digital watermarks in pastics for waste sorting", Youtube, Dec. 13, 2018, p. 1, XP054982005, retrieved from the internet: URL:https//www.youtube.com/watch?v=5di90y1QKoc (retrieved on Jul. 1, 2021).
Prosecution excerpts from applicant's Japanese application 2021-554677 including pending claims, translation of Notice of Reasons for Rejection dated May 30, 2023, and cited reference JP2002293332 (dated 2002) with machine translation.
Provisional Opinion Accompanying the Partial Search Result, and Invitation to Pay Additional Search Fees (due to lack of unity of invention), PCT/US2021/024483, Jul. 19, 2021.
Saar et al., Toward trash that thinks—product tags for environmental management. Journal of Industrial Ecology. Apr. 2002;6(2), pp. 133-146.
Selected excerpts from related European patent application EP2020186234 (now EP3903228B) based on PCT/US20/22801 (WO2020186234).
Smith, Improving Traceability in Food Processing and Distribution, CRC Press, 2006 (pp. 216, 217 only).
Third Party Observations, including Additional Comments Submitted with Observation, submitted anonymously in applicant's PCT application PCT/US2020/022801 (WO2020186234) on Jul. 13, 2021.

(56) References Cited

OTHER PUBLICATIONS

Thotapalli et al., Feature extraction of moving object over a belt conveyor using background subtraction technique, Proc. 10th Int'l Conf. on Precision, Meso, Micro and Nano Engineering, 2017.
Universal Product Code, Wikipedia article, 2023, 8 pages.
Wikipedia, "Recycling codes", Feb. 15, 2019 (Year: 2019).

* cited by examiner

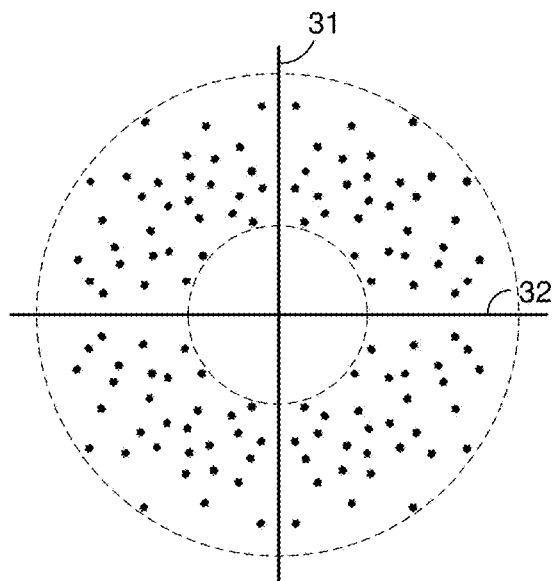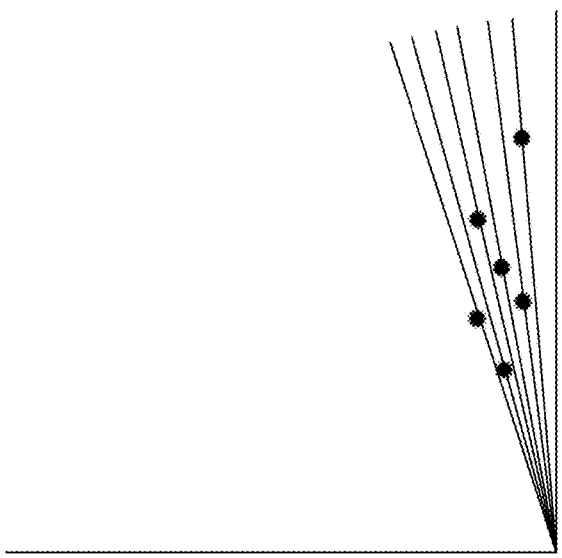
FIG. 4                FIG. 4A
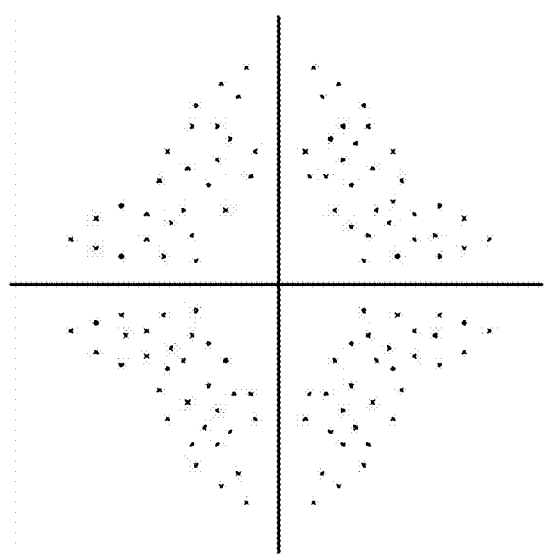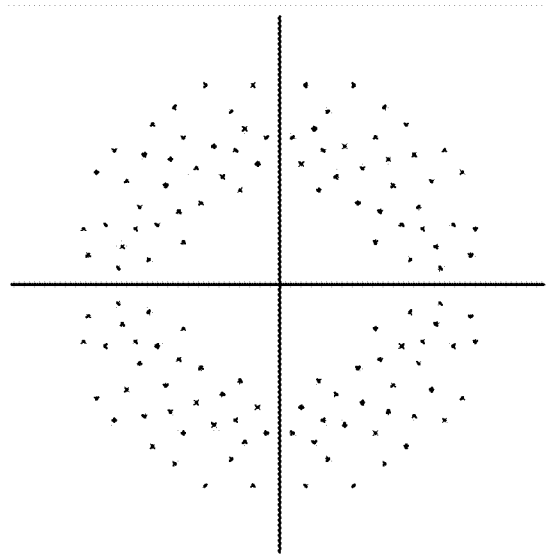
FIG. 5A               FIG. 5B

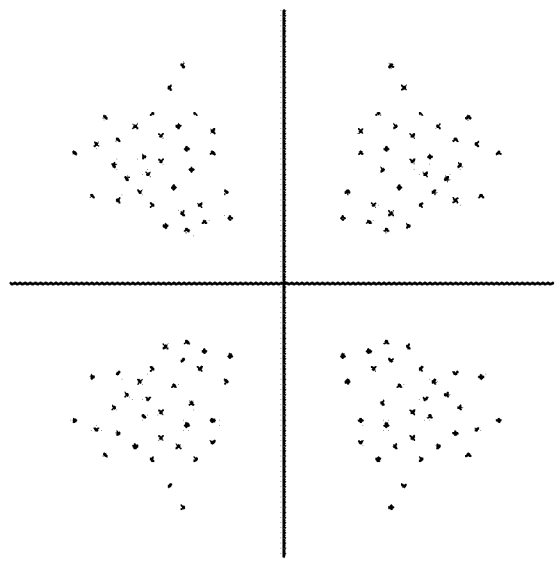
FIG. 5C
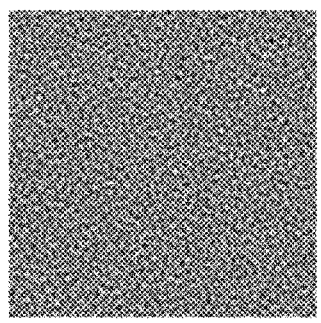 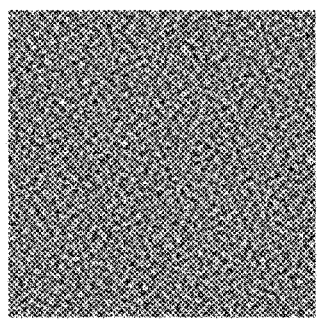 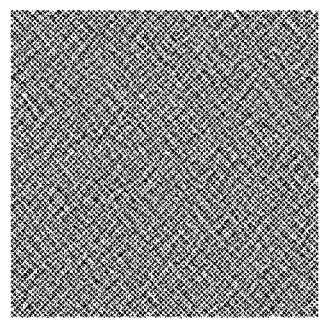
FIG. 6B  FIG. 6A  FIG. 6C

RECYCLING METHODS AND SYSTEMS, AND RELATED PLASTIC CONTAINERS

RELATED APPLICATION DATA

This application is a continuation of U.S. patent application Ser. No. 17/371,964, filed Jul. 9, 2021 (now U.S. Pat. No. 11,962,875), which is a continuation of U.S. patent application Ser. No. 16/435,292, filed Jun. 7, 2019 (published as US20190306385, now abandoned), which claims priority to provisional applications 62/854,754, filed May 30, 2019, 62/845,230, filed May 8, 2019, 62/836,326, filed Apr. 19, 2019, 62/830,318, filed Apr. 5, 2019, 62/818,051, filed Mar. 13, 2019, 62/814,567, filed Mar. 6, 2019, and 62/812,711, filed Mar. 1, 2019.

The disclosures of the above patent documents are incorporated herein by reference.

BACKGROUND

There is a growing need to increase the percentage of plastic items that are reused or recycled.

Applicant's document US20150016712 teaches that a 3D object can be identified using watermark or image fingerprint data, and this identification data can link to recycling information for the object. For example, the identification data can link to a recycling code indicating whether the object is formed of polyethylene terephthalate, high-density polyethylene, polyvinyl chloride, etc.

Applicant's document US20150302543 similarly teaches that the payload of a watermark formed on a plastic object can convey, or can link to, recycling codes for the object. Moreover, the '543 document teaches that a camera-equipped waste sorting apparatus can sort incoming material streams based on decoded watermark data. Document US20180345323, by FiliGrade B. V., also discloses sensing recycling information from watermarked plastic bottles, and separating a waste stream based on the decoded information.

Applicant's present work improves on the foregoing technology, and provides many additional features and advantages.

BRIEF DESCRIPTION OF THE DRAWINGS

FIG. 4 shows peaks defining a reference signal for a printed digital watermark, in the spatial frequency (Fourier magnitude) domain.

FIG. 4A shows an enlargement from FIG. 4, showing radial lines passing through the different peaks.

FIGS. 5A-5C show various reference signals that can be used with a plastic texture digital watermark, tailored to avoid interference with the printed watermark reference signal of FIG. 4.

FIGS. 6A-6C show spatial domain (pixel domain) counterparts to the reference signals of FIGS. 5A-5C, respectively.

INTRODUCTION

Figure 1A:
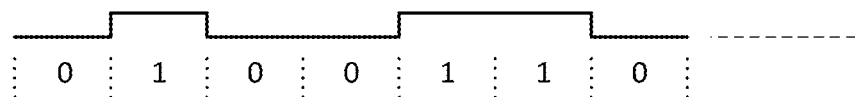
FIGS. 1A-1Q illustrate a few different forms into which a plastic surface can be shaped to convey digital watermark data.

There is a growing need for high-reliability identification of plastic items, e.g., for sorting waste streams.

Digital watermarks are advantageous for this purpose because they can be applied to various types and shapes of materials. Further, watermarks can be spread over a container and its labels in ways that enhance readability even when the object is damaged, soiled or partially occluded.

Digital watermarks provide 2D optical code signals that enable machine vision in waste sorting systems, to ascertain the types of materials in each object and sort the waste stream accordingly. Encoded signals imparted into containers via 3D printed molds, laser textured molds, and etched molds, as discussed below, can be used to sort containers in various recycling environments.

In accordance with one aspect of the present technology, plastic items are encoded with two different watermarks. One watermark is printed—typically by ink—on a label applied to the item (or is printed on the item itself), and one is formed by 3D texturing of the plastic surface.

The printed watermark commonly conveys a retail payload, which is designed primarily for use by a point-of-sale terminal scanner, e.g., containing or pointing to a product name, price, weight, expiration date, package date, etc., so as to identify and price an item at a retail checkout. The texture watermark commonly includes a payload useful for recycling, e.g., containing or pointing to data relating to the plastic. Each watermark typically lacks some or all of the information conveyed by the other watermark.

Importantly, in most embodiments the two watermarks (retail and recycling) employ different signaling protocols. Applicant has found that a typical point-of-sale retail scanner has only a very short interval of time within which to read the retail watermark before the next frame of imagery arrives for analysis. If retail and recycling watermarks are depicted in the same image frame, they must be quickly distinguishable—else the scanner may not succeed in decoding the retail watermark before the next image frame arrives. Part of the present specification teaches how the two watermarks can be made readily distinguishable, so the retail scanner doesn't waste precious milliseconds trying to decode a recycling watermark, thereby helping ensure reliable retail checkout operations.

The primary method by which retail and recycling watermarks are made readily distinguishable is by use of different signaling protocols (including, e.g., different reference signals, different encoding protocols, and/or different output formats). By such differences, a point-of-sale scanner can reliably discern a retail watermark, while a recycling system can reliably discern a recycling watermark, without risk of the point-of-sale scanner accidentally expending effort trying to decode a payload from the recycling watermark—leading to confusion.

Despite the difference in watermark signaling protocols, the recycling system is desirably also configured with a watermark processing module adapted to read the retail watermark (as well as the recycling watermark), and to discern information from the retail watermark usable for plastic recycling purposes (commonly by reference to a database that associates retail watermark payload data to plastic information). Thus regardless of which watermark is read from an item by the recycling system, the system obtains information to control proper item sorting by plastic type.

As noted, the two watermarks' signaling protocols can differ in multiple manners, e.g., including the reference signals, and/or the encoding algorithms used. The reference signal of each watermark (sometimes termed a calibration signal, a synchronization signal, a grid signal, or a registration signal) serves as a synchronization component that enables the geometric pose of the watermark, as depicted within captured imagery, to be discerned, so that the payload can be extracted correctly. An exemplary reference signal is a constellation of plural peaks in the spatial frequency domain. A first of the two watermarks commonly includes a first reference signal, and the other watermark commonly lacks this first reference signal. (The latter watermark may include a different reference signal, e.g., comprised of different frequencies of peaks, different phases of peaks, and/or a different number of peaks.) The encoding algorithms can differ in the process by which the data is encoded, and/or the format by which the encoded data is expressed. For example, the printed watermark encoding algorithm may employ a signaling protocol in which the resulting watermark format is a square block that measures 0.85 inches on a side, with a waxel resolution of 150 per inch, and conveying data structured as a 128×128 array of element locations. In contrast, the signaling protocol employed by the texture watermark encoding algorithm may yield square blocks of a different size (typically less than 0.85 inches on a side), with a waxel resolution different than 150 per inch, and/or conveying data structured as other than a 128×128 array. The two different signaling protocols employed in the two watermarks may have different payload capacities, e.g., one having a variable message portion that can convey 48 bits, and one having a variable message portion that can convey just a half or a third of this payload capacity.

The two encoding algorithms can additionally or alternatively differ by error correction coding method used (if any), the redundancy rate employed, the number of bits in the signature string output by the error correction coder, the CRC method used (if any), the scrambling key used to scramble the signature string output from the error correction coder to yield a scrambled signature string, the spreading key used to produce a multitude of randomized "chips" from each bit of the scrambled signature string, the scatter table data that defines spatial placement of each of these "chips" in the output watermark pattern, etc. The decoding algorithms can differ correspondingly.

The inability of one watermark reader (e.g., a point-of-sale retail watermark reader) to read a watermark of the other type (e.g., a recycling watermark) may be due to any of the just-noted differences between the watermarks, e.g., concerning their geometric reference signals, output formats, signaling protocols, encoding/decoding algorithms, etc.

Each watermark payload typically includes fixed and variable message portions. The fixed portion typically includes data identifying the signaling protocol used. The variable message portion commonly includes plural fields. For the printed retail watermark, one field typically conveys a global trade item number (GTIN), while other fields can convey Application Identifier codes (e.g., indicating weight, expiration date, etc.) as defined by GS1. Plastic identification information may be conveyed in a printed retail watermark in the form of such an Application Identifier code, although such an AI code is not presently part of the GS1 standard.

Some recycling systems employ two watermark readers, a first reader configured to apply a first watermark reading algorithm (e.g., to read a retail watermark employing a first signaling protocol) and a second reader configured to apply a second, different, reading algorithm (e.g., to read a recycling watermark employing a second signaling protocol). Each such reader is unable to read watermarks of the other type. Other recycling systems employ a single reader, configured to read both types of watermarks. Still other systems employ hybrid arrangements, with certain components shared (e.g., performing a common FFT operation), and other components dedicated to one type of watermark or the other.

To assure reliable reading of the watermarks regardless of position of an item in a waste stream, the watermarks are preferably visible from multiple item viewpoints. For example, the recycling, texture watermark is desirably formed on several surfaces of each item, including front and back. Likewise, the retail, printed watermark is desirably formed on opposing sides of each item, e.g., on both front and back labels.

To apply watermark reading efforts most effectively, certain embodiments of the present technology examine image pixel blocks for clues that suggest presence of watermark data. Further watermark analysis is undertaken only for image blocks where such a clue is found. Many such clues are detailed, including detecting a glare spot (a region of pixels each having a value above a threshold value), detecting an ensemble of spatial image frequencies corresponding to a watermark reference signal, a classifier output indicating that a pixel block likely depicts a plastic item, a classifier output indicating that a pixel block likely does not depict a conveyor belt, a determination that pixels from a majority of sub-blocks within a block have an average value within 1, 2, 3 or 4 digital numbers of a histogram peak that is based on previous imagery, detecting signals associated with conveyor belt markings, detecting salt/pepper markings, and various other techniques for distinguishing promising image blocks from others. When a patch of promising imagery is identified, it is typically analyzed for presence of both the retail and recycling watermarks.

In some embodiments, when one block of imagery is found to be promising, that determination also triggers examination of plural nearby image blocks. An incoming frame of imagery may initially be divided into blocks at a first density (e.g. with first pixel spacing or overlap). When a promising block is found, other blocks are examined at a greater density, e.g., spaced from the promising block at a smaller pixel spacing, or with greater overlap. Relatedly, when a promising block is found in one frame, then a different location can be analyzed for watermark data in a following frame—corresponding to predicted movement of the item depicted in the promising block—based on conveyor speed and frame capture rate.

Due to analysis of imagery for both types of watermarks, sometimes two instances of the same type of object (e.g., two identical 12 oz. Pepsi bottles) will be sorted based on reading of two different watermarks. That is, the first bottle's plastic type may be identified by its printed watermark, and the second bottle's plastic type may be identified by its texture watermark. Both will be diverted to the same recycling destination, despite the reading of different watermarks.

DETAILED DESCRIPTION

Digital watermark information is read from image data depicting plastic objects in a waste stream. The information can indicate the type of plastic (e.g., polyethylene terephthalate, high-density polyethylene, low-density polyethylene, polypropylene, polycarbonate, etc.), or it can convey other information useful in recycling. Diverters and other mechanisms in automated sorting systems are controlled in accordance with such watermark information, to direct plastic objects to appropriate destinations for recycling or reuse.

Digital watermarks (hereafter watermarks) are printed on packaging for many products, and commonly serve to encode a Global Trade Item Number, or GTIN, (much like the ubiquitous 1D UPC barcodes), but in a visually non-intrusive manner. A point of sale scanner in a retail store can detect and decode the watermark data, use it to look up the product's identity and price, and add same to a shopper's checkout tally. The watermark data is typically organized in square blocks that are redundantly tiled—edge to edge—spanning some or all of the printing on the product. Because the watermark data is spatially dispersed, the scanner can read the data from different views of the product (e.g., from front and back views of a drink bottle).

Most typically, watermark data is hidden as subtle variations to the luminance and/or chrominance of pixels comprising the artwork for a package. Sometimes a watermark can take the form of an inconspicuous pattern of dots that may be spread, e.g., across an adhesive label applied to a plastic fresh food container.

To hold costs down, point of sale scanners generally use simple processors. Such scanners commonly devote most of their effort to finding and decoding 1D barcodes; watermark reading is sometimes an afterthought. A scanner that captures 30 frames per second has only 33 milliseconds to process each frame, and devotes most of that time to barcode reading. Only a few milliseconds are available for watermark reading.

Watermark reading has two parts: finding a watermark, and decoding the watermark.

In an illustrative implementation, finding the watermark (sometimes termed watermark detection) involves analyzing a frame of captured imagery to locate a known reference signal. The reference signal can be a characteristic constellation of peaks in the 2D Fourier magnitude domain (a.k.a. the spatial frequency domain). In the spatial (pixel) domain, such a reference signal takes the form of an ensemble of summed 2D sinusoids of different spatial frequencies spanning a watermark block. FIG. 5A shows an illustrative reference signal in the Fourier magnitude domain; FIG. 6A shows such the same reference signal in the spatial domain. The frequencies are desirably integer-valued, so as to assure continuity along edges of watermark blocks. When an object bearing such a known reference signal is depicted in captured imagery, its particular presentation reveals the scale, rotation, and translation of the watermark payload data that is also present in that imagery.

The watermark payload data is encoded by watermark elements ("waxels") that occupy locations in a 2D array—commonly of size 128×128 elements. This array may span an area of, e.g., 0.85 or 1.7 inches on a side, depending on whether the watermark is formed at a resolution of 150 or 75 waxels per inch (WPI). Such blocks are tiled in a repeating array across the packaging, together with the reference signal.

Once the scale, rotation, and translation of the watermark are known from analysis of the reference signal as depicted in captured imagery, the watermark payload can be decoded. A decoder samples the captured imagery at locations corresponding to the originally-encoded 128×128 array of data, and uses these sample values in decoding the original watermark payload. (Convolutional coding is commonly used, e.g., to convert a 48-bit payload to a string of 1024 data, which are then redundantly spread among the 16,384 locations of the 128×128 element watermark block.) These and other details of watermark technology are familiar to artisans, including from the patent documents identified herein.

In one particular embodiment of the present technology, a plastic container conveys two watermarks—one formed by label printing, and a second formed by texturing of the plastic surface, as by molding. (The label can comprise a substrate that is printed and applied to the container, or it can comprise printing applied directly to the container.)

Plastic can be molded in various ways, including blow molding, injection molding, rotational molding, compression molding, and thermoforming. In each such process, a heated plastic resin is shaped in accordance with a mold. By shaping the surface of the mold with a pattern, a reciprocal pattern is formed on the surface of the resulting plastic product. If the pattern in the mold is tailored (e.g., by CNC milling, laser etching, or 3D printing) to have the shape of a watermark pattern (with variations in luminance/chrominance transformed to variations in mold height, depth, angle, reflectance, or local curvature), then the resulting plastic product will have a surface texture corresponding to that watermark. Such pattern in the plastic surface can be sensed by optical methods detailed below.

Figure 1B:
Figure 1C:
Figure 1D:
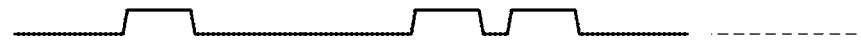
Figure 1E:
Figure 1F:
Figure 1G:
Figure 1H:
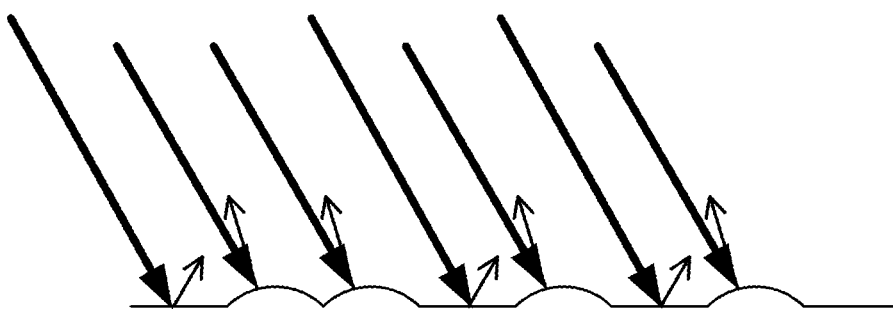
Figure 1I:
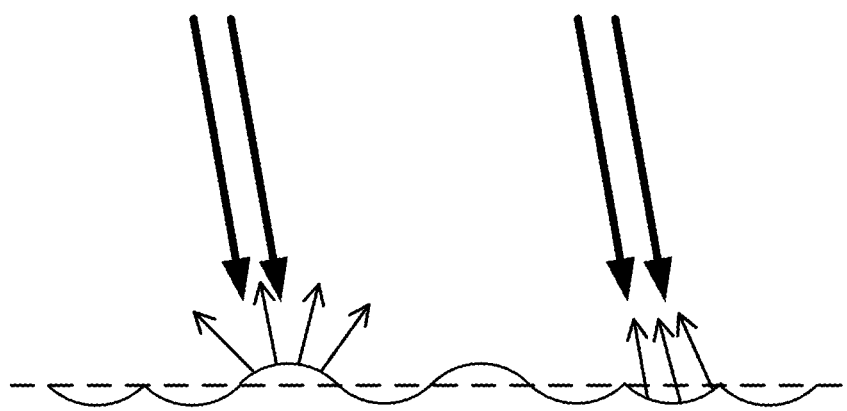
Figure 1J:
Figure 1K:
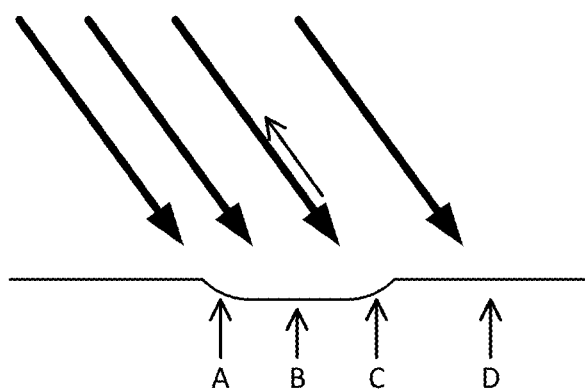
Figure 1L:
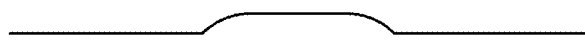
Figure 1M:
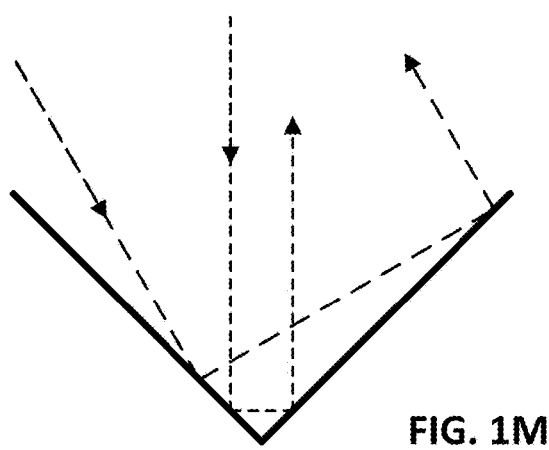
Figure 1N:
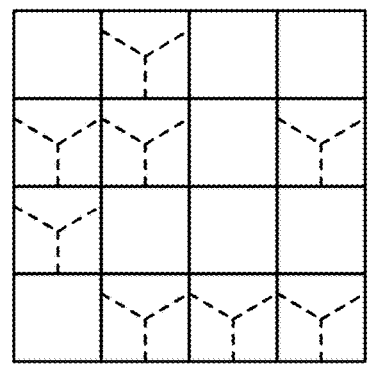
Figure 1O:
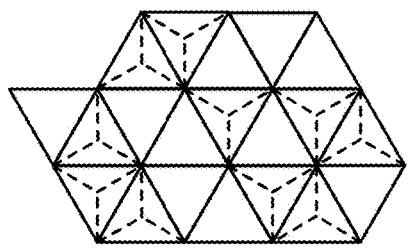
Figure 1P:
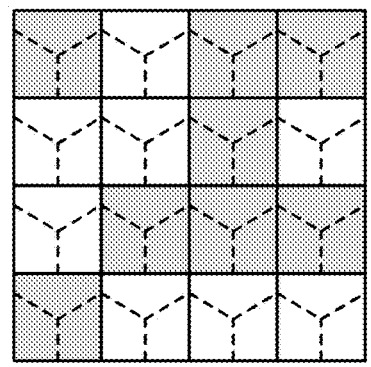
Figure 1Q:
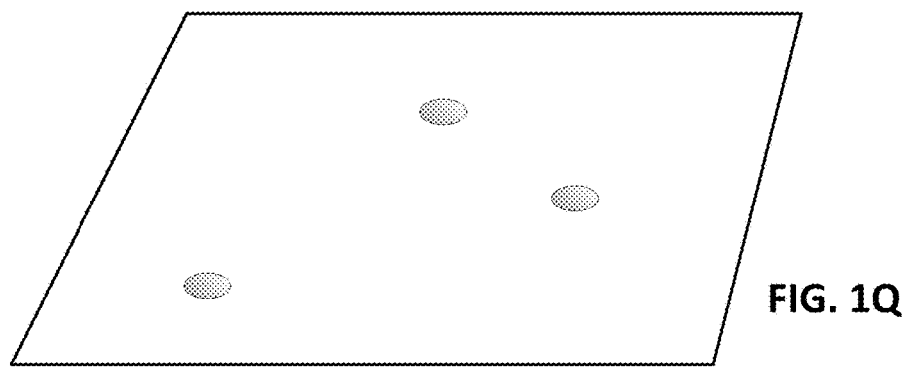

FIGS. 1A-1Q are illustrations of representative surface textures.

Most of the depicted textures are illustrated as a 2D section through a 3D surface—showing modulation in just one dimension. For clarity of illustration, the textures are shown on a flat surface. Naturally, most plastic containers are curved in at least one dimension.

Also for clarity's sake, most of the illustrations of FIGS. 1A-1Q show marks that have just two states. Particular examples include the "sparse" dot marks detailed in patent publications US20170024840, 20190139176 and application PCT/US19/19410 (published as WO2019165364). Other two-state marks include line art patterns such as Voronoi, Delaunay, traveling salesman, and bricks, as detailed in applications PCT/US18/64516 (published as WO2019113471) and Ser. No. 16/435,164, filed Jun. 7, 2019 (published as 20190378235), and respectively shown in FIGS. 3A, 3B, 3C and 3D. (The Voronoi pattern is achieved by forming a mesh of glints (here triangles) with their vertices at locations corresponding to a sparse array of dots. The Delaunay pattern is the dual of the Voronoi pattern, in which the glints take the form of polygons of different numbers of sides. The traveling salesman pattern is achieved by defining a traveling salesman path that visits each dot in a sparse array of dots. The bricks pattern is achieved by placing a vertical line segments at dot positions in an array of sparse dots, and forming horizontal lines at intermediate positions, thereby defining rectangular glints.) FIG. 1A is labeled to show the binary state of each waxel. A "1" is here represented by a relatively-raised excerpt; a "0" is represented by a nominal, baseline elevation of the plastic surface (which may be viewed as relatively-depressed, compared to the depicted "1" state). The nominal elevation of the plastic surface is shown by the dashed line.

FIG. 1B is like FIG. 1A, but the sharp corners have been rounded (e.g., by low pass filtering) to aid in release of the shaped plastic from the mold. Such rounding can be used in any embodiment, to smooth sharp angles.

FIG. 1C shows an embodiment in which the transitions between states are sloped, and successive "1" values include a brief return to the opposite, nominal surface level. FIG. 1D is a variant of FIG. 1C. Sloping the transitions further aids in mold release, and can aid in optical detection, depending on the illumination.

In some embodiments, the raised protrusions in FIGS. 1B, 1C and 1D each can be a rounded hump, with only a small—or no—flat area at its peak.

FIG. 1E shows that the "1" state can be characterized by a surface that is non-parallel to the nominal flat surface that characterizes the "0" state. FIG. 1F is a variant on FIG. 1E, showing that the "1" state needn't be elevated; it can simply be tilted.

FIG. 1G shows an arrangement in which the "1" and "0" states are each tilted, in different directions, relative to the nominal surface of the plastic. (The tilt directions may be 180 degrees apart, as shown, or they may differ by 90 degrees.) Such tilts cause light to be preferentially-reflected in different directions, making the mark more conspicuous to the watermark reader.

While FIGS. 1A-1G have been described and illustrated as comprising excerpts that rise above the nominal surface, it will be recognized that such encoding can similarly (and perhaps more commonly) comprise excerpts that are depressed below the nominal surface. (Watermark encoding/reading is typically agnostic as to polarity—up or down.) An example is in forming the lines used in the patterns of FIGS. 3A-3D, and FIG. 7. Combinations of elevations and depressions can also naturally be used.

FIG. 1H illustrates an advantageous dispersion phenomenon associated with curved surfaces. For most placements of the camera and light source, for a curved surface, the incident light (shown by the larger arrows) will be reflected from the surface at a diversity of angles (show by smaller arrows), and some of it will be reflected towards the camera, creating a bright glint. In contrast, for a flat surface, essentially all of the incident illumination will be reflected in a single direction—most likely away from the camera. Thus, flat surfaces will usually appear dark to the camera, while curved surfaces will usually be characterized by a bright glint. (If, by chance, the flat surfaces reflect towards the camera, then an "inversion" occurs, with the flat surfaces being brighter than the curved surfaces.)

FIG. 1I shows dispersion and focusing phenomena associated with surfaces that have both bumps and pits. The bumps act as described above—dispersing incident light over a wide range of angles. In contrast, curved pits act as focusing elements. Compared to the dispersion caused by the bumps, the focusing caused by the pits causes a greater amount of light to be reflected in the general direction of the light source. Assuming the camera is relatively close to the light source (e.g., within ten degrees as viewed from the illuminated surface), the pits will appear brighter than the bumps, in camera-captured imagery. (The dashed line shows the nominal plastic surface.)

(Here and elsewhere, it will be understood that the light source and camera can be placed other than as indicated by the Figures. They can be closely-spaced, e.g., within single-digit degrees) or further spaced. The light can illuminate the surface straight-down (90° incidence), or obliquely, such as with incidence angles of 80°, 60°, 300 or less.) The FIG. 1I arrangement can be extended to three surface features, bumps, pits and flats, as shown in FIG. 1J. The flat surfaces will reflect as described in connection with FIG. 1H. The FIG. 1J arrangement thus is an example of a surface that can be used for trinary signal encoding, variously reflecting a medium amount of light (i.e., the glints caused by the bumps), a larger amount of light (i.e., the focused reflections caused by the pits), and an extreme value (typically dark, but sometimes bright, caused by the flat areas).

FIG. 1J also illustrates another aspect of surface shaping, which can be used in any embodiment: the protrusions need not be dimensionally-similar to the indentations. In this example, the raised bumps are taller than the pits are deep. Relatedly, the raised bumps have a smaller radius of curvature than the depressed pits. The opposite can also be the case.

FIG. 1K illustrates that modulating the surface height can have little—if any—effect on the reflected light pattern. What often matters are the transitions in surface height, that is, the derivative of the function that defines surface height.

In FIG. 1K, light incident at point B on the plastic surface will reflect with the same direction and intensity as light incident at point D. The two surfaces are at different elevations, but are parallel. In contrast, light incident at point A will reflect with a different intensity and direction than light incident at point C. At point A, the surface derivative is negative (the height diminishes with increasing movement to the right). At point C, the surface derivative is positive. Assuming the camera is located near the light source, virtually no incident light will reflect back towards the camera from point A, whereas virtually all of the incident light will reflect back towards the camera from point C. The flat-bottomed pit shown in cross-section in FIG. 1K thus has three reflective zones: one zone along the flat bottom, one zone with a negative derivative, and one zone with a positive derivative. With the light source positioned as shown (and the camera nearby) a glint of reflection will be sensed by the camera from the latter zone, with nil reflection from the first two.

Similar phenomena likewise arise from a flat-topped raised bump, as shown in FIG. 1L. The left-most side of the bump has a positive derivative, and reflects a glint of light back towards the camera. The flat top does not reflect light back to the camera, nor does the right-most side of the bump (with its negative derivative).

(It will be understood that the described results depend on the light source being positioned to the left side of the shaped surface. If the light is positioned to the right side, some of the results are inverted.) Naturally, the shapes of the curves can be tailored to optimize performance, e.g., favoring reflections in certain directions relative to the incident light source.

Still another approach to surface texturing is to employ retroreflective features, such as 3D corner reflector-shaped indentations into the plastic. A 3D corner reflector has the property that light is reflected back to its source, over a wide range of incident angles. FIG. 1M shows this property in two dimensions; it likewise extends to three dimensions.

Corner-shaped indentations can be formed in a plastic surface where the watermark should have a bright appearance (e.g., a "1" state), and can be omitted where the watermark should have a dark appearance (e.g., a "0" state). The deepest "point" of the indentation can be rounded; what is important is that most of the surface extents be perpendicular to each other.

FIG. 1N shows an excerpt from a square 128×128 waxel watermark block, showing 16 waxels. Some are indented with a retroreflective 3D corner reflector in accordance with the data being encoded (e.g., representing a "1" signal); others are left flat (e.g., representing a "0" signal). FIG. 1O shows an excerpt employing triangular waxels, which organize in hexagonal arrays. Again, some are indented with a retroreflective 3D corner reflector in accordance with the data being encoded; others are not.

In variant embodiments, the two states of the signal tile aren't expressed by corner reflector, or flat surface. Instead, a corner reflector is formed at the location of every waxel. The two states are distinguished by the treatment of the three orthogonal surfaces (facets) defining the indented reflector. A "1" state is characterized by smooth surfaces that reflect light with relatively little scattering. A "0" state is characterized by textured (e.g., roughened or matte) surfaces that reflect light with relatively more scattering. The first type of reflector is made to be efficient; the second type of reflector is made to be inefficient. Yet to human observers, the two features are essentially indistinguishable, giving the surface a uniform-seeming texture. FIG. 1P shows such an arrangement (with the roughened corner reflectors shown by grey waxels).

If square waxels are formed in the plastic at a density of 75 per inch, then each waxel spans an area 0.0133 inches on a side. So each corner reflector indentation has a width of this value or less. With higher waxel densities, the dimensions get smaller.

Naturally, in retroreflective arrangements, the camera should be positioned as close as practical to the light source, desirably so that the angular distance between the two (as seen from the conveyor) is less than ten degrees.

The texturing of some surfaces in the FIG. 1P arrangement can be employed in other arrangements, including the other depicted arrangements. That is, some areas of the plastic surface may be roughened or matte-finished to increase scattering, while other areas can be left smooth to provide more specular light reflection. In some embodiments, the plastic surface has no depression or elevation to encode watermark data. Rather, the encoding is effected wholly by scatter-texturing of different regions, without otherwise disturbing the nominal shape of the item.

FIG. 1Q shows, in a 3D view, a small excerpt of a planar surface, marked with 3 sparse dots—here taking the form of depressions into the surface.

While many of the illustrated surfaces can encode two signaling states, and some can encode three states, more generally, M-ary encoding can be used.

Figure 2A:
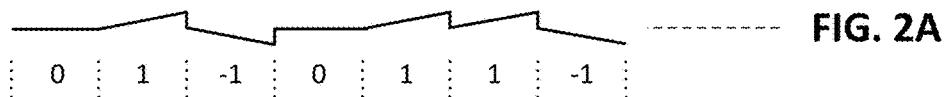
FIG. 2A shows a form into which a plastic surface can be shaped to convey trinary digital watermark data.

FIG. 2A shows another form of trinary encoding, in which the signal is comprised of −1, 0 and 1 elements. A "−1" is represented by a tilt in one direction, a "1" is represented by a tilt in another direction, and a "0" is represented by a tilt midway between the other two. Many other such forms can naturally be devised, e.g., by including depressions from the nominal plastic surface that mirror the protrusions of FIGS. 1A-1F. Quaternary encoding can be realized using four different surface tilts, at successive 90 degree angles. Quinary encoding can be realized by using the four tilts of quadrature encoding, plus a fifth state that is the plastic's nominal surface. M-ary encoding of still higher orders can be realized by expanding the set of tilts.

(The surfaces in FIG. 2A, as in the other Figures, can be roughened, e.g., with a matte or frosted finish, to scatter some light in directions that are not purely reflective.)

Figure 2B:
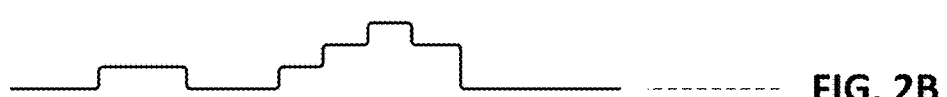
FIG. 2B shows another form into which a plastic surface can be shaped to convey multi-state, or continuous tone, digital watermark data.
Figure 3A:
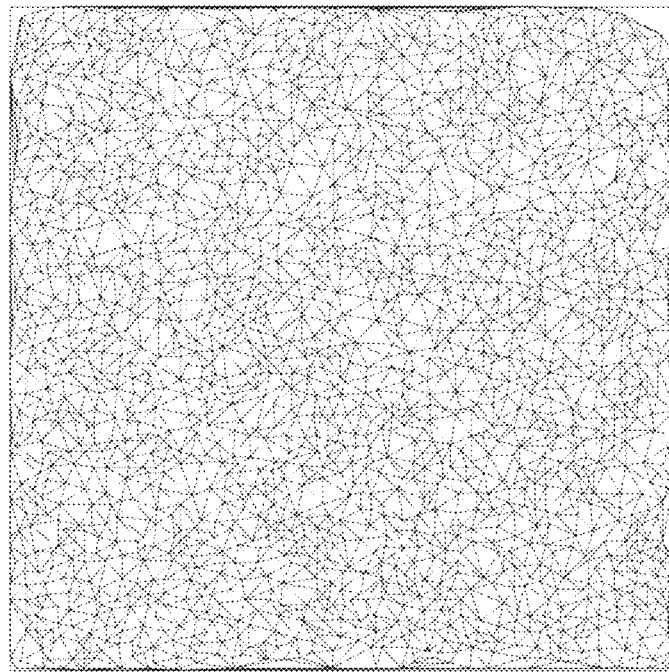
FIGS. 3A, 3B, 3C and 3D show Voronoi, Delaunay, traveling salesman, and bricks patterns.
Figure 3B:
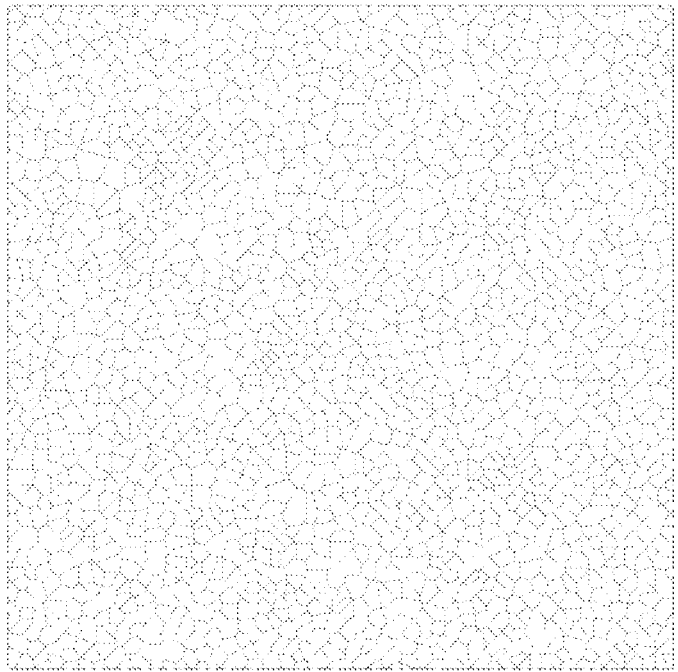
Figure 3C:
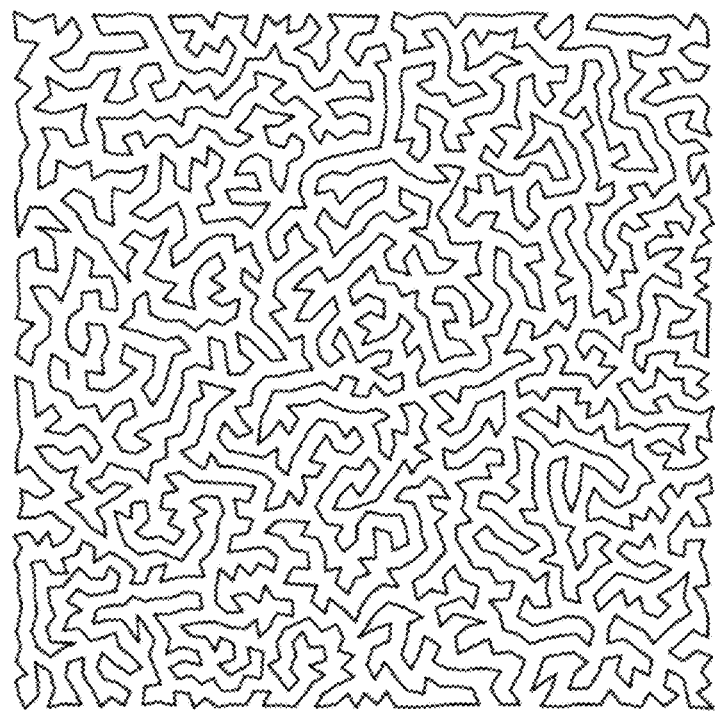
Figure 3D:
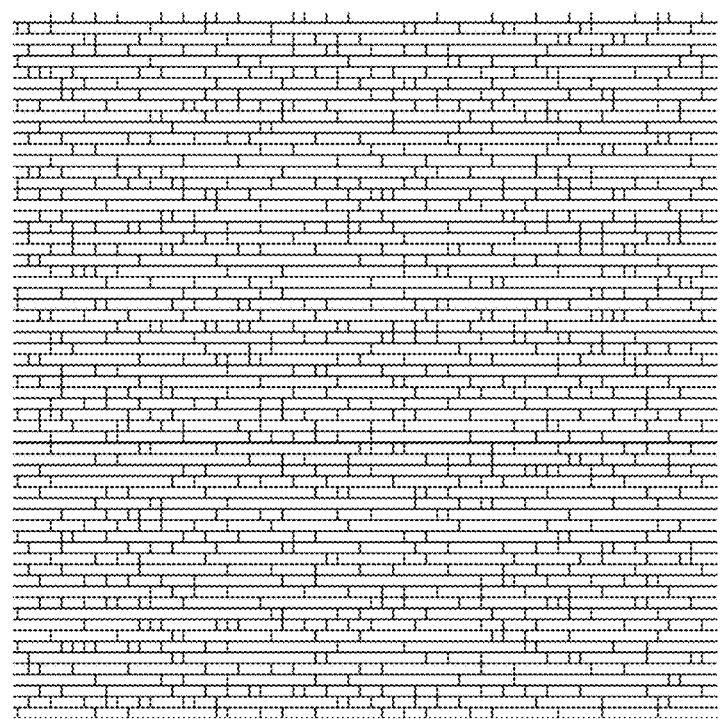

In addition to M-ary encoding, the present technology is also suited for use with so-called "continuous tone" watermarks, which have a variety of intermediate states between two extrema. Often the reference signal is continuously-valued (or valued by a large set of quantized steps), and summation of such a reference signal with a M-ary payload pattern representation yields a continuous tone watermark. The continuous values of waxels in such marks can be represented by the degree of localized surface height or tilt. Such a mark is conceptually illustrated by FIG. 2B The just-discussed patterns suggest that the shaping extends to both surfaces of a plastic medium, e.g., top and bottom (or inside bottle and outside). Sometimes, the shaping is of one surface only (e.g., the outside), with the other surface being smooth.

While plastic texturing using shaped molds is most common, other forming approaches can be used. Laser or chemical etching is an example, and results in a surface that is marked with depressions, corresponding—by amplitude or tilt—to spatial variations in a watermark signal. (Laser etching is well-suited for serialization—in which each instance of an item is encoded differently.)

In some embodiments, the plastic surface is locally treated to render a matte or frosted finish, rather than a glossy finish. In such case, the watermark itself can be formed as a pattern comprised of matte and glossy waxels.

Matte texture is achieved by molding, or otherwise processing the surface, to achieve a measure of surface roughness, e.g., vertical variation on the order of a tenth or a half micrometer or larger.

In the exemplary embodiment, the plastic watermark is tailored as to avoid confusion by the point of sale scanner. As noted, such scanners have limited processing abilities, and limited time to extract watermark identifiers. Several measures can be taken to help prevent a point of sale scanner from attempting to read a plastic watermark—an effort that wastes precious processing time and may prevent the scanner from decoding a product GTIN from a product label depicted in the same frame.

One measure to help avoid confusion by point of sale scanners is to use a reference signal in the plastic watermark that is unlikely to be mistaken for the reference signal used in the printed label watermark. Such a reference signal can be developed experimentally by randomly generating multiple candidate signals (e.g., by picking a set of random peak locations in the spatial frequency domain and assigning a random phase to each) and testing each candidate to assess a likelihood that a point-of-sale watermark reader will mistake such a signal for a printed label watermark reference signal. The candidate reference signal with the lowest likelihood of confusion is then used.

Another approach is similar, but involves mathematically computing a theoretical confusion (correlation) metric indicating similarity between different candidate random reference signals, and the printed label reference signal, and picking the candidate with the lowest correlation.

Applicant prefers the first approach since, as a sage once quipped, in theory there is no difference between theory and practice, but in practice there is.

The process for finding candidate reference signals for the plastic watermark can be aided by applying different constraints in the signal generation or selection process. One is that, desirably, no peak in the plastic reference signal should be identical to any peak in the printed label reference signal. Any randomly-generated candidate plastic reference signal having such an attribute may be discarded.

FIG. 4 shows the peaks of a printed label watermark reference signal, in the 2D Fourier magnitude domain. The reference signal of a plastic watermark should desirably have no peak location in common.

Relatedly, in the printed label reference signal, each frequency peak falls on a different radial line from the origin. A few are shown in the enlargement of FIG. 4A. It is desirable that no peak in the plastic reference signal be located on any of these radial lines. (Depending on the scale with which watermarked objects are viewed, the reference signal peaks move concentrically towards and away from the origin, traveling on these radial lines—risking confusion if both reference signals have a peak on the same radial line.)

Applicant also prefers that no peak in the plastic reference signal be on the vertical or horizontal axes, 31, 32, of the spatial frequency plane. Many other features of the captured imagery may have signal energy concentrated along these axes, so peaks along such axes are best avoided.

The reference signal for printed labels is quad-symmetric—mirror-imaged around the vertical and horizontal frequency axes, and such arrangement may be used for the plastic reference signal for reasons of detector efficiency. However, this is not required, and a reference signal for the plastic watermark that does not exhibit this attribute may be at less risk for confusion.

While peaks along the vertical and horizontal axes are best avoided, it is generally desirable that peaks for the plastic reference signal be placed on radial lines at diverse angles. In each quadrant of a quad-symmetric reference signal, a quarter to a third of the peaks may be on different radial lines located within 30 degrees of the horizontal axis, a quarter to a third may be on different radial lines located within 30 degrees of the vertical axis, and a third to a half may be on different radial lines located between these two ranges.

It is similarly desirable that the peaks for the plastic reference signal be diverse in their distance from the origin. Low frequency points are disfavored (e.g., below 20 or 25 cycles per block), since scaling may cause them to shift to locations where the watermark reading software is not looking for peaks (thus the blank area in the center of FIG. 4), and reciprocally for high frequencies (e.g., above 50 or 60 cycles per block). But within an intermediate donut band (shown by the dashed circles in FIG. 4) a spatial budget for allocating peaks can be used, as in the preceding paragraph, to ensure a roughly uniform distribution.

Another measure to help avoid confusion by point of sale scanners is to use a reference signal in the plastic watermark that has a smaller number of peaks than the reference signal in the printed label watermark. The fewer the number of peaks, the less likely one will be mistaken for a peak in the printed label watermark.

A corollary benefit is that in a plastic watermark reference signal with fewer peaks, each can be encoded with more energy—since the available signal energy budget is spread among fewer features. A plastic reference signal comprised of fewer strong peaks is less likely to result in confusion than a reference signal comprised of more and weaker peaks.

A further guard against confusion of printed and plastic watermarks is to form the marks at different scales. As noted, printed watermarks are commonly formed at 75 or 150 waxels per inch (i.e., watermark blocks of 1.7 or 0.85 inches square). Plastic watermarks may be formed at a different resolution, such as 200, 250 or 300 waxels per inch (i.e., 0.64, 0.51 and 0.43 inches square). So doing also aids in their detection from curved container surfaces, since the apparent edge distortion of the watermark pattern due to curvature diminishes with smaller watermark block sizes.

One algorithm for generating a candidate plastic reference signal is to take a Fourier magnitude plot of the label reference signal with which confusion is to be avoided, and add two circumscribing circles (as shown in FIG. 4) to define an annular space within which all points should reside. Then add radial lines extending from the center of the plot through each label reference signal peak, to the outer circle, akin to FIG. 4A. Finally, triangulate within the annular space, using the label reference signal peaks as vertices, to define the largest triangles that don't encompass any other peak. Then identify a point within the annulus that is the most remote from the nearest straight line (i.e., the radial lines, the triangulation lines, and the horizontal and vertical axes) and add it to a set of candidate points. Repeat until a desired number of points has been identified.

Different candidate plastic reference signals can be tested for potential confusion with the label reference signal by applying different random distortions to each candidate signal—such as tilt, rotation, and scaling, and additive Gaussian noise—and determining how frequently the reference signal detection stage of a point-of-sale watermark reader mistakes the distorted signal as the reference signal for a label watermark. After each candidate reference signal has been tested with several hundred different distortions, one candidate signal will typically emerge as superior to the others. (This signal may be examined, in the spatial domain, by a human reviewer, to check that it has no subjectively-objectionable attribute, but such review can also be skipped.)

Several candidate plastic watermark reference signals are shown in FIGS. 5A, 5B and 5C by their Fourier magnitude plots. FIGS. 6A, 6B and 6C show their corresponding spatial domain representations.

Confusion with the printed label watermark reference signal tends to diminish with "flatness" of the spatial domain representation of the plastic reference signal. Thus, in accordance with another aspect of the present technology, each candidate reference signal for the plastic watermark is varied, by trying different phase assignments to different peaks in the Fourier magnitude plot, to identify a set of phase assignments that minimizes the standard deviation of pixels in the spatial domain representation. This is a task well-suited to computer automation, with a hundred thousand or a million different sets of phase assignments being tried, to find the one set that yields the spatial domain pattern with the smallest standard deviation.

While the reference signal patterns of FIGS. 5A-5C (and 6A-6C) were generated experimentally, e.g., using the techniques detailed above, a check of their correlation with a printed label watermark reference pattern finds a very small degree of correlation r, with a maximum value of 0.2>r>−0.2 (and in some instances 0.1>r>−0.1), when confusion-tested with the printed label reference pattern over a full range of affine transformations, i.e., at scales ranging between 0.5 and 2.0 in increments of 0.02, and at rotations ranging between −90 degrees through +90 degrees in increments of 1 degree, and at every pixel of possible translation.

Correlation of two images $f_1$ and $f_2$, both of size P×P pixels, can be expressed as:

$$r = \frac{1}{P^2} \sum_{i=1}^{P} \sum_{j=1}^{P} \hat{f}_1(x, y) \hat{f}_2(x, y)$$

It will be understood that the detailed reference signals are comprised of sinusoids of equal amplitude. In other embodiments, the sinusoids can have different amplitudes, yielding a more conspicuous "weave"-like pattern to their spatial domain representations.

As noted, a reference signal is one of two elements of a watermark signal, the other being an encoded representation of the payload message. This representation can be generated by convolutionally-encoding the symbols of the payload message to generate a much longer string of symbols (e.g., 1024 bits), which may be termed the signature. The signature may be randomized by XORing with a scrambling key of the same length. Chips redundantly representing each of the scrambled signature bits are randomly spatially scattered among locations in a square array, e.g., of 128×128 (16,384) elements, to form a signature array.

A continuous-tone watermark can be generated by scaling the spatial domain reference signal so its average pixel value is 128, and then adding or subtracting to each component pixel value an offset value that depends on whether the chip assigned to that location is a 1 or a 0.

A sparse watermark can be generated by various methods, which commonly involve producing an output pattern of spaced-apart dots. Several methods are detailed in the cited documents, and are discussed in the section entitled "Review of Exemplary Watermarking Methods," below.

Figure 7:
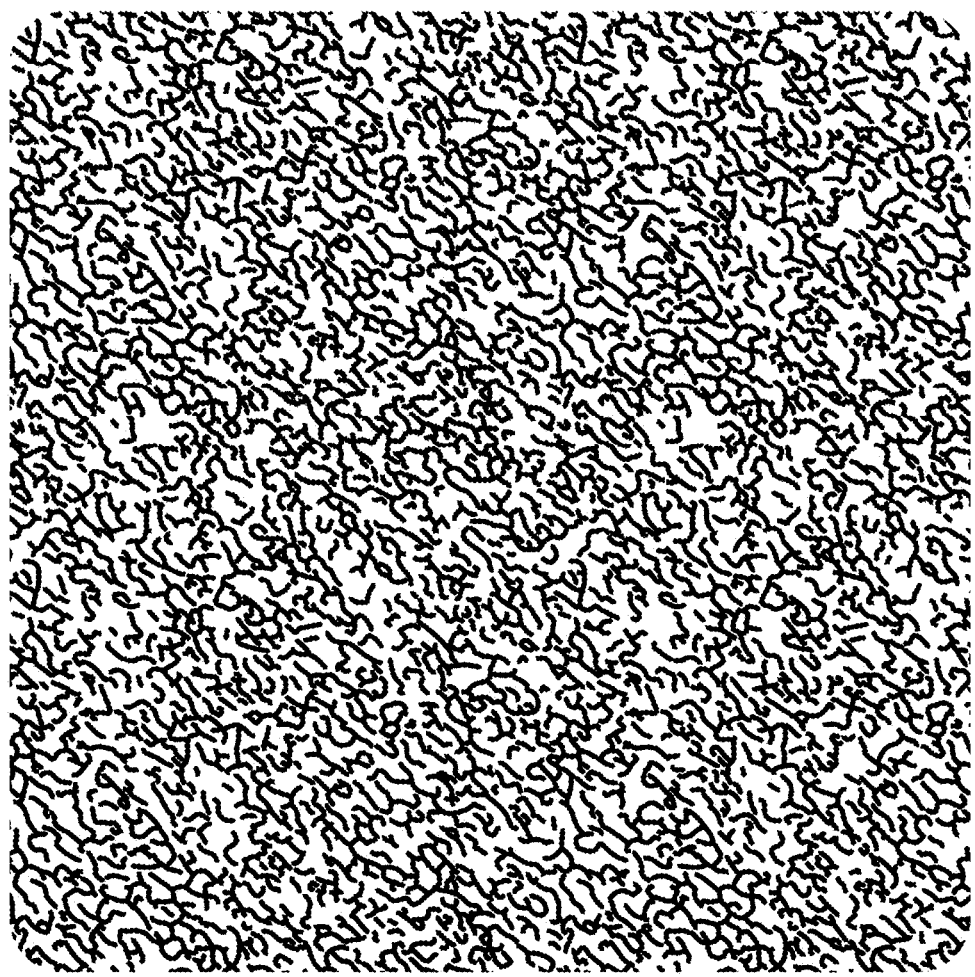
FIG. 7 shows a block of a "snakes" watermark pattern, with which a mold for a plastic bottle can be shaped.

As noted above and illustrated by FIGS. 3A-3D, a sparse pattern can be transformed into various bitonal line-based representations. A further such pattern, termed snakes, is shown in FIG. 7. It is generated from a continuous-tone watermark, per the following algorithm executed using Adobe Photoshop and Illustrator:

A monochrome (greyscale) block, at 300 DPI with a white background, is filled with 50% grey, and encoded with a continuous-tone watermark (reference and payload signals). The image is then Photoshop-adjusted using the controls Adjustment→Exposure: Default/Exposure: 1.05/Offset: −0.075/Gamma Correction: 0.3. Next, filtering is applied using Photoshop controls Filter→Blur→Gaussian Blur: Radius: 3 pixels; then Filter→Stylize→Wind: Method=Wind/Direction: Right or Left (doesn't matter). Then the image is thresholded by Photoshop controls Image-→Adjustment→Threshold: Threshold Level: 140 (+/−5). The resulting file is saved, and then opened in Adobe Illustrator. The just-edited image is selected from inside the layers. The "Image Trace" button in the main upper frame of the Illustrator user interface is clicked, and after the preview appears, the Image Trace Panel, next to the Drop Down frame showing "default," is clicked. From the top line of the icons, the Outline button is clicked. After the preview is presented, the "Expand" button, next to the Drop Down frame showing "Tracing Result," is clicked. This presents a UI enabling the size of the strokes in the pattern to be made bolder or skinnier. Some bolding is applied to produce a pattern like that of FIG. 7.

It will be seen that such a pattern is comprised of multiple curved segments (many segments being compound-curved, i.e., with multiple turns along their length), dispersed across an area, with some segments crossing others, while others are independent—not crossing others.

Turning now to the larger system, a recycling apparatus according to one embodiment of the present technology employs one or more cameras and lights sources to capture imagery depicting watermarked plastic containers traveling on a conveyor in a waste stream. Depending on implementation, the conveyor area imaged by a camera system (i.e., its field of view) may be as small as about 2 by 3 inches, or as large as about 20 by 30 inches, or larger—primarily dependent on camera sensor resolution and lens focal length. In some implementations, multiple imaging systems are employed to capture images that collectively span the width of the conveyor. (A conveyor may be up to five feet or two meters in width in a mass-feed system. Singulated-feed systems, in which items are metered onto the conveyor one at a time, are narrower, e.g., 12 inches or 50 cm in width. Conveyor speeds of 1-5 meters/second are common.)

Figure 8:
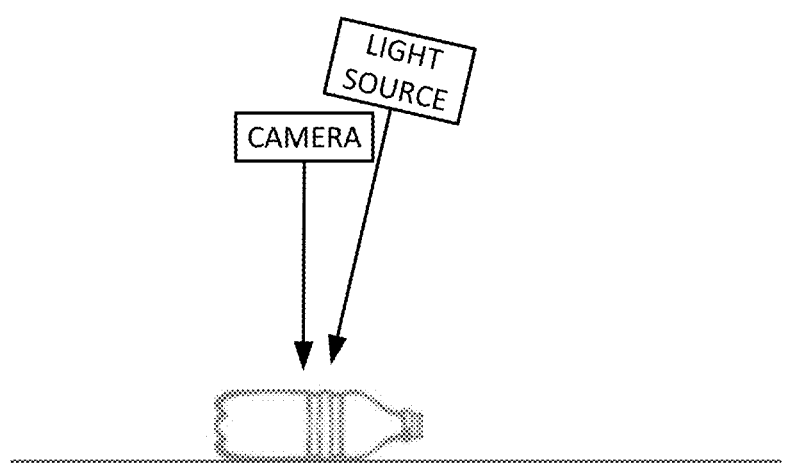
FIGS. 8, 9, 10 and 11 show different systems for capturing imagery of items on a conveyor in a recycling apparatus.
Figure 9:
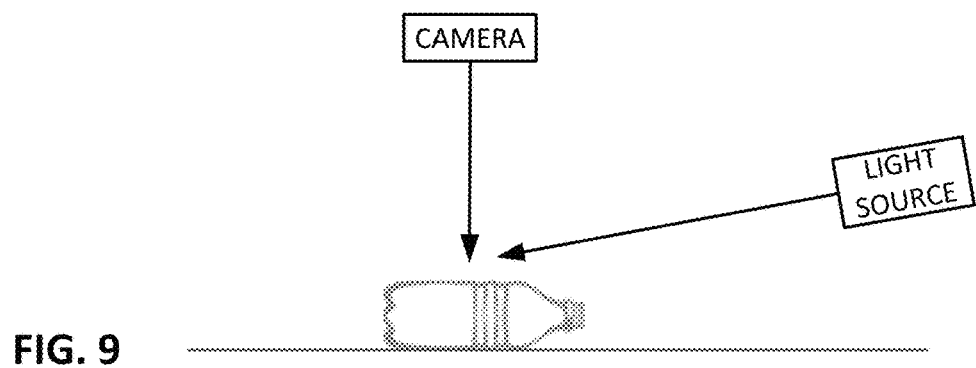

FIG. 8 shows a simple arrangement in which a camera and a light source are substantially co-located; that is, the illumination comes from a position less than 10 degrees away from projection of the camera's viewing axis onto the waste stream conveyor (i.e., the camera target). In another arrangement, the light source is positioned to obliquely illuminate the camera target, i.e., the light source is oriented in a direction more than 50 degrees away from the orientation of the camera lens axis, as shown in FIG. 9. In still another arrangement (FIG. 10), opposing illumination is employed. That is, the axis of the light source has an orientation more than 140 degrees away from the orientation of the camera lens. In the latter arrangements, the surface texturing can cause localized shadowing on the plastic surface, e.g., with each plastic protrusion blocking light, causing an adjoining area to be imaged with relatively less luminance than an area on which the light is incident.

Figure 10:
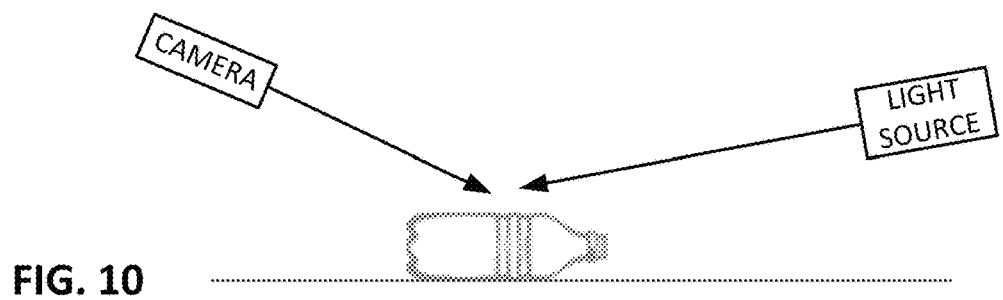

The positions of the camera and light source in each of FIGS. 8-10 may be interchanged. In other embodiments, multiple light sources can be used. Naturally, the exposure interval should be short enough to avoid motion blur. A strobed light source aids in avoiding blur. The light source can be as close to the conveyor as the size of items passing underneath will allow, or it can be spaced at a greater distance, two or four feet.

Figure 11:
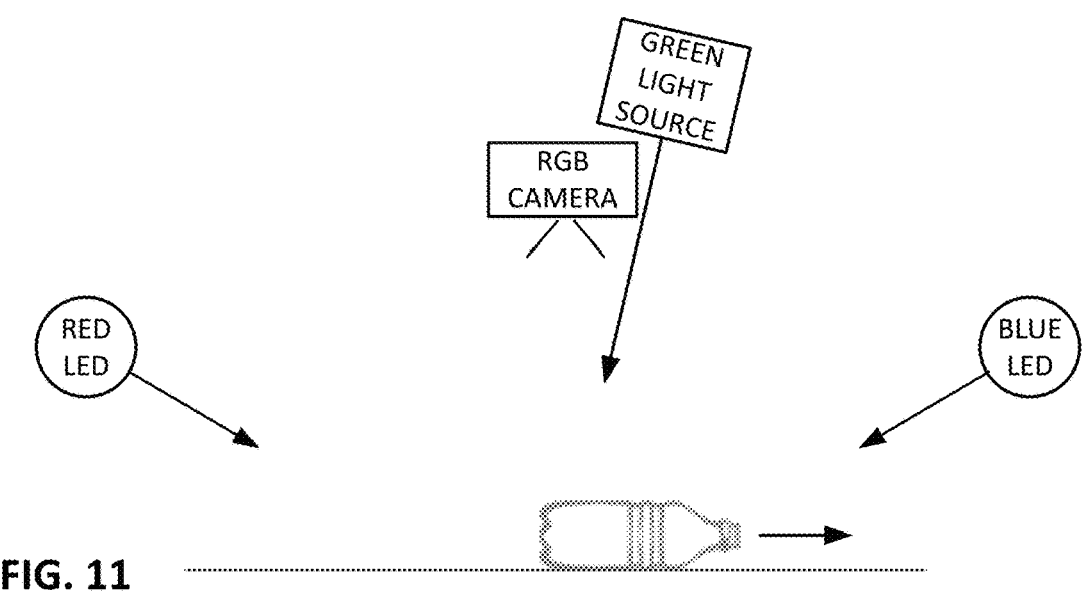

FIG. 11 shows an arrangement in which light sources of two different colors, red and blue, illuminate the camera target from opposite sides of the camera—at oblique angles (>50 degrees) in this example. A green light source is co-located with the camera. The camera in FIG. 11 is an RGB camera, including a 2D CMOS sensor overlaid with a color filter in a Bayer pattern. Its raw output includes red-filtered pixels, green-filtered pixels, and blue-filtered pixels. Three distinct monochrome (greyscale) images are thereby formed by corresponding pixels from the sensor array—one depicting the waste stream in the red part of the visible light spectrum, one depicting the waste stream in the blue part of the spectrum, and one depicting the waste stream in the green part of the spectrum.

The FIG. 11 arrangement shows the light sources arrayed along the direction of conveyor (waste stream) movement. In an alternative embodiment, the light sources are positioned across—rather than in line with—the direction of conveyor movement. In still other embodiments, a first pair of red/blue light sources is positioned along the direction of conveyor movement (as shown), and a second pair is positioned across the direction of movement. The pairs of light sources are activated for alternate frames of image capture by the camera (which may be capturing frames, e.g., at 60 or 150 frames per second). One frame is illuminated by in-line red/blue light sources, and the next frame is illuminated by cross-wise red/blue light sources, etc. Each frame is illuminated by the green light source.

Each of the resulting image frames is analyzed for watermark data—looking both for printed label watermarks and plastic watermarks. In some embodiments, a fourth image frame is produced by computing a difference between red and blue pixel values in each Bayer cell. The resulting difference values can be divided in half, and summed with an offset value of 128, to ensure that elements of the difference image are within a 0-255 range. This difference image, too, is processed to decode any printed label or plastic watermark that is present. Such arrangement in shown in FIG. 13.

Figure 13:
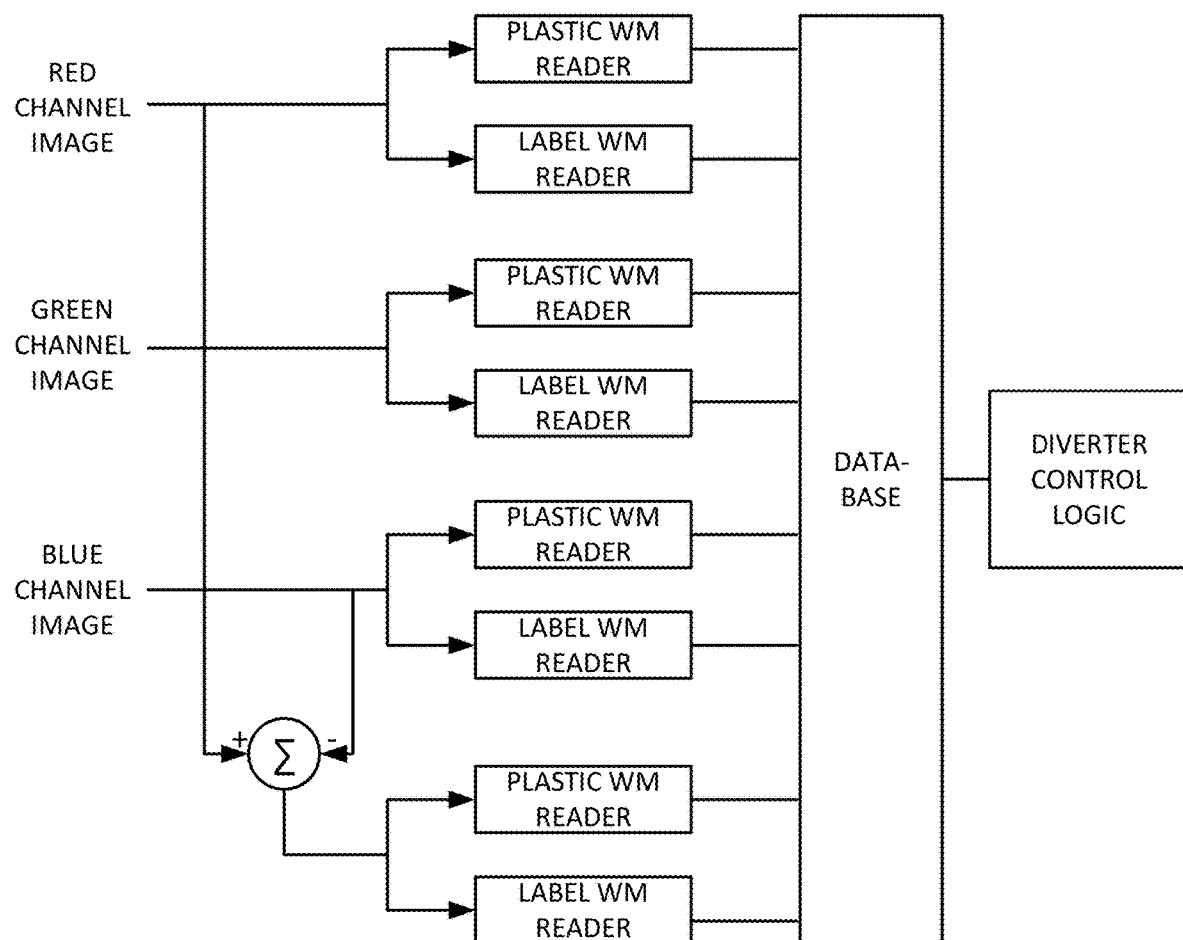
FIG. 13 details certain of the processing performed in an illustrative recycling apparatus.

While eight distinct watermark reading systems are shown in FIG. 13, certain of the image processing may be consolidated, with results shared between the label- and plastic-reading watermark systems. For example, each red frame of data may be FFT'd by a common FFT stage, and the results used in both label- and plastic-reading (synchronization). However, if resolutions of the two watermarks are different (e.g., 150 and 250 WPI), then entirely separate processing paths may be preferred.

In one particular embodiment, images are captured with an F/8 lens, with an exposure interval of 20 microseconds. The imaging distance is set so that each captured pixel corresponds to an area of about $\frac{1}{150}$ inch in a focal zone positioned three inches above the conveyor. Thus, each pixel corresponds to a single waxel at 150 WPI. The camera gain (or the distance from the light source to the conveyor) is adjusted so that a pure white item on the conveyor is depicted with captured 8-bit pixel values of 250.

The effective dynamic range of the imaging system can be extended by employing zones of different illumination intensity. A normal intensity zone can be illuminated as just-described, so that a white target produces camera pixel values of 250. An adjoining, high intensity zone can be illuminated with twice that intensity, or greater. So-doing over-exposes light areas, but dark items can then be resolved with better luminance gradations (i.e., contrast enhancement). For example, watermark patterning on a dark printed label that might appear as pixel values in the range of 5-10 in the former illumination conditions can appear with an extended range, such as 10-20 (or even 50-100), in the latter illumination.

In one particular implementation, such lighting variation is a design parameter of the lens on a single light source. For example, a linear array of LEDs may be equipped with a linear lens that projects a pattern of varying intensity—with the high intensity zone in the center, bordered by normal intensity zones on either side. As the conveyor moves items through the projected light, each point on the item first passes through the normal intensity zone, and then passes through the high intensity zone, and then passes through another normal intensity zone. Depending on the conveyor speed, frame rate, and illumination area, each point on the item may be imaged once, twice or more as it passes through each of these zones.

In another arrangement, two or more different light sources can be employed to provide higher- and lower-intensity light zones, with similar effect.

Figure 12:
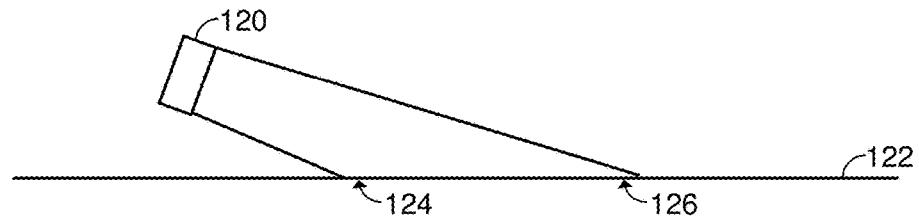
FIG. 12 shows an arrangement providing variable illumination, to effect contrast enhancement.

In still another arrangement, depicted in FIG. 12, a linear light source 120 (shown in side view) that is designed to output a substantially homogenous intensity across its illumination area, is tilted relative to the conveyor 122, so path lengths from the light to different regions of the belt are different. In such case, the fall-off of illumination with distance yields a gradation effect, with a region 124 of the conveyor nearest the light being intensely illuminated, and regions more removed 126 being progressively less-intensely illuminated.

In a particular embodiment, a captured image frame spans both the more-brightly, and more-dimly, illuminated regions on the belt. In a first single frame, a bright area on an item will be over-exposed, while a dark area will be contrast-enhanced. In another single frame, the bright area will be properly-exposed, while a dark area will be relatively under-exposed. The decoder will tend to ignore the over-exposed region(s), as it does not have the variation in pixel values that can serve as a clue to selection of a patch for analysis, so no such patch will be analyzed. The decoder will likewise tend to ignore the too-dark region(s), for also lacking pixel variations. Thus, in a sequence of frames depicting a single item as it passes through the variable illumination, a darker region will tend to be analyzed from one frame (when it falls in the brighter illumination) and not in another (when it falls in the dimmer illumination). Similarly, a lighter region will tend to be analyzed in one frame (when it falls in the dimmer illumination) and not in another (when it falls in the brighter illumination).

In another arrangement, red light and white light sources are used. The red light source(s) and white light source(s) can illuminate a common area, or they can illuminate overlapping or adjacent areas. All such illuminated areas can be within the field of view of a common imaging camera.

In still other arrangements, polarized light is used for illumination. Additionally, or alternatively, one or more polarization filters can be used at the image sensor, to attenuate light of an orthogonal polarization.

In many applications, glare—a specular reflection of light from a surface—is a hindrance. In certain embodiments of the present technology, in contrast, such specular reflections can be important in signaling watermark information. Rather than filtering-out glare, polarizing filters can be used to accentuate signal-conveying glare.

Some embodiments of the present technology employ novel image sensors with polarizing filter arrays. An example is the Sony Polarsens image sensor. The pixel array is overlaid with a spatially-corresponding polarizer array, comprised of four different angled polarizers (90°, 45°, 135° and 0°). An image frame consisting just of data from the 90° polarized sensors can be analyzed for watermark data. Likewise for each of the other three polarization states. Moreover, differences can be computed between, e.g., the 90° "image" and the 45° "image," etc., and such difference images can likewise be analyzed for watermark data.

This Sony sensor is available in a variety of configurations. The IMX250MZR is illustrative. It is a monochrome CMOS sensor, with 2464×2056 pixels. A color counterpart is the Sony IMX250MYR.

Once a plastic item has been identified, it can be routed from the conveyor into appropriate receptacles, or onto further conveyors, by known means, such as solenoid-operated plungers, stepper motor-controlled arms, forced air jets, etc. Exemplary separation and sorting mechanisms are known to the artisan, e.g., from patent publications U.S. Pat. Nos. 5,209,355, 5,485,964, 5,615,778, US20040044436, US20070158245, US20080257793, US20090152173, US20100282646, US20120168354 and US20170225199. These mechanisms are here-referred to as "sorting diverters," or simply "diverters" for short, and their operation is controlled in accordance with the type of plastics identified.

Figure 14:
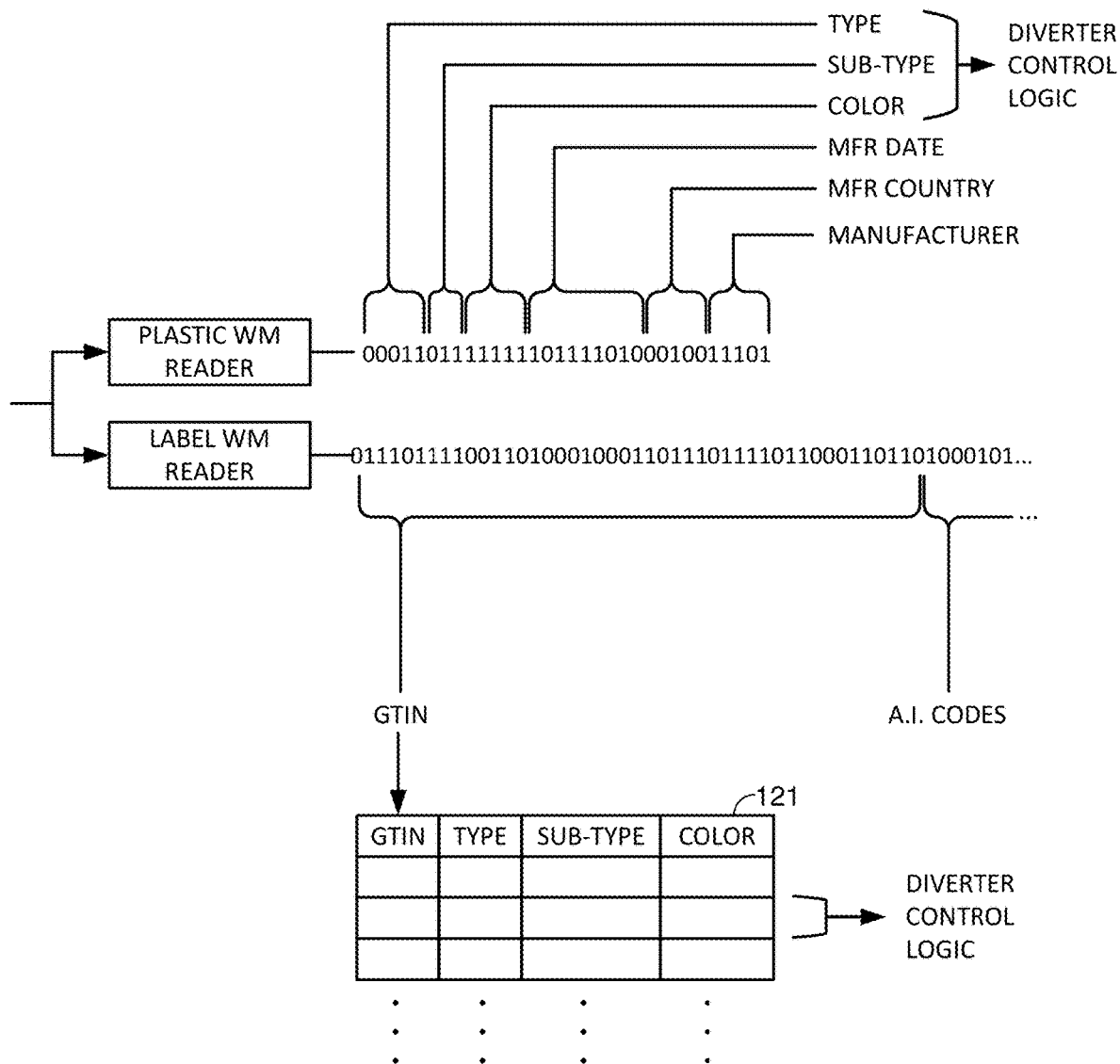
FIG. 14 provides still further details about the illustrative recycling apparatus of FIG. 13.

FIG. 14 more particularly details some of the data that is involved.

In the depicted embodiment, each plastic watermark conveys a payload of 32 bits. This payload can be segmented into various fields. One field identifies the type of plastic by class (e.g., ABS, EPS, HDLPE, HDPE, HIPS, LDPE, PA, PC, PC/ABS, PE, PET, PETG, PLA, PMMA, POM, PP, PPO, PS, PVC, etc.). Another identifies a sub-type of the plastic, e.g., by its average molecular weight, solution viscosity value, or recommended solvent, or by whether the plastic is used as a food container or a non-food container. A third field identifies a color of the plastic. (Color can be optically sensed, sometimes. However, plastic consumer packaging increasingly includes a printed shrink sleeve over the container, concealing its color.) A fourth field identifies a date the plastic was manufactured, e.g., by month and year. A fifth identifies a country of manufacture. A sixth identifies a manufacturing company. More or fewer fields can naturally be used.

Additional fields include whether packaged food (vs. non-food), whether multi-layer (vs. mono-layered), and whether compostable (vs. only recyclable). Some fields convey an index or flag (yes/no) value. If needed, each index value can be resolved into a literal text, date string, or value (or range of values) by reference to a data structure, such as a table or database.

In an illustrative embodiment, the sorting diverters are responsive to the first three fields of data, serving to separate the plastic by type, sub-type and color. All of the decoded watermark data are logged to provide statistics about the waste stream being processed.

The printed label payload typically conveys a longer payload, e.g., 48 or 96 bits. The contents can vary by item, but each usually starts with a GTIN, and may be followed by one or more Application Identifier key value pairs (e.g., indicating expiration date, lot code, item weight, etc.). In some arrangements, none of the payload expresses the type of plastic used in the item container.

To determine the plastic type, a data structure 121, such as a table or database, can be used. It serves to associate item GTINs with corresponding information about the plastic used for the item containers. That is, the data structure is queried with a GTIN identifier decoded from the printed label watermark payload, and the system thereby accesses previously-stored data identifying the plastic type, sub-type and color (if available) for the product having that GTIN. This plastic material information is provided to the logic controlling the sorting diverters, as is done with data from the plastic watermark.

From the foregoing, it will be recognized that a technical problem with the prior art was assuring reliable reading of a GTIN label watermark on product packaging presented to a point of sale scanner, within the limited time and processing constraints of such environment. A technical effect of the detailed arrangement is enabling such packaging to convey a second watermark, to facilitate recycling, without impairing the reliable reading of the GTIN label watermark at the point of sale scanner, due to differences in the signaling protocols used in the two watermarks.

A further technical problem was assuring reliable optical reading of watermark data from items in a fast-moving waste stream. In some embodiments, reliability is enhanced by the imaging apparatus used to capture depictions of items in the waste stream. In some embodiments, reliability is enhanced by the shape of texture markings applied to surfaces of plastic containers within the waste stream.

It will be recognized that the present technology can be utilized in waste sorting systems of the sort sold by Pellenc ST, MSS Inc., Bulk Handling Systems, National Recovery Technologies LLC, Rofin Australia PTY, Ltd., Green Machine Sales LLC, EagleVizion, BT-Wolfgang Binder GmbH, RTT Steinert GmbH, S+S Separation and Sorting Technology GmbH, and Tomra Systems ASA. The optical sorting employed in such machines (e.g., based on near infrared- or visible-spectroscopy, based on the different absorption spectra of different plastics, etc.) can be replaced with the present technology, or the present technology can be used in conjunction with these other methods.

Block Analysis

In one illustrative embodiment, a conveyor belt is spanned by an array of cameras, each of which provides image frames at rate of 150 per second. Each frame measures 1280×1024 pixels, and spans a field of view measuring about 8×6 inches on the conveyor belt. Analysis blocks are arrayed across each captured image, and each block is analyzed for watermark clues, such as a watermark reference signal. If a watermark reference signal is found, it is used to identify the pose of the watermarked object on the conveyor belt (e.g., using the technology detailed in U.S. Pat. Nos. 9,959,587 and 10,242,434). Using the pose information, the image is re-sampled in the region where the reference signal was detected, to extract waxel data, which is then provided to a decoder which seeks to extract a watermark payload.

While this specification commonly refers to processing blocks or patches of imagery measuring 128×128 pixels (or waxels), applicant has discovered that the detailed arrangements are often better served by processing smaller sets of data, such as 96×96, 88×88, 80×80, 64×64, etc. (Due to the curvature and crushing of items found in waste streams, not many planar surfaces are present. Yet geometric synchronization typically proceeds on an assumption of planarity. This is believed to be a reason that processing small patches of imagery can yield superior results, i.e., so that the non-planar effects of physical distortions are minimized.) Thus, the reader should understand that references to 128×128 in connection with watermark reading operations are exemplary only, and that smaller data sets are contemplated and are often preferred. (Watermark encoding, in contrast, may nonetheless be performed on the basis of a 128×128 block size, yet decoding can extract the watermark payload from analysis of smaller image blocks. Or encoding can likewise proceed based on smaller blocks.)

Figure 15:
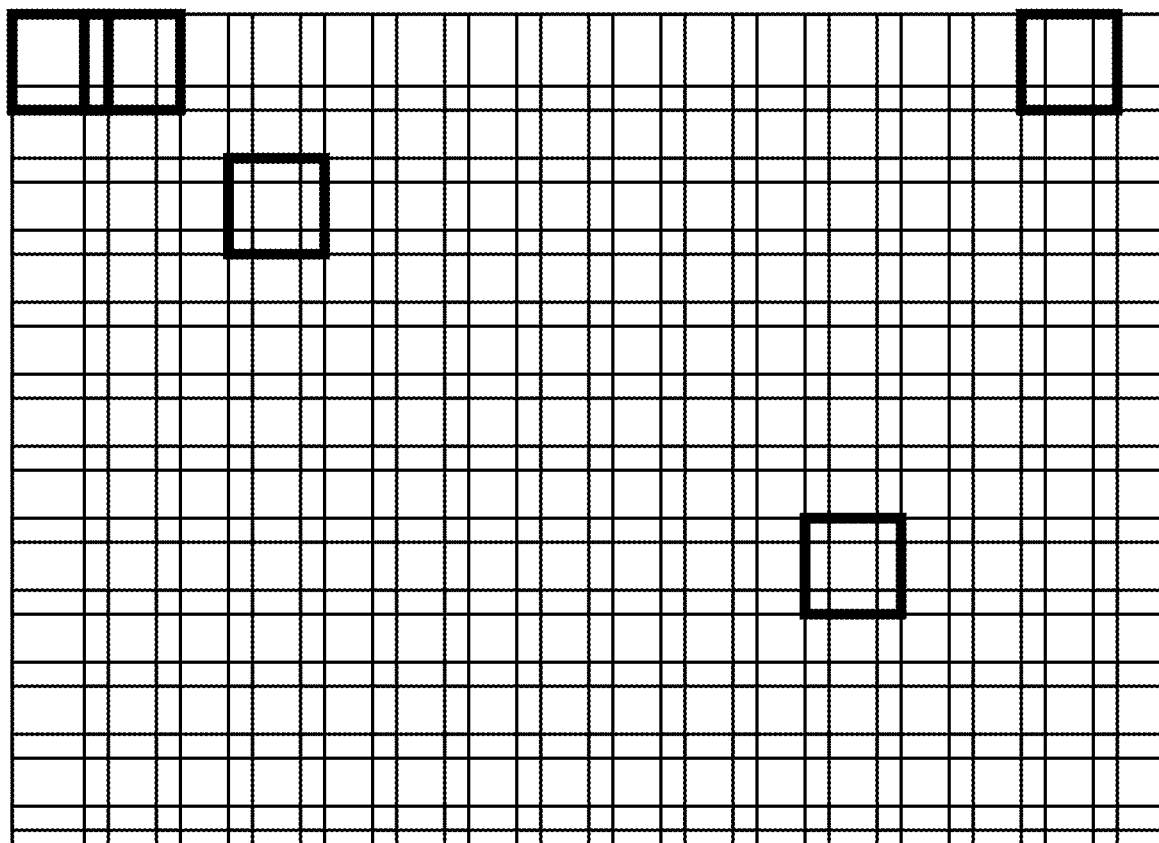
FIG. 15 shows blocks arrayed in overlapping fashion across an image frame, employed in certain embodiments of the technology.

The analysis blocks arrayed across each image frame for watermark reading may be uniformly or randomly spaced-apart, or tiled edge-to-edge, or overlapping (e.g., with each block overlapping its immediate neighbor by 20%-80%). FIG. 15 shows an exemplary block pattern, in which a 1280×1024 image frame is analyzed using 96×96 pixel blocks, with each block overlapping its neighbors by 25%. A few blocks are shown in bold, since the tiling pattern makes the boundaries of individual blocks ambiguous.

Figure 16:
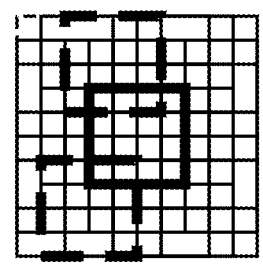
FIG. 16 shows a dense cluster of neighboring blocks that are each analyzed when a watermark signal is found in a block, in certain embodiments of the technology.
Figure 17:
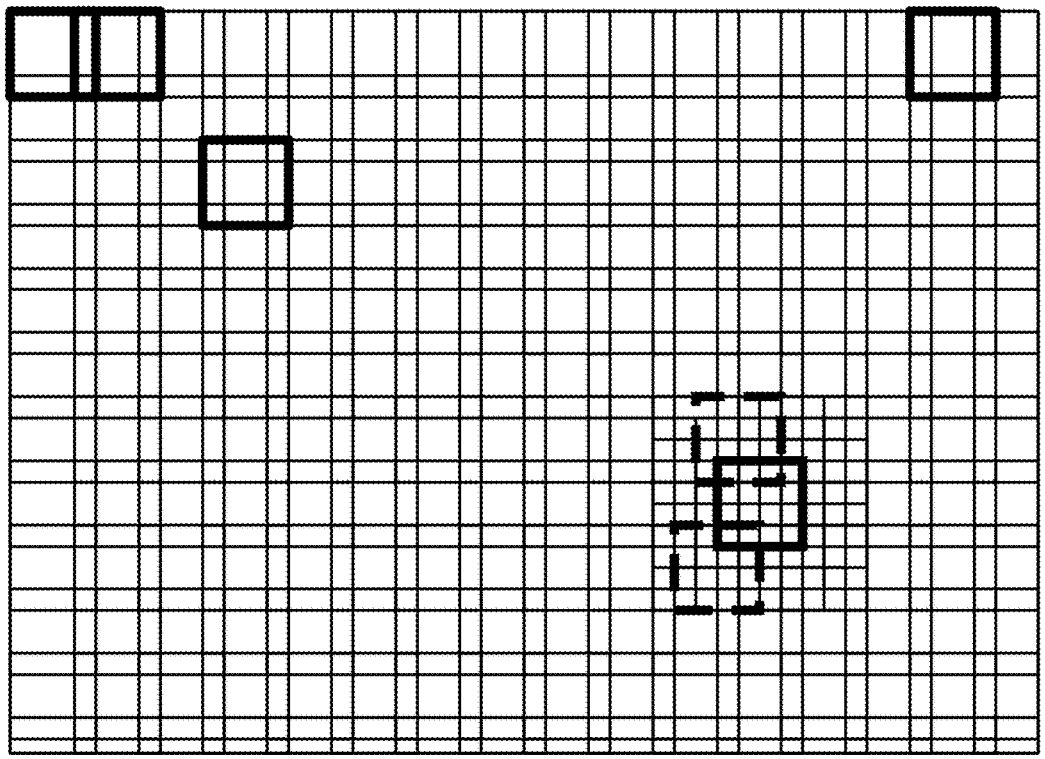
FIG. 17 shows the dense cluster of FIG. 16 in the context of the image frame of FIG. 15, positioned where one of the blocks was found to include a reference signal.

In some embodiments, if a watermark reference signal or other clue (e.g., as detailed below) is found in one of the analysis blocks, then a more dense cluster of analysis blocks is examined in that same neighborhood for reference signals and, if successful, then analyzed for payload data. FIG. 16 shows an example. The original block is shown in bold lines at the center. Further blocks are arrayed around it with 75% overlap (omitting block locations that were analyzed in the original array of block locations). Again, a few of the blocks are shown in dashed-bold for clarity's sake. FIG. 17 shows this area of more densely-placed blocks in context, in the frame of FIG. 15—located where a watermark reference signal or other clue was found among the originally-examined blocks.

In some recycling systems, the conveyor belt is empty in places, with no item present in part of the camera view. Clues about the presence or absence of such gaps can be detected, enabling processing resources to be applied to more promising imagery. Similarly, watermark processing of captured imagery may be triggered only when a quick assessment of the imagery finds a clue indicating plastic may be present (or indicating that something other than the conveyor belt is depicted).

Plastic is often characterized by regions of specular reflection, or glare, as the plastic surface mirror-reflects incident illumination towards the camera. This glare can be sensed and can serve as a clue to activate (trigger) watermark processing. For example, multiple blocks within an incoming sequence of image frames (e.g., at 150 frames per second) can each be analyzed for a 2×2 pixel area in which the pixel magnitude is in the top 5%, 10% or 20% of the sensor's output range (or within similar percentiles of historically-sensed pixels from previous blocks depicting that region of the conveyor belt). Any frame meeting this criterion is analyzed for watermark data. (Desirably, more than just an image excerpt near the glare is analyzed, since the plastic may extend far beyond such point.)

Figure 18:
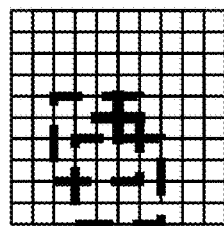
FIG. 18 shows a dense cluster of neighboring blocks that are each analyzed when a glare region is detected in an image frame, in certain embodiments of the technology.

In one particular embodiment, no part of a frame is processed until a glare pixel is detected. When this event occurs, analysis of the full frame is not triggered. Rather, a 7×7 array of overlapping pixel blocks is positioned based on the glare spot, and each of these blocks is analyzed for the presence of a watermark reference signal. The blocks may overlap by 50% or more of their width, i.e., more than the usual block overlap. FIG. 18 shows an example, in which blocks overlap by 75% of their width. The glare spot is identified by the "+" mark in the middle of the densely-overlapping blocks. Again, a few blocks are particularly identified by bold dashed lines, since the boundaries of the component blocks are not otherwise clear.

In addition, or alternatively, metrics other than glare are employed for determining that imagery likely merits watermark processing.

One method, termed a block trigger method, provides a clue that helps discriminate empty and not-empty portions of conveyor belt, based on comparison of incoming pixel values to historical norms.

One particular block trigger algorithm compiles a histogram of pixel values selected from sub-blocks within an analysis block (such as within one of the bolded blocks in FIG. 15), over many captured image frames. Each block may be 96×96 waxels (pixels, at scale=1). The block is logically divided into a 4×4 array of sub-blocks, each 24 waxels on a side (i.e., 16 sub-blocks per block, each comprising 24^2 or 576 pixels). Values from a randomly-selected but static 25 pixels from each sub-block are averaged together to yield one average pixel value per sub-block (i.e., having a value between 0 and 255 in 8-bit greyscale). A new such sub-block average pixel value is produced for each frame. 256 of these average pixel values for a particular sub-block are eventually compiled in a histogram (i.e., over 256 frames). These values show a tight peak corresponding to the average pixel value for empty conveyor belt, at the belt location corresponding to that particular sub-block (and with its particular lighting).

When a new frame is captured, values are again computed for the 16 sub-blocks within the block. Each value is judged against the histogram for that block. If the new value is within a few digital numbers (e.g., 1, 2, 3 or 4) of the pixel value where the histogram shows its sharp peak, then this counts as a vote for the conclusion that the sub-block imagery depicts an empty belt. The 16 votes thereby produced, for the 16-sub-blocks of the block, are tallied. If a threshold number of votes (e.g., 11 of the 16) conclude that the sub-block imagery depicts an empty belt, then the block is concluded to depict an empty belt. In such case, analysis of the block is skipped. Else, the block is analyzed for watermark data.

This process is performed for all the blocks within the camera view (e.g., all the blocks shown in FIG. 15), for each frame.

(If imagery is captured at a finer resolution, i.e., with more than 1 pixel per waxel, then the 25 values from each sub-block can be determined by sub-sampling, e.g., by averaging values of four or nine of the finer pixels near the 25 static locations. Alternatively, the value of the single fine pixel closest to each of the 25 static locations can be employed.)

Figure 19:
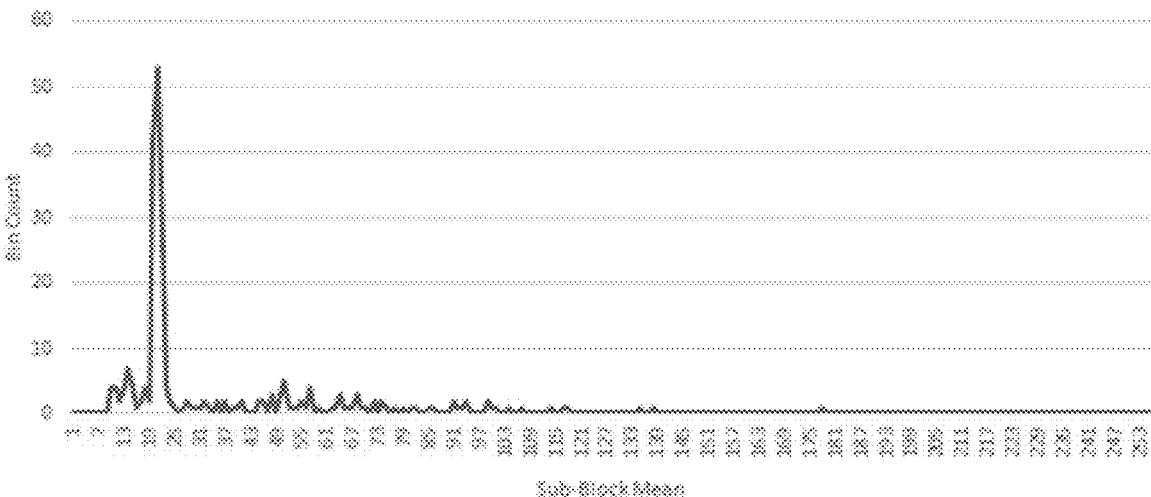
FIG. 19 shows a sub-block histogram used in one method for triggering block analysis.

FIG. 19 shows an illustrative histogram for one exemplary sub-block, after 219 frames have been processed. The x-axis shows average pixel values for different frames, computed for that sub-block. The y-axis shows the count of frames having different average pixel values for that sub-block ("bin count"). The histogram peaks at 20. In relevant part, the associated bin counts for different average pixel values are as follows:

| Average Pixel Value | Frame Count |
| --- | --- |
| ... | ... |
| 17 | 4 |
| 18 | 2 |
| 19 | 42 |
| 20 | 53 |

-continued

| Average Pixel Value | Frame Count |
|---|---|
| 21 | 35 |
| 22 | 4 |
| 23 | 2 |
| ... | ... |

When the next frame of imagery is captured, if the average value computed from the 25 static pixel locations in this sub-block equals 18, 19, 20, 21 or 22 (i.e. the peak value of 20, +/−2), the sub-block is regarded as depicting empty conveyor belt. If 10 other of the 16 sub-blocks of that block agree, then this is taken as a clue that the block depicts empty conveyor belt. As a consequence, no watermark processing is performed on that block. Alternatively, if such a consensus do not agree, then this serves as a clue that a plastic item may be depicted by the block, and further processing is triggered.

Each histogram is kept fresh by periodically discarding data, to make room for more data. For example, when a frame counter associated with a histogram indicates that 256 frames have been processed, and 256 average values for the sub-block populate the histogram, the histogram contents are thinned by half, to 128 values. This can be done by taking the bin count for each average pixel value in the histogram and dividing by two (rounding down). The frame counter is reset accordingly, i.e., to 128 frames. Counts of average pixel values from the next 128 frames are then tallied in the histogram, at which time the thinning repeats. By this arrangement, historical pixel values decay exponentially in significance, allowing the histogram to reflect most recent data.

With each newly-captured frame, this block-trigger method provides a clue as to whether to trigger a watermark reading operation, for every block location in the frame. The average pixel values derived from the newly-captured frame serve to update corresponding histograms for use in evaluating blocks in following image frames.

(It will be recognized that watermark reading can be triggered if sufficient sub-blocks have average pixel values above (brighter) and/or below (darker) than the histogram peak (i.e., the recent belt luminance). That is, a plastic object may include regions of dark, as well as light, pixels. Both help inform the triggering decision.)

A related technique proceeds similarly, but is based on statistics of color distribution, rather than luminance distribution.

In a preferred implementation of the block trigger algorithm, if further analysis of a block is triggered, and the analysis detects a watermark reference signal (or decodes a watermark payload) from that block, then the average sub-block pixel value data for that block are not added to their respective histograms (or, if earlier-added, such counts are removed). This way, the histograms aren't tainted by data from imagery that is known not to depict empty conveyor belt.

Many recycling systems set a limit on the number of image blocks that can be analyzed during processing of each frame—a processing budget. For example, the limit may be 200 blocks. A fraction of this total, such as 50-75 blocks, may be reserved, for analysis of blocks placed densely around any block from which a watermark reference signal or other clue is detected (e.g., as discussed above with connection with FIGS. 15-17). If clues are detected from several blocks, so that dense placement of further analysis blocks will exceed the 200 block limit, then further blocks can be allocated in accordance with the values of the clues (e.g., the strength of detected watermark reference signals), with the blocks that look most promising getting the largest allocation of neighboring analysis blocks.

If not all 200 blocks are analyzed each frame, electricity consumption drops, and heat output from the computer processor(s) (heat output that often must be offset by air-conditioning) also drops.

In a variant block trigger method, the full processing budget (e.g., of 150 block analyses) is spent each frame. Some block analyses are triggered as described above, i.e., because 11 of 16 sub-blocks (or, more generally, K of L sub-blocks) have average pixel values (over 25, or more generally N, selected pixels) within a few digital numbers of the peaks of their respective histograms. Any remaining analysis blocks are then allocated in accordance with the differences between the noted average sub-block pixel values and peaks of respective histograms, summed over all 16 sub-blocks of a block. Those blocks having the smallest aggregate differences are triggered for watermark analysis, until the full budget of 150 analysis blocks is reached.

Some systems enable such variant method, automatically or manually, when the load of material on the conveyor belt exceeds some threshold. In extreme cases, the conveyor belt may be almost wholly obscured—for intervals of hundreds of consecutive frames—by covering objects. In this case, prominent peaks associated with the background belt luminances will not emerge from the histograms. But each histogram will nonetheless have a peak somewhere. This variant block trigger method will employ the noted procedure to allocate the full budget of analysis blocks to the image frame. In effect, this results in a largely-random selection of blocks for analysis. But since the belt is evidently crowded with objects, this is not an unreasonable block selection strategy.

Other clues for discerning that imagery likely merits watermark processing employ image statistics, such as mean, standard deviation, and/or variance.

Figure 20:
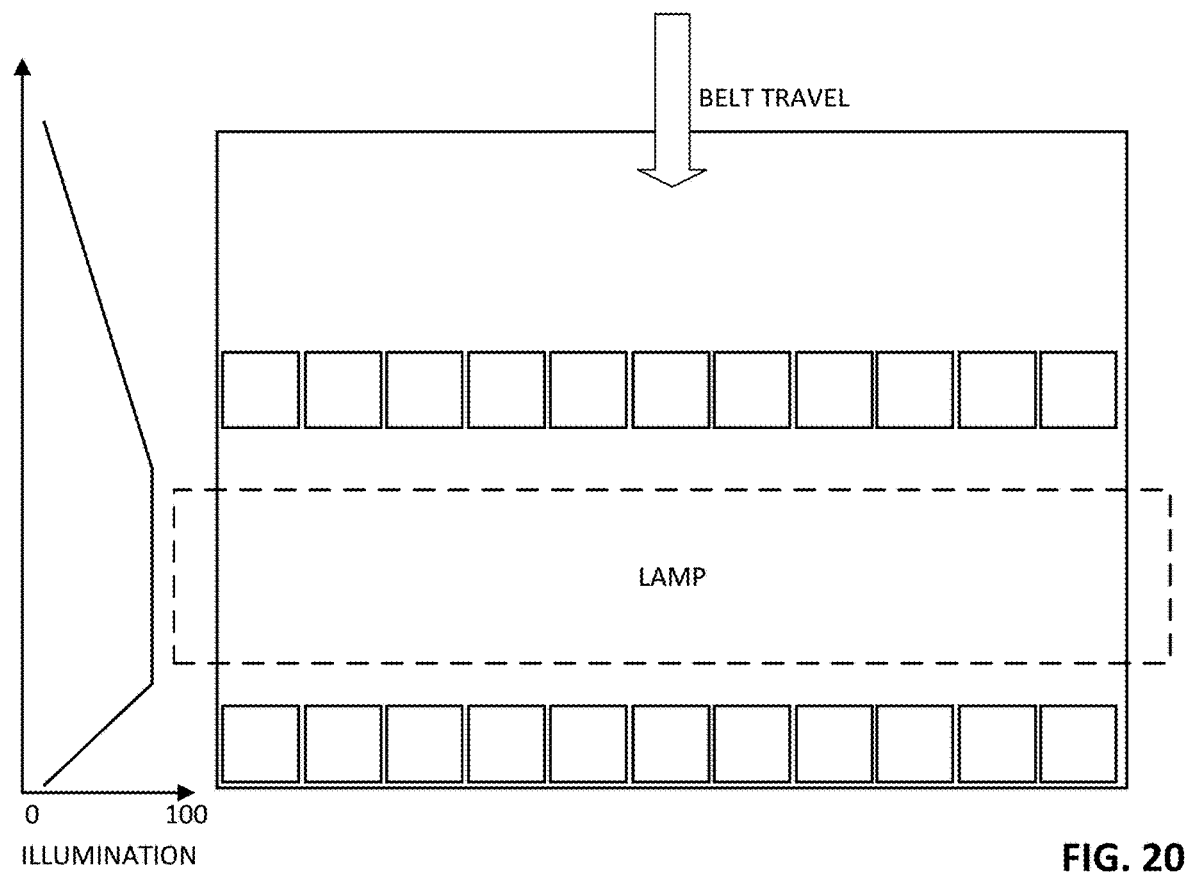
FIG. 20 helps illustrate a different method for triggering block analysis.
Figure 21A:
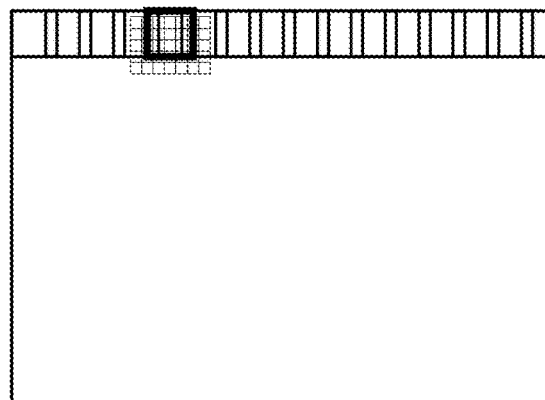
FIG. 21A shows blocks arrayed along an entry side of an image frame, and a dense cluster of neighboring blocks positioned where one of the entry blocks detected a watermark reference signal, as may occur in certain embodiments of the technology.
Figure 21B:
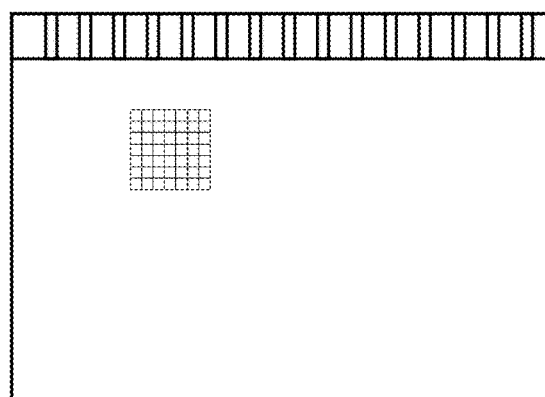
FIG. 21B shows a frame captured shortly after the FIG. 21A frame, with the cluster of analysis blocks having progressed down the frame, in correspondence with conveyor movement.
Figure 21C:
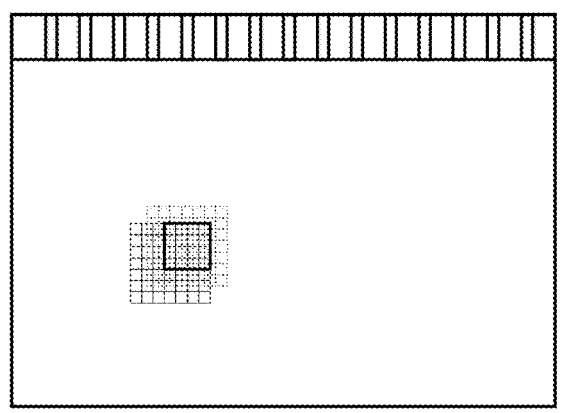
FIG. 21C shows a frame captured shortly after the FIG. 21B frame, showing detection of a watermark reference signal, which spawns a second cluster of blocks.
Figure 21D:
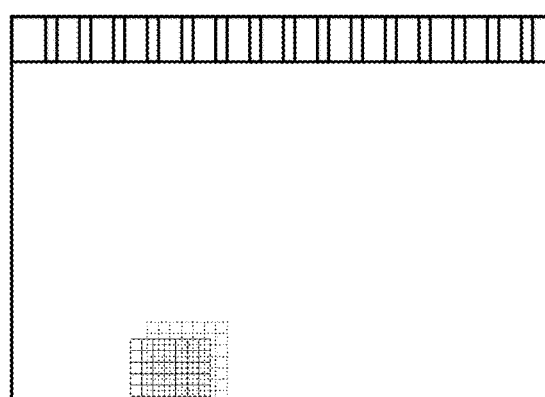
FIG. 21D shows a frame captured shortly after the FIG. 21C frame, showing the two clusters of analysis blocks having progressed further down the frame, in accordance with conveyor movement.

FIG. 20 shows, by the large rectangle, an image frame field of view that spans a conveyor. The dashed rectangle shows the positioning of a linear LED light source that also spans the conveyor. Due to orientation of the light source, or its lens (or reflector), the illumination has a spatial intensity profile as shown by the chart immediately to the left—showing maximum intensity in the region of the lamp, falling off sharply in one direction, and less-sharply in the other (on a scale of 0-100).

Arrayed across the direction of belt travel are plural strips of image blocks, each, e.g., 128×128 pixels in size. Only two rows are shown in the diagram, but similar strips span the image frame. Adjoining strips are often illuminated differently, due to the lamp's illumination profile.

(While the blocks are non-adjoining and non-overlapping in FIG. 20, this is for illustrative clarity. In actual practice, the blocks are commonly adjoining or overlapping.)

A metric is derived from each of these blocks in each strip, and is used as a clue to determine similarity of the image block to imagery depicting empty belt.

In an illustrative embodiment, a feature value f is computed for each block and used to identify regions that merit further watermark analysis. In general, f(•) is a function of each pixel in a block. An initialization phase is performed while the belt is moving but empty, e.g., when the sorting system is initially powered-on. Feature values f are calculated for each block over multiple frames, and the values are grouped by strip. For each strip, a population mean and standard deviation are estimated from the corresponding group of sample feature values obtained over the multiple frames.

When a new image frame is thereafter captured, feature values are calculated for each block in the new frame. For each feature value, a normalized feature value is calculated, using the previously estimated mean and standard deviation values for the strip containing the block from which the feature value was calculated. The normalized feature value is calculated as $$f_N = \left| \frac{f - \mu}{\sigma} \right|,$$

where $\mu$ and $\sigma$ are the estimated mean and standard deviation, respectively. If a feature value has a Gaussian or Generalized Gaussian distribution for regions containing the belt, the normalized feature will have a monotonic decreasing probability distribution; smaller values will be more likely than larger values. These normalized feature values yield a first metric indicating how similar (or dissimilar) the new block is compared to empty belt data in that region. Smaller values indicate more similarity to empty belt data. Larger values indicate more dissimilarity. The largest values indicate blocks that are the best candidates for watermark reading, as they are most dissimilar from the empty belt.

The normalized feature metric values are sorted, largest to smallest, to identify the blocks with the best prospects for depicting watermarked objects. This establishes a priority order for watermark reading. If the system processing budget permits analysis of 150 blocks per frame, then data from the 150 blocks having the highest first metrics are routed for watermark processing.

Different underlying features f can be used, with different resulting effectiveness in watermark processing. Illustrative embodiments include block mean and block standard deviation.

The effectiveness of a specific feature in distinguishing image blocks containing belt-only pixels from other image blocks depends on the conditional distribution of the feature for these two classes of blocks. For some non-belt image blocks, feature $f_A$ may not be useful in distinguishing the block from belt blocks, while feature $f_B$ may do a good job of distinguishing the block. For other non-belt blocks, the situation may be reversed, and $f_A$ might be the preferred feature. This leads to an additional class of embodiments that make use of multiple features.

In multiple feature embodiments, separate sets of mean and standard deviation estimates are calculated for each feature in the initialization phase, and a corresponding normalized feature value is calculated for each feature of each block in a new image frame. Normalized feature values are combined into a single metric value using a combination function. The resulting combined metric values are sorted, and the sorted list of metric values forms a priority list for watermark processing.

One example of a combination function is the sum of the normalized feature values. Other embodiments include more complicated functions, e.g., derived from statistical analysis of the normalized feature distributions for the two classes of belt and non-belt blocks. Polynomial equations combining the feature values are used in some implementations. Additional embodiments may have combination functions that vary by image strip, to take advantage of the fact that different image strips may result in different normalized feature distributions.

It will be recognized that the just-described arrangements always make full use of the full system processing budget. If the system budget allows for analysis of 150 blocks per frame, then 150 blocks are analyzed each frame. (As before, there may be a reserve budget of additional blocks that can be allocated based on processing results from the first 150 blocks.)

The foregoing arrangements may be regarded as species of classifiers, i.e., classifying whether imagery likely depicts a belt (or glare from plastic) or not. Many other species of classifiers can be used to provide clues by which watermark processing can be controlled.

One such alternative employs a neural network, trained to classify an image frame (or portion) as depicting either (a) only belt, or (b) something other than only belt, by training the network with a large corpus of labeled images, variously showing images of one class or the other. Suitable networks and training methods are detailed in patent publications 20160063359, 20170243085 and 20190019050, and in Krizhevsky, et al, Imagenet classification with deep convolutional neural networks, Advances in Neural Information Processing Systems 2012, pp. 1097-1105. Additional information is detailed in copending application Ser. No. 15/726, 290, filed Oct. 5, 2017 (now U.S. Pat. No. 10,664,722).

If the image, or image patch, is determined to likely depict only conveyor belt, then no further analysis of such imagery is undertaken. (Instead, freed processor cycles can be applied to further-processing other imagery, e.g., by analyzing additional blocks, by attempting decoding using different candidate affine transforms, etc.).

A different arrangement provides clues classifying imagery depicting empty conveyor belt, and distinguishing such imagery from other imagery, by sensing characteristic belt markings. For example, conveyor belts commonly have scars, stains, and other striation patterns that are elongated in the axis of the belt travel (the belt direction). Such markings, detected in imagery, are predominantly of low frequency. Captured imagery can be low-pass filtered to reduce high frequency noise, and the resulting imagery can then be analyzed to assess the strengths of edges in different directions (e.g., by a Canny or Sobel algorithm).

In a particular embodiment, a 128×128 block of imagery is low-pass filtered, and then examined with a Canny edge detector to assess the strength of gradients running along the belt direction, and the strength of gradients running across the belt direction (e.g., by summing gradient values in vertical and horizontal image directions). If the patch depicts a belt, the sum of the former gradients will be substantially larger than the sum of the latter gradients. A logistic regressor is trained to respond to the two strength values by classifying the image patch as either depicting a belt or not. If it depicts a belt, no further analysis on such block is undertaken; if it does not depict a belt, further watermark analysis of the block can be commenced.

In other embodiments a simple ratio between the two summed-gradient measures is computed, and this value is compared against a threshold, to determine whether the image blocks depicts the conveyor belt.

Sorting machines are sometimes equipped with laser systems to detect the presence of objects. For example a laser beam may be swept across over an expanse of the belt using a rotating mirror arrangement, and serve to trigger detections along elements of a linear photodetector array on the other side. So long as each of the photodetectors detects the laser beam, the conveyor belt in the swept region is known to be empty. Such check can used to suppress analysis of captured image blocks.

A further type of clue that can trigger further watermark analysis is based on a pepper-in-salt (or salt-in-pepper) pattern metric, indicating a likelihood that a block depicts a sparse dot watermark. Exemplary algorithms for computing such a metric are described next.

An input image block is down-sampled, if necessary, so it is at scale=1. That is, each waxel is depicted with the size of one pixel. We are looking for dark pixels in a field of light—pixel outliers. However, the image contrast may be large or small, and the illumination may vary across the block. The computed metric desirably should be robust to such variables. To do this, we compute a measure that examines neighborhoods of pixels, and also takes into account sensor acquisition noise.

The acquisition noise present in captured imagery is a function of pixel values, with higher pixel values having higher noise values. A polynomial function, or a reference table, can provide a noise standard deviation value for each pixel value between 0 and 255. To identify pixels with outlier values (e.g., pixels that are relatively darkest in a field of relatively lighter pixels), a measure, sigma, is computed for a neighborhood of pixels around a subject pixel at coordinates (i,j) and having a value x, by the equation:

$$\sigma_{(i,j)} = \frac{x_{(i,j)} - \overline{N_{(i,j)}}}{S(\overline{N_{(i,j)}})}$$

where the N-bar term is the average pixel value over the neighborhood, and the S term is the standard deviation of acquisition noise for the neighborhood, based on the polynomial or the reference table data. (The best neighborhood size can be heuristically determined. Neighborhoods can be as small as 4×4, or as large as 64×64, for a 128×128 block size. An 8×8 neighborhood is exemplary. Alternatively, the neighborhood can be temporal, comprising the value of a single pixel at coordinates (i,j) throughout a series of previously-captured frames, e.g., dozens or hundreds.)

For pixels darker than the neighborhood average, this sigma value will be negative. To be regarded as a sparse mark dot, we set a darkness threshold that the sigma value must meet, e.g., $\sigma_{ij}<-3$. We produce a filtered image block that includes only those pixels for which the corresponding sigma value meets this test. All other pixels are removed (e.g., set to white, with pixel value=255).

The procedure so far identifies the darkest dots, but in so doing also includes pixels forming the darkest edges (e.g., including dark text). To focus our watermark extraction efforts only on sparse mark dots, we want to filter out pixels that are not separated from other pixels (a form of morphological filtering). Various techniques can be used for this task. A simple technique is to visit every dark pixel, examine a 5×5 pixel region centered on that image location, and count the number of dark pixels in the region. If there are more than two dark pixels in the 5×5 region, the center pixel is removed (e.g., changed to white). The resulting processed block is then comprised wholly of isolated dark dots.

Finally, this processed block is examined to count the number of dark dots remaining, within the block boundary. This count serves as a metric indicating a likelihood that the block contains a sparse watermark.

This metric may be compared to see if it exceeds an empirically-determined threshold K (e.g., K=500) to identify frames likely to depict sparse watermark data. Alternatively, blocks within the frame can be ranked based on their associated sparse metrics, and those blocks having the highest sparse metrics can then be further analyzed for watermark data, up to the block-processing budget limit.

Various simplifications and modifications can be made to this particular algorithm. For example, a simpler procedure just identifies a set of darkest pixels in the block. (For example, the darkest 10% or 30% of pixels in the block can be identified.) The procedure then applies the above-described morphological filtering and counting operations to yield a sparse metric.

Another variant arrangement discriminates potential sparse dots from not, by learning gleaned from previous image frames.

An exemplary learning process analyzes pixel values from a sampling of, e.g., 10 blocks in each frame, for a series of past frames. Each block is divided into sub-blocks, e.g., of 5×8 pixels. For each analyzed sub-block, both the mean pixel value and the minimum pixel value are determined.

In some sub-blocks, the minimum pixel value will be that of a dark sparse dot. Other sub-blocks don't include a sparse dot, so the minimum pixel value will simply be the lowest-valued pixel among image content that is not a sparse dot (e.g., background imagery, an item marked with a continuous-tone watermark instead of a sparse watermark, etc.).

From these collected statistics, we identify the largest of the minimum pixel values (the "max-minimum"), for each associated sub-block mean value. For example, if we consider all sub-blocks that have a mean pixel value of 151, we may find that the largest of the minimum pixel values encountered in the analyzed series of frames is 145. Any pixel value larger than 145 is pretty-assuredly not a sparse mark dot, in a sub-block having a mean value of 151. This value, and other values similarly observed, can thus help establish a threshold to discriminate potential sparse mark dots (outliers) from not-potential sparse dots.

In one particular embodiment, we describe the set of all such points by a best-fit line, characterized by a slope and offset, e.g.:

$$\tau_{Outlier} = 0.96 * \mu - 1.6$$

where μ is the mean pixel value for a sub-block.

Thereafter, when a new frame of imagery is received, we compute the mean value of each 5×8 pixel sub-block, and determine the applicable outlier threshold by the best-fit line equation. Any pixels in the sub-block having values smaller than this threshold are identified as candidate sparse dots. (E.g., if a sub-block has a mean pixel value of 82, we treat all pixels in that sub-block with pixel values of 77 and less as candidate sparse dots.) We then apply the morphological filter across the block to discard connected dots, as described earlier, and then count the number of dots remaining in the block, yielding the sparse metric. As before, this metric can be tested against a threshold to identify blocks that merit watermark processing. Alternatively, all blocks in the frame can be ranked according to this metric, and be selected for processing on that basis—until the block-processing budget is reached.

In alternative embodiments, the above-detailed processes can be altered to generate a metric based on bright pixels in a dark field (i.e., salt-in-pepper). One such alteration simply inverts the image block, dark-for-light, before performing one of the just-described algorithms.

Some recycling systems may look for multiple clues in deciding which blocks to watermark-analyze. For example, block trigger clues may first be obtained for all blocks in an image frame, to identify blocks depicting only conveyor. The remaining blocks can then each be assessed to determine a sparse metric, as just-described, to evaluate which of the non-conveyor-depicting blocks is most promising for watermark analysis.

As items are moved by the recycling system conveyor, they pass the camera(s) in linear fashion, entering the field of view from one side of the camera sensor, and departing from the other. Once a clue indicating an image block depicting non-empty conveyor belt has been sensed in one frame, e.g., as detailed above, then imagery can be analyzed not only in the current frame, but imagery depicting successively-displaced regions in the camera field of view can also be analyzed in the N frames that follow. N is a function of the camera frame rate, the belt speed, and the span of the camera's field of view. For example, if the camera's field of view is 15 inches, and the conveyor is moving 10 feet per second, then any item on the conveyor should be in-view for an eighth of a second, as it travels through the camera's field of view. If the camera captures 60 frames per second, then N can be set for 6 (i.e., corresponding blocks in seven total frames are analyzed).

In one particular embodiment, an array of overlapping analysis blocks is positioned along the side of the camera field of view at which objects first enter, and each of these blocks is analyzed, every frame, for a watermark reference signal. If a reference signal or other clue is found within any of these blocks, such detection spawns further analysis of an overlapping cluster of blocks, as described earlier, centered on the detecting block. This cluster is progressively advanced across the field of view, frame to frame, in accordance with the speed of the conveyor belt.

FIGS. 21A-21D illustrate such an arrangement. A line of blocks is analyzed at the item-entry side of each image frame. (Blocks in the interior of the frame may normally not be analyzed.) A watermark reference signal or other clue is discerned in one of these edge blocks (shown in bold), in which case a cluster of overlapping blocks in that vicinity can be analyzed for watermark reference signals. If a watermark reference signal is detected, then analysis continues to attempt recovery of a watermark payload, from waxel data obtained using affine parameters sleuthed from the reference signal. Corresponding clusters of blocks are analyzed in successive frames, at successive positions, until the detected object is no longer in view of the camera.

If one of the blocks in the advancing cluster detects a watermark reference signal or other clue (e.g., the bolded block in FIG. 21C), then a supplemental cluster of analysis blocks (shown in dotted lines) can be spawned—centered on the detecting block. This supplemental cluster of blocks can likewise progress across the field of view with the original cluster, in synchrony with the conveyor movement. Meanwhile, the original band of blocks, arrayed across the entry side of the camera field of view, continues to examine each new image frame for watermark reference signals or other clues.

Optimizations

As noted, conveyor belts on which plastic items are conveyed for identification/sorting move at relatively high speeds. To assure adequate illumination and depth of field, smaller apertures and longer exposures are desired. This can lead to motion blur.

Some embodiments of the technology apply deblurring to captured imagery before attempting watermark reading. Different techniques can be employed, including deconvolution by inverse filtering, by a Wiener filter, or by the Richardson-Lucy Algorithm. A suitable point spread function (PSF) can be estimated for the 1D motion using classical methods. (The PSF essentially characterizes the amount of energy with which light from a single point in the scene exposes each pixel of the camera during a static exposure.)

More sophisticated methods can be employed, e.g., utilizing flutter shutter techniques that sample the scene at different times, for different intervals, and use the resulting imagery to derive a more refined estimate of the unblurred scene. (See, e.g., patent publication US20090277962.)

In an illustrative embodiment, deblurring is performed in the Fourier domain, with the Fourier transform of the image being divided by the Fourier transform of the blur kernel. In other embodiments, such an operation can be performed in the spatial (pixel) domain.

In convolutional decoding of the watermark payload, list decoding can be employed. Instead of outputting a single decoded payload, list decoding outputs a list of possibilities, one of which is correct. This allows for handling a greater number of errors than is allowed with unique decoding. The plural listed payloads can then be assessed using CRC data, or constraints within the payload itself (e.g., the value of a certain field of the data is known to be drawn from only a subset of possible values) to identify the one correctly-decoded payload.

Instead of attempting to characterize the pose of a 128×128 waxel image patch, a smaller patch, e.g., 96×96 waxels, is desirably analyzed instead, as noted above. (If, as in a preferred embodiment, the camera sensor, lens, and imaging distance are chosen so that watermarked objects are depicted at a scale in which each pixel roughly corresponds to the area of a single waxel, then a 96×96 waxel patch corresponds a 96×96 pixel patch.) An FFT of size 128×128 is performed on this patch, by zero-padding, or by processing adjoining pixel imagery with a square or gaussian window to focus on the central area. As indicated, the methods detailed in U.S. Pat. Nos. 9,959,587 and 10,242,434 are used to characterize rotation and scaling. Translation can then be determined using the phase deviation method of the '587 patent. Collectively, rotation, scaling and translation (the affine parameters) describe how the original watermark is presented within the captured imagery.

The phase deviation method provides a metric indicating the strength of the detected reference signal within the analyzed patch of imagery, namely a sum of the phase deviations between the measured and expected phases of each of the reference signals. If this phase deviation metric is below a threshold value (lower metrics being better), then the patch of imagery is concluded to contain a readable watermark. An interpolation operation then follows—sampling the imagery at points corresponding to waxel locations, guided by the discerned affine parameters, to generate data for payload decoding.

As noted, if one patch of imagery is concluded to contain a readable watermark, then adjoining patches are checked to determine whether they, too, contain readable watermarks, e.g., using the procedure just-described. For each such patch, a corresponding set of affine parameters is determined. (Typically, each patch is characterized by a different set of affine parameters.) Again, an interpolation operation follows, generating more waxel data for use in payload decoding.

As before, the adjoining patches may be edge-adjoining, or may be overlapped—by any number of waxels.

If image patches smaller than 128×128 are analyzed (e.g., 96×96 or 64×64 waxels), then not all of the 128×128 waxel encoding locations may be depicted in each patch (depending on scaling). Nonetheless, corresponding locations are identified between the analyzed patches (using the affine parameters), and their sampled waxel data are combined (e.g., averaged or summed). Combined tallies of waxel data for some or all of the 128×128 encoding locations are thereby produced, and are provided to a Viterbi decoder for extraction of the encoded watermark payload.

Figure 22:
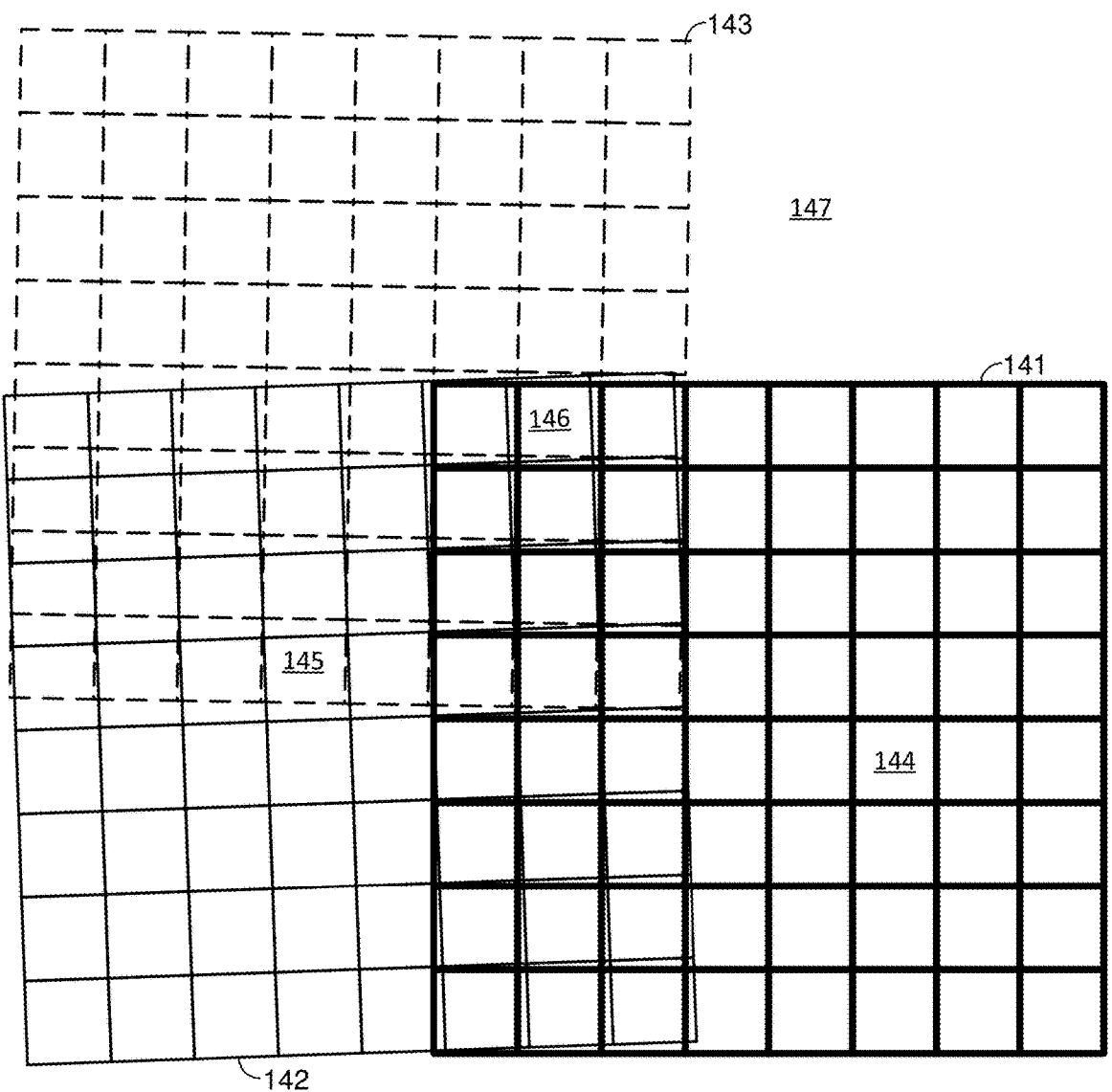
FIG. 22 illustrates intraframe combination of waxel data.

This is shown schematically in FIG. 22. A reference signal is detected in a small image patch 141 (here shown as only 8×8 waxels), which leads to search and discovery of reference signals in adjoining small image patches 142 and 143. Each has a different affine pose. The watermark signal block (not particularly shown) spans an area larger than any patch.

For some waxels in the watermark signal block, such as waxel 144, interpolated data from a single image patch is provided to the decoder. For other waxels, such as waxel 145, interpolated data is available from each of two overlapping patches. These two interpolated values are averaged (or summed) and provided to the decoder. For still other waxels, such as waxel 146, data from three patches is averaged (summed) and provided to the decoder. For yet other waxels, such as waxel 147, no data is available for the decoder.

Figure 23:
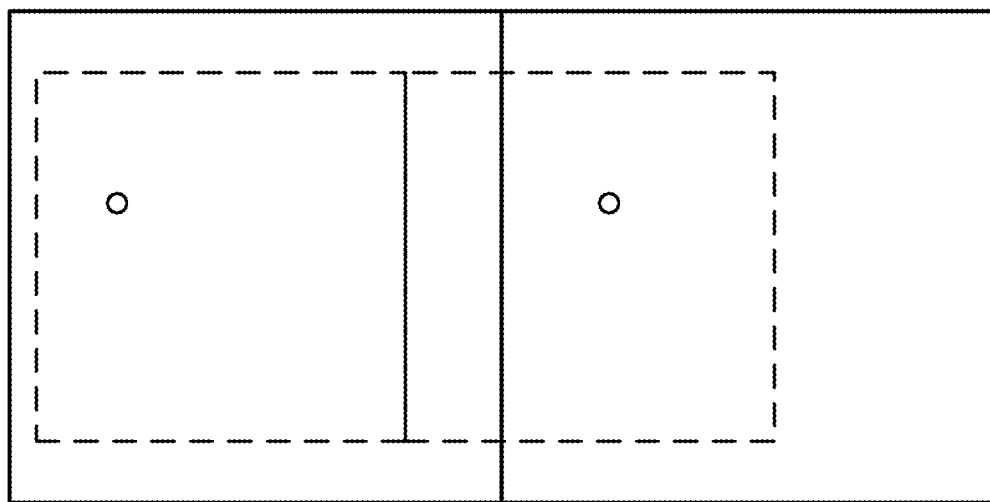
FIG. 23 illustrates another example of intraframe combination of waxel data.

Sometimes data for a particular waxel is available from two different (but typically adjoining) 128×128 waxel watermark blocks. FIG. 23 shows two such blocks, in solid lines. Also shown are two 96×96 waxel patches, in dashed lines, that are processed as described above. From the affine pose parameters determined for such patches, it is known that the waxel denoted by the circle in the left patch spatially corresponds to the waxel denoted by the circle in the right patch. Both convey the same chip of signature information. In this case, the two waxel values are summed, for submission to the decoder.

The decoder processes whatever data is available and produces an extracted payload (or a list of candidate payloads).

In some embodiments, the waxel data contributed by each image patch is weighted in accordance with the strength metric for the associated reference signal. In other embodiments, different metrics can be employed, e.g., as detailed in patent application Ser. No. 16/011,092, filed Jun. 18, 2018 (now U.S. Pat. No. 10,506,128, where they are termed Reference Pattern Strength, and Linear Reference Pattern Strength). Alternatively, each waxel data can be weighted in accordance with a corresponding message strength factor, as detailed in U.S. Pat. No. 7,286,685.

The just-described accumulation of waxel data from across plural patches in an image frame may be termed intraframe signature combination. Additionally, or alternatively, accumulation of waxel data from the same or corresponding waxel locations across patches depicted in different image frames can be used, which may be termed interframe signature combination.

Once affine parameters for a patch are known (describing appearance of a watermark in the patch), then payload reading can proceed by payload correlation techniques instead of Viterbi decoding. This is particularly useful if the number of distinct payloads is small, e.g., on the order of dozens or hundreds. This may be the case if the only payload of concern is plastic type data, and there are only a limited number of plastic types that may be encountered.

In one particular arrangement, a set of templates is produced, each expressing the waxel encoding associated with one particular type of plastic. Waxel elements that are common across all plastic types (or across a substantial fraction, such as 30%) can be omitted from the templates, to reduce chances for confusion. The image data is correlated with the different templates to identify the one pattern with which it most strongly corresponds. Since the image was already determined to include a reference signal (e.g., of a plastic texture watermark), then one of the limited number of waxel patterns should be present, making correlation a high reliability method of discerning the payload.

Plastic bottles are increasingly not printed directly, but rather are wrapped in plastic sleeves that are printed and heat-shrunk to conform to the bottles. This poses a difficulty, as the heat-shrink material common contracts primarily in one direction (the circumferential direction). Any watermark pattern printed on such sleeve is then differentially-scaled by the heat-shrinking, posing an impediment to watermark reading.

To redress this problem, one or more of the "seed" linear transforms (detailed in U.S. Pat. Nos. 9,959,587 and 10,242,434) that serve as starting points for iterative searches to determine a watermark's affine transform, are initialized to include a differential scale component. This allows the iterative process to more quickly reach a better estimate of affine distortion, when detecting watermarks from heat-shrunk plastic sleeves.

Sometimes a watermark will not be read from a marked item, and it will travel the conveyor without being identified as to type. Meanwhile, other items are ejected off the conveyor, e.g., into bins for ABS, HDPE, PET, PETg, etc., leaving just unidentified items.

These unidentified items may be collected into a bin of their own, and reprocessed later. Failure to read is unusual, and is commonly redressed by changing the pose at which the item is presented to the illumination, and camera. By collecting such items, and reprocessing, they will be presented at different poses the second time through, and will likely then be identified.

Alternatively, instead of collecting and re-processing, the items can be tumbled (e.g., dropped from one conveyor onto another), or bumped/shuffled (e.g., the conveyor may travel through a curtain of hanging obstacles) to change the items' poses, and a second camera/illumination system can then gather additional imagery for analysis.

Figure 24:
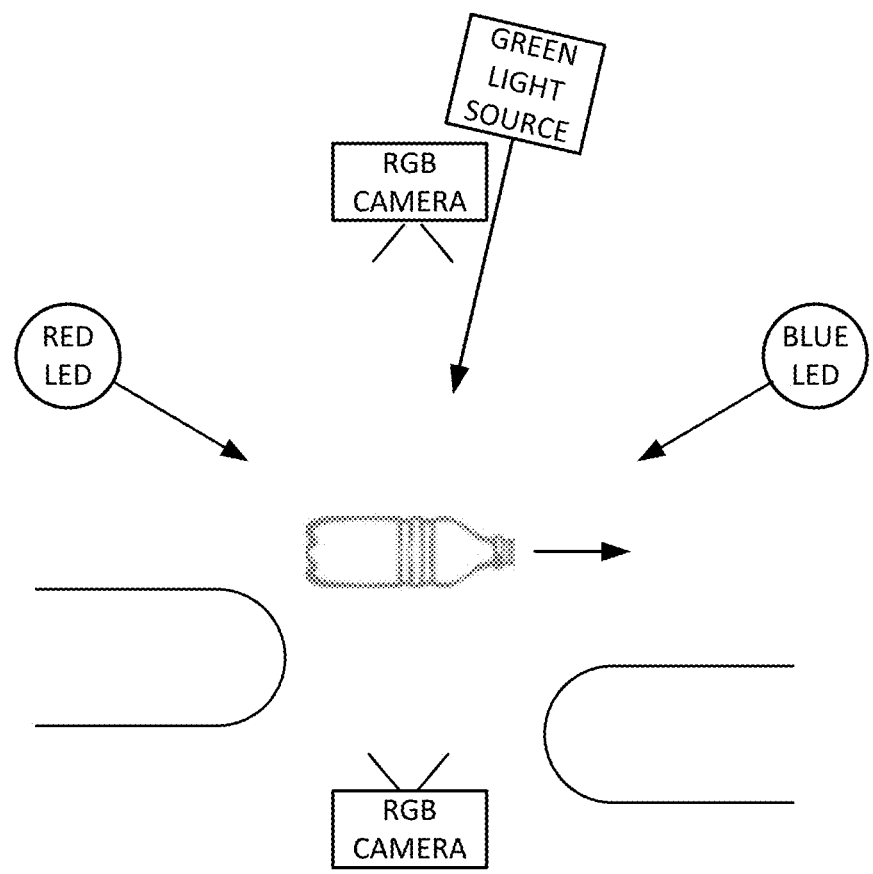
FIG. 24 illustrates a camera/lighting arrangement employing transmission of light through a plastic item to a camera.

In some embodiments, captured imagery is a function of light transmission through the item, instead of simply light reflection from the item. FIG. 24 schematically illustrates such an arrangement, in which items briefly "fly" off one conveyor onto another, presenting a camera view through the item, to one or more light sources on the other side. Such approach can be used with any of the camera/illumination systems described earlier. "Clues" based on detection of conveyor belt can similarly be based on detection of the null background of such a fly-by.

The direct least squares technique for determining scale and rotation transformations, to characterize appearance of a watermark in imagery, operates by successively winnowing and refining a large set of candidate transforms, until only one remains. The cited phase deviation process then follows, establishing the x- and y-translation of the watermark pattern within the imagery. In certain embodiments of the present technology, the direct least squares technique does not winnow candidate transforms down to one; instead, two or more top candidates are output. The phase deviation process is applied to each, yielding multiple candidate affine poses. The best pose is selected—the one yielding the smallest sum of phase deviations between the measured and expected phases of each of the reference signals. By such arrangement, fewer items are left unread on their first pass through the apparatus, minimizing the need for reprocessing.

Sometimes a pattern of reflected light from a textured surface patch—especially with transparent plastic bottles—can appear inverted: dark for light, and light for dark. Additionally, a pattern may appear flipped (mirrored), as when a transparent texture surface is read from the underside. Accordingly, after the scale and rotation are established (whether by direct least squares, correlation, or another approach), multiple versions of the imagery are submitted for analysis by a process to determine x- and y-translation (whether by phase deviation, or correlation). One version is inverted—black for white (darker for lighter). Another version is mirrored (left for right). Another is the original imagery. Only one of these will properly synchronize with the known phase properties of the reference signal peaks by which translation is determined; no match will be found for the others. Again, such measure helps maximize the number of plastic items that are read on their first pass through the apparatus, minimizing the need for reprocessing.

(In some embodiments, the decoder is configured to test the polarity of the message chips encoded in each sub tile block (e.g., 32 by 32 waxels with 16 sub-tiles per tile) to assess whether the message chips are inverted. Such a decoder executes the test by correlating the watermark signal for the sub-tile to check whether it has a positive or negative correlation peak. A negative peak indicates that the signal is inverted, and the decoder inverts chips from such an inverted sub-tile prior to aggregating them with chips of other sub-tiles. Correlation can be performed with known or fixed parts of the watermark signal.)

Applicant has found it is sometimes advantageous to capture frames with different imaging parameters—each depicting a common area of belt. For example, a single camera may alternate between shorter and longer exposure intervals, e.g., 20 and 100 microseconds, in successive frames. Or two cameras may capture imagery of a common area of the belt—one with a relatively larger aperture (e.g., f/4) and one with a relatively smaller aperture (e.g., f/8). Or with different exposure intervals. The resulting variation in captured imagery helps assure that the small variations associated with watermark encoding are readily detectable—despite the wide range of luminances reflected from the items being imaged.

When plastic material is molded, a first surface of the material is commonly adjacent a shaped mold surface, while a second, opposite surface is not. This opposite surface may nonetheless be shaped, as when a vacuum draws the first surface of the material into the mold, and the second surface follows. But the physical definition of the second surface is not as good; it lacks high frequency detail. This second surface, however, may be the one that is imaged by the camera (e.g., as may happen with a carbon black plastic tray on which meat is packaged, which may be presented either top-up or bottom-up to the camera). To redress this problem, some or all captured frames (or excerpts) can be processed to accentuate high frequency detail.

In one exemplary embodiment, if no reference signal is found in an analyzed block, the block is processed by an unsharp mask filter, and the analysis is repeated—in the expectation that such processing will aid in detecting a watermark reference signal depicted from the backside of molded plastic. In another exemplary embodiment, if a reference signal is detected in a block, but payload extraction fails, then the block is processed by an unsharp mask filter, and the payload extraction operation is re-tried.

More on Plastic Shaping, Etc.

The following discussion further details technology for encoding plastic containers and labels to carry machine-readable indicia. Included are details for overcoming certain signal distortions introduced in plastic container design and production.

To review briefly, watermarks are optical codes that typically comprise a 2D pattern of code signal elements, generally in a square block, that can be tiled with other blocks, edge-to-edge, to span a surface. Each square array can be regarded as a "grid" of encoding locations. In some embodiments, each location is marked to represent one of two data, e.g., "−1" or "1." (The two data can be "0" and "1" in other embodiments.)

Applicant's earlier-cited document 20040156529 describes how to apply a code signal by etching a mold with a pattern carrying data. After the pattern carrying the desired data is determined, the pattern is used to texture the surface of plastic by forming the plastic in the mold. For an injection molding process, the mold is etched by a computer-driven etching apparatus. Each cell in the output grid (array) pattern corresponds, e.g., to a 250×250-micron patch on the mold. If the output grid pattern for a particular cell has a value of "1," a depression is formed in a corresponding patch on the mold surface. If the output grid pattern in a cell has a value of "−1" (or "0") no depression is formed. The depth of the depressions depends on aesthetic considerations. Typical depressions have a depth less than a half millimeter and may be on the order of the patch size (250 microns) or less. The resulting pattern of mold-pitting is a physical manifestation of the output grid pattern. When the mold is used to form the surface of a product container, the negative of this pattern is created, with each pit resulting in a raised point on the container.

The size of the textured region depends on the patch size, and the number of rows/columns in the output grid pattern. The larger the textured region, the more "signal" is available for decoding, and the less exacting can be the specifications of the reading device. A textured region about one centimeter on a side has been found to provide more than adequate signal. Smaller textured regions (or larger) can be used, depending on the application requirements.

Techniques other than computer-controlled etching apparatuses can be used to shape the mold in accordance with the output grid signal. A small computer-controlled milling machine can be used. So can laser cutting devices.

While the foregoing approach contemplates that the container is formed with the texture already on it, in other embodiments, the container can be formed with a flat surface, and the texturing applied later, as by a heated press mold, assuming the packaging material is thermoplastic.

To enhance the "signal" conveyed by the texturing, surface changes can be made corresponding to both "1" and "−1" values in the output pattern grid (instead of just corresponding to the "1" values, as described above). Thus, raised areas are formed in patches corresponding to "1" valued output pattern cells, and pits are formed corresponding to "−1" valued output pattern cells.

In other embodiments, the texturing can also be applied by an additional layer of material applied to the container in the desired output pattern after it has been formed. For example, a viscous ink can be applied in a screen-printing process. The screen has an opening where the corresponding cell of the output grid pattern has a "1" value, and no opening otherwise. When the viscous ink is applied through the screen, small patches of ink are deposited where the screen had openings, but not elsewhere.

Patches larger than 250 microns may be employed in such embodiments, depending on the resolution limitations of the screen-printing process. The result is again a textured surface, with the pattern of raised areas conveying the binary data payload.

Various material other than ink can be applied to form the textured layer on top of the container. Thermoplastics and epoxy resins are just two alternatives.

In some such embodiments, techniques other than printing are used to apply a textured layer to the container. For example, various photolithographic techniques can be used. One technique employs a photo-reactive polymer, which is applied to the surface and then optically exposed through a mask corresponding to the output grid pattern. The exposed polymer is developed, thereby removing patches of material.

In still other embodiments, the output grid pattern is printed onto the container surface in two contrasting colors (e.g. black and white). Cells having a "1" value can be printed in one color, and cells having a "−1" value can be printed in another. In such embodiments, the binary payload is not discerned from a pattern of textures, but rather from a pattern of contrasting colors.

Applicant's other patent documents identified herein detail other procedures for physically realizing 2D optical codes on items, as further discussed in priority application 62/814,567.

To counteract signal distortion in the design and/or manufacturing of plastic containers, a variety of methods can be employed.

In a first embodiment, signal encoding is introduced to a container mold during 3D printing of the mold. The mold's interior surface, which contacts the outer surface of a container, is printed to include a subtle texture, pattern, image or design. The texture, pattern, image or design carries the encoded signal. For example, a raw sparse watermark signal is generated, e.g., as detailed in published documents US20170024840, US20190139176 and pending application Ser. No. 16/405,621 (published as 20190332840). We use the term "raw" here to mean that the sparse watermark signal has not been combined with a host image or surface. The raw sparse watermark is used as a template to guide 3D printing the interior surface of the mold. The mold's surface includes varied bumps and pits that collectively (and often redundantly) carry the raw sparse watermark.

Let's look at the workflow. A 3-dimensional (3D) mold is designed in CAD software, such as AutoCad, Photoshop, Solidworks, Materialise, or many others. The CAD software defines the geometry of the mold. For example, the mold may be shaped to produce a water bottle, a yogurt cup, or other container. A 2D encoded signal (e.g., a sparse watermark) is generated. At this point the 2D watermark signal needs to be mapped onto the 3D interior surface of the mold, preferably in a manner that minimizes distortion of the encoded signal.

One approach to minimizing distortion utilizes 1-directional predistortion based on relative size of an expected container. We'll use an hour-glass shaped container as an example. The radius at the middle of such container is smaller than the radius at the top and bottom. If mapping a 2D rectangularly shaped watermark tile to this container, there would be a potential for different scaling in the middle of the container relative to the top and bottom. Thus, a watermark tile may be stretched more in one spatial dimension (x axis) than another (y axis). This type of distortion is sometimes referred to as differential scale or shear. Consider an example where an original watermark tile is a square. As a result of differential scale, the square may be warped into a parallelogram with unequal sides. Differential scale parameters define the nature and extent of this stretching. Differential scale can cause particular problems for a watermark detector. When looking at an embedding tile with a square shape having x and y coordinates, with equal x and y sides, the x dimension is reduced in the middle of the container when applied while the y dimension remains generally the same length. If the middle radius is about 0.75 relative to the top and bottom radius, the x coordinates shrinks when mapped to the surface by about 0.75*x while the y coordinates remain generally the same (1*y). This results in a differential scale for the x and y coordinates, which is like creating an angle of image capture of about 41 degrees, making detection of the sparse watermark difficult.

One objective of a solution, on the encoding side, is to create an encoded signal that, once rendered to the surface of a mold, is in an orientation range that is detectable by a decoder. For example, the signal is preferably within a scale, rotation and translation state that a detector can find. Differential scale is particularly hard to re-register for data extraction. To address this differential scale problem, we strive to have the x and y coordinates of the tile retain a similar dimension relative to one another after mapping to a 3D surface. So, we pre-distort the tile in 1-direction prior to embedding. In particular, we pre-distort the tile in the y direction by a similar amount as is expected by any x direction distortion. The result, after pre-distortion and mapping, is similar dimensions in terms of x and y sides, albeit, with resulting in smaller embedding tile. The y direction of different tiles placed over the surface can be individually determined by the relative size of a radius at each embedding location. The pre-distortion will vary across the mold based on where a tile is placed on the 3D surface. (This same distortion correction process can be used for when applying labels on containers, e.g., heat shrink wrap labels, onto curved containers. The y direction of embedding tiles can be altered to include the same expected scale as x direction after heat shrinking.)

Another approach to minimizing distortion utilizes so-called UV texturing (or mapping). UV texturing utilizes polygons that make up a 3D object to be textured by surface attributes from a 2D image (e.g., a "UV texture map"). The texture map has coordinates U, V, while a 3D objects has coordinates X, Y, Z. UV mapping assigns pixels in the UV texture map to surface mappings on a polygon. This can be achieved by copying a triangular piece of the UV texture map and pasting it onto a triangle on the 3D object. UV texturing is an alternative mapping system it that only maps into a texture space rather than into the geometric space of the object. The rendering computation uses the UV texture coordinates to determine how to arrange the three-dimensional surface. UV texturing can be used to convey a 2D sparse watermark (or other 2D encoded signal) onto a surface of a mold. Here, the sparse watermark is used as the UV texture map, which is used to texture the surface of the mold. Differing grayscale levels within the UV texture map can be used to indicate mold surface texture depth or height. The resulting mold's textured surface carries the watermark signal.

Even further detection improvements can be achieved when using the above 1-dimensional scaling or UV texture mapping prior to 3D printing or laser texturing when used in combination with advanced decoding techniques within a detector, as described in assignee's patent documents U.S. Pat. No. 9,182,778 (e.g., including direct least squares methods for recovering geometric transform in a detector), and U.S. Pat. No. 9,959,587 (e.g., using direct least squares for perspective approximation, and using phase estimation in coordinate update and correlation metrics), and U.S. patent application Ser. No. 15/588,451, filed May 5, 2017 (now U.S. Pat. No. 10,373,299), e.g., using direct least squares to improve perspective distortion (tilt) performance) and document U.S. Pat. No. 10,242,434 (e.g., a detector using a hybrid of complementary methods for geometric registration like Log polar for low tilt angles/weak signals and direct least squares for higher tilt angles). Such detection techniques will help recover signals that have been distorted during mold creation and/or distorted during image capture of containers manufactured using such molds. For example, mold creation may introduce first distortion associated with 2D mapping to a surface of a 3D object, and image capture may introduce tilt, scale, and/or rotation from a camera angle relative to the container.

In still further embodiments, we utilize distortion resolving techniques discussed in applicant's patent documents to compensate for mapping 2D signals into 3D molds. See, e.g., patent documents U.S. Pat. Nos. 6,122,403, 6,614,914, 6,947,571, 7,065,228, 8,412,577, 8,477,990, 9,033,238, 9,182,778, 9,349,153, 9,367,770, 9,864,919, 9,959,587, 10,242,434, and just-cited U.S. patent application Ser. No. 15/588,451, filed May 5, 2017.

Surface texture in a mold's interior surface is used to create an encoded signal in a plastic container. The texture is created by creating bumps and/or pits in the mold surface, which result in pits or bumps on the container. For example, for a sparse watermark tile, each embedding location corresponds, e.g., to a n×m inch patch on the mold. If an embedding location has a value of "1," a depression is formed in a corresponding patch on the mold surface. If the embedding location has a value of "−1," no depression (or a pit) is formed. Thus, raised areas are formed in containers corresponding to "1" valued embedding location, and unaltered areas (or pits) are formed corresponding to "−1" valued embedding location. When an image of a marked container is analyzed, the bumps and pits will have different reflective properties. These differences can be analyzed to decode the encoded signal.

Returning to the workflow, after defining the geometry of the mold, generating a 2D encoded signal (e.g., a sparse watermark), and mapping the watermark signal to the 3D interior surface of the mold, we produce a corresponding a 3D printer file format (e.g., STL, OBJ, AMF, or 3MF) to control a 3D printer. The 3D printer prints the mold, including the surface texture according to the encoded signal pattern. Of course, a 3D printer needs to be capable of printing at a resolution that accommodates the encoded signal pattern. For example, if an encoded signal pattern corresponds to 50 or 100 dots per inch, the printer would need to be able to replicate such.

In other embodiments, instead of using a sparse watermark to guide surface texturing, a neural network generated signal, or Voronoi, Delaunay, or stipple half-toning-based signal can be used. Such signals are discussed in, e.g., PCT/US18/64516 and U.S. patent application Ser. No. 16/435,164, filed Jun. 7, 2019.

In other embodiments, encoding is introduced to a mold surface with laser engraving, etching, embossing or ablation. The machine-readable indicia (carried by surface topology changes within a mold) is imparted to the plastic as a container is being formed. Very fine texture patterns can be achieved with laser engraving and tool etching. Recently, laser texturing for molds has developed to the point where it can produce different depth levels. Multiple different levels of depth can be utilized to carry different signal information. For example, in signal value terms, a first depth may represent a "1," while a second depth may represent a "0," and a third depth may represent a "−1". Like above, UV texture mapping and/or 1-directional predistortion can be used to combat 2D to 3D transformations.

Another consideration for 3D printed molds, laser engraved molds and etched molds, is that container surface signals must be able to survive formation, not degrade the finished container (e.g., create too thin of areas), and facilitate container release from a mold (e.g., not get stuck in a mold). For example, if the mold creates a bump or raised area on the container, the corresponding indentation in the mold should be shaped to facilitate container release from the mold. For example, if the mold includes sharp and deep pits (corresponding to sharp and high bumps on the container), the container may not release from the mold. The mold pits bumps can be directionally shaped, e.g., teardrop-shaped (or roche moutonnée-shaped), in the direction of the mold release. Or the pits can be shaped to match tool release draft angles for a tool, material type and/or piece shape.

Similar considerations should be had for sintered metal or ceramic parts where a watermark is carried by surface texture. The watermark textured piece must release from a mold without deformation before it's fired, and watermark texture will deform along with the piece during sintering. Expected deformation can be corrected for with predistortion of the watermark signal.

In still another embodiment, watermark texture may be formed of linear striped ridges with stripe position modulation. A mold including such linear ridges can be spatially moved, and/or increased/decreased in size, to represent a watermark signal.

Mold Generation Particulars

One particular example takes a sparse watermark signal and places shapes or structures at dot locations. Instead of marking square dots, the 3D surface topology is preferably formed with smoothed divots, pits or peaks, e.g., shaped with Gaussian or sinusoidal like curves. Another example forms line art or elemental features (like circles, lines, ovals, etc.) that coincide with peaks and/or valleys of a continuous watermark signal. Another example forms a 3D surface pattern of signal rich art designs described in PCT/US18/64516 and U.S. application Ser. No. 16/435,164, filed Jun. 7, 2019, including but not limited to Voronoi, stipple, Delaunay and traveling salesman patterns, to name a few. In such examples, the topology is formed such that the cross section of the pattern of surface peaks or depressions is smoothed (e.g., in the form of a sinusoid or Gaussian cross section. The cross section achievable is dependent on marking type (CNC milling, laser marking, 3D printing) and should be designed to ensure proper part release from the mold. The smoothing of contours should address the latter objective.

In the following examples, design objectives for converting 2-dimensional data carrying signals into a mold are discussed.

In choosing a signaling type (e.g., continuous vs. binary vs. sparse), various factors come into play, such as the type of plastic being molded (PET, PP, PE, HDPE, LDPE, etc.), the type of manufacturing process (e.g., blow molding, injection molding, thermoforming, etc.), the type of mold (metal, ceramic, etc.), the mold making process (etching, engraving, etc.), aesthetics, and attributes of camera/lighting used for detection. In particular, continuous signaling typically requires higher resolution both spatially and in depth (of embossing, debossing, etching, etc.). Binary signaling typically includes higher resolution spatially but low resolution in terms of depth. Sparse binary signaling can be performed when available spatial and depth resolution are both low.

Another factor to be considered is a ratio between reference (synchronization) signal strength, and message signature strength. Ensuring sufficiently strong message signal strength relative to the synchronization signal component enhances reliability in recovery of the digital payload. For sparse and binary marks, synchronization signal-to-message signal ratio can be determined heuristically based on specified watermark resolution, image resolution, dot size, dots per tile, and payload size. A different set of heuristics can be created for different types of plastics, molds, etc. For example, the properties of the plastic (e.g., intrinsic viscosity of sheet grade, bottle grade and film grade PET) may determine how conducive the embossed plastic is to carry spectral features (e.g., low vs. high frequencies) of a watermark signal. Similar considerations also apply to continuous and binary signaling Still another factor to be considered is watermark signal resolution. The resolution of a watermark signal in each signal block (tile) should be sufficiently high to achieve desired aesthetics, while enabling the watermark payload to be read from small tiles so that object curvature introduces less geometric deformation across each tile. In one example, a recommended resolution is 200 watermark cells (waxels) per inch (WPI), or higher. With a tile size of 128 by 128 waxels, the tile dimensions for a 200 WPI tile are then 0.64 inch by 0.64 inch.

In addition to improved detection in objects with non-rectangular geometries, higher resolution watermarks enable improved detection from flattened, crushed, deformed, or shredded objects as found in a recycling stream.

Decreasing the dot density within each watermark tile has various benefits. For example, visibility of the signal pattern on the molded object is less, meaning that it interferes less with the visual quality and aesthetics of the object. For clear containers, the signal pattern has less visual impact on the contents within the container (e.g., the water in a clear plastic water bottle). Moreover, since dots are translated into bumps or pits/divots/recesses in an object surface, fewer dots means that the dot spacing is less, making it easier to form the corresponding shapes in a mold. Techniques for making mold surface topology (e.g., bumps or pits/divots/recesses) include, e.g., laser engraving, etching, electrical discharge machining (e.g., so-called "spark erosion"), Computer Numerical Control ("CNC") milling, or 3D printing. When using a CNC milling bit, care can be taken to ensure adequate resolution. Marking equipment with a larger marking width can be used to remove surface material, leaving contoured bumps with a diameter smaller than the bit width. Bit shapes can be varied to achieve desired dot representation including, e.g., conical bits, triangle bits, circle cross section, ball mill. Additionally, divots may need not be deep, but can use intensity variation. Fewer, more widely spaced bumps/divots also makes it more feasible to do smoothing of the contours of the bumps and divots in the mold.

Dot density can be expressed as a percentage of dots relative to a tile with maximum percentage of dot coverage. The maximum percentage of dot coverage in a watermark signal tile comprising a binary pattern of dot or no dot per cell is 50%. This means that half of the cells (waxels) in the tile are marked with dots (e.g., dark values). Dot density should preferably be lower for lower visibility, e.g., 10 to 35 (meaning 5 to 17.5% of the tile marked with dots).

Dot size is mentioned above. Dot size is a parameter that controls the size of the elemental dot structure within a sparse signal. We indicate dot size at a specified image resolution in dots per inch (DPI), e.g., 600 DPI, meaning 600 pixels per inch. Dot size is an integer value indicating dimension of a dot along one axis in pixels at a given image resolution. A dot size of 1 means that the dot is one pixel. A dot size of 2 means that the dot is two pixels (e.g., arranged in a row, column, or along a diagonal in a two-dimensional array of pixel coordinates). For example, a dot size 1 or 2 at 600 DPI translates to a dot width of 42 or 84 microns. A depression having this dot width can be made with a larger bit size (e.g., 257 microns) because the bit need only partially be pressed into the surface of an aluminum mold.

Dots can be of different shapes. Although square dots can be represented easily in an image in the form of pixels, there may be more suitable shapes and structures for encoding the signal in physical material such as plastic or metal. Examples include circles, ovals, lines, etc. Smoother shapes may be easier to produce (for example, due to ease of manufacturing the mold) than shapes with sharp edges or corners.

Different types of plastics, molds and mold-making allow for different depth of marking on the surface of plastic, e.g., deeper or more superficial. Generally, when deeper marking is available, lower dot density can be used, whereas when marking is superficial, a higher density of dots is typically employed. Deeper marking is more likely to survive workflow alterations such as surface abrasions, flattening and crushing.

The image signal representation of a watermark tile provided for conversion into a 3D surface topology for a mold, may be a vector or rasterized image file, such as an SVG image format. Image editing tools like Adobe Photoshop, design tools such as Adobe Illustrator or signal processing software such as MATLAB from Math Works, can be employed to generate the files, e.g., in conjunction with watermarking tool plug-ins from applicant Digimarc Corp.

In the electronic image file, dots can be of different shapes. Although square dots can be represented easily in an image in the form of pixels, different shapes and structures are generally more suitable encoding the signal in physical material such as plastic or metal. Examples include circles, ovals, lines, etc. Smoother shapes are easier to reproduce, for example, due to ease of manufacturing the mold, than shapes with sharp edges or corners. A vector representation enables the dots to be defined in terms of a dot shape that is beneficial for aesthetics of the finished, molded product and for performance of the mold. Performance of the mold considerations are the tapering, smoothing or contouring of the divots or bumps so that the molded part releases from the mold. In a simple example, dots have a circle shape, which facilitates shaping into the surface of an aluminum mold, for example, using CNC equipment. The 3D structure of the shape plays a role in ease of manufacturing (e.g., release) as well as in the induced light intensity variations that carry the modulations necessary for encoding the watermark signal. Forms of signal rich art (e.g., as discussed in U.S. application Ser. No. 16/435,164, filed Jun. 7, 2019 and PCT/US18/64516) can be created by selectively placing objects of a desired shape at dot locations, and/or drawing vector art through dot locations so that the vector art is highly correlated with the watermark signal at the dot locations.

The resolution of the tile image (e.g., in DPI) determines the granularity of the modulations that can be made in the material. Use of higher resolution (e.g., 600 DPI) provides more flexibility in designing the features (e.g., dots or other structures) that can be embossed, debossed, etched, milled, eroded, etc. Use of higher resolution also provides more flexibility in signal formation, for example, in creating sparse binary marks by allowing more leeway in choice of keep-out areas, dot shapes, sizes, etc.

Review of Exemplary Watermarking Methods

In an exemplary watermarking method, a plural-symbol message payload (e.g., 48 binary bits, which may represent a product's Global Trade Identification Number (GTIN) or plastic recycling information, together with 24 associated CRC bits) is applied to an error correction coder. This coder transforms the symbols of the message payload into a much longer array of encoded message elements (e.g., binary or M-ary elements) using an error correction method. (Suitable coding methods include block codes, BCH, Reed Solomon, convolutional codes, turbo codes, etc.) The coder output may comprise hundreds or thousands of binary bits, e.g., 1024, which may be termed raw signature bits. These bits may be scrambled by XORing with a scrambling key of the same length, yielding a scrambled signature.

Each of these scrambled signature bits modulates a pseudorandom noise modulation sequence (spreading carrier) of length 16, e.g., by XORing. Each scrambled signature bit thus yields a modulated carrier sequence of 16 "chips," producing an enlarged scrambled payload sequence of 16,384 elements. This sequence is mapped to elements of a square block having 128×128 embedding locations in accordance with data in a scatter table, yielding a 2D payload signature pattern. (To each of four 64×64 quadrants in the 128×128 block, the scatter table assigns 4 chips for each scrambled signature bit.) Each location in the 128×128 block is associated with either a value of 0 and 1, or black and white—with about half of the locations having each state. This bimodal signal is frequently mapped to a larger bimodal signal centered at an eight-bit greyscale value of 128, e.g., with values of 95 and 161. Each of these embedding locations may correspond to a small region of pixels, such as a 2×2 patch, termed a "bump," which yields a watermark message block having dimensions of 256×256 pixels.

As noted, a synchronization component is commonly included in a digital watermark, to help discern parameters of any affine transform to which the watermark has been subjected prior to decoding, so that the payload can be correctly decoded. A particular synchronization component takes the form of a reference signal (sometimes termed an orientation signal or a calibration signal) comprised of a dozen or more magnitude peaks of sinusoids of pseudorandom phase, in the Fourier domain. This signal is transformed to the spatial domain in a 256×256 block size (e.g., by an inverse Fast Fourier transform), corresponding to the 256×256 block to which the enlarged scrambled payload sequence is mapped. The spatial domain reference signal, which may comprise floating-point values between −1 and 1, can be scaled to a range of −40 to 40 and combined with the 256×256 pixel payload block to yield a final watermark signal block, e.g., having values ranging from 55 (i.e., 95−40) to 201 (i.e., 161+40). This signal can then be summed with host imagery, after first scaling-down to render it inconspicuous.

If such a watermark signal block is printed at a spatial resolution of 300 dots per inch (DPI), a printed block of about 0.85 inches square results. (Since the 0.85 inch side dimension corresponds to 128 waxels, this works out to 150 waxels per inch.) Such blocks can be tiled edge-to-edge for marking a larger surface.

The just-described watermark signal may be termed a "continuous tone" watermark signal. It is usually characterized by multi-valued data, i.e., not being just on/off (or 1/0, or black/white)—thus the "continuous" moniker. Each pixel of the host image (or of a region within the host image) is associated with one corresponding element of the watermark signal. A majority of the pixels in the image (or image region) are changed in value by combination with their corresponding watermark elements. The changes are typically both positive and negative, e.g., changing the local luminance of the imagery up in one location, while changing it down in another. And the changes may be different in degree—some pixels are changed a relatively smaller amount, while other pixels are changed a relatively larger amount. Typically, the amplitude of the watermark signal is low enough that its presence within the image escapes notice by casual viewers (i.e., it is steganographic).

(Due to the highly redundant nature of the encoding, some embodiments can disregard pixel changes in one direction or another. For example, one such embodiment only changes pixel values in a positive direction. Pixels that would normally be changed in a negative direction are left unchanged.)

In a variant continuous tone watermark, the signal acts not to change the local luminance of artwork pixels, but rather their color. Such a watermark is termed a "chrominance" watermark (instead of a "luminance" watermark). An example is detailed, e.g., in U.S. Pat. No. 9,245,308.

"Sparse" or "binary" watermarks are different from continuous tone watermarks. They do not change a majority of pixel values in the host image (or image region). Rather, they have a print density (which may sometimes be set by the user) that results in marking between about 5% and 45% of pixel locations in the image. Adjustments are typically all made in the same direction, e.g., reducing luminance. Sparse elements are typically bitonal, e.g., being either white or black. Although sparse watermarks may be formed on top of other imagery, they are usually presented in regions of artwork that are blank or colored with a uniform tone. In such cases a sparse marking may contrast with its background, rendering the marking visible to casual viewers. Although sparse marks may take the form of a field of seemingly-random dots, they can also take the form of line structures, as detailed elsewhere. As with continuous tone watermarks, sparse watermarks generally take the form of signal blocks that are tiled across an area of imagery.

A sparse watermark can be produced from a continuous-tone watermark by thresholding. That is, the darkest elements of the summed reference signal/payload signal blocks are copied into an output signal block until a desired density of dots is achieved.

Patent publication US20170024840 details various other forms of sparse watermarks. In one embodiment, a signal generator starts with two 128×128 inputs. One is a payload signal block, with its locations filled with a binary (0/1, black/white) expanded scrambled payload sequence, as described above. The other is a spatial domain reference signal block, with each location assigned a floating point number between −1 and 1. The darkest (most negative) "x"% of these reference signal locations are identified, and set to black; the others are set to white. Spatially-corresponding elements of the two blocks are ANDed together to find coincidences of black elements between the two blocks. These elements are set to black in an output block; the other elements are left white. By setting "x" higher or lower, the output signal block can be made darker or lighter.

Publication US20190171856, International PCT application No. PCT/US19/19410, filed Feb. 25, 2019, and U.S. application Ser. No. 16/405,621, filed May 7, 2019, detail additional sparse encoding embodiments. One embodiment uses a reference signal generated at a relatively higher resolution (e.g., 384×384 pixels), and a payload signature spanning a relatively lower resolution array (e.g., 128×128). The latter signal has just two values (i.e., it is bitonal); the former signal has more values (i.e., it is multi-level, such as binary greyscale or comprised of floating-point values). The payload signal is interpolated to the higher resolution of the reference signal, and in the process is converted from bitonal form to multi-level. The two signals are combined at the higher resolution (e.g., by summing in a weighted ratio), and a thresholding operation is applied to the result to identify locations of extreme (e.g., dark) values. These locations are marked to produce a sparse block (e.g., of 384×384). The threshold level establishes the dot density of the resulting sparse mark.

A different embodiment sorts samples in a block of a reference signal by darkness, yielding a ranked list of the darkest N locations (e.g., 1600 locations), each with a location (e.g., within a 128×128 element array). The darkest of these N locations are always-marked in an output block (e.g., 400 locations), to ensure the reference signal is strongly expressed. The others of the N locations are marked, or not, depending on values of message signal data that are mapped to such locations (e.g., by a scatter table in the encoder). Locations in the sparse block that are not among the N darkest locations are never marked, and they are consequently affirmatively ignored by the decoder. By setting the number N larger or smaller, sparse marks with more or fewer dots are produced. (This embodiment is termed the "fourth embodiment" in earlier-cited application Ser. No. 16/405,621 and PCT/US19/19410.)

In generating a sparse mark, a spacing constraint can be applied to candidate mark locations to prevent clumping. The spacing constraint may take the form of a keep-out zone that is circular, elliptical, or of other (e.g., irregular) shape. The keep-out zone may have two, or more, or less, axes of symmetry (or none). Enforcement of the spacing constraint can employ an associated data structure having one element for each location in the tile. As dark marks are added to the output block, corresponding data is stored in the data structure identifying locations that—due to the spacing constraint—are no longer available for possible marking.

In some embodiments, the reference signal can be tailored to have a non-random appearance, by varying the relative amplitudes of spatial frequency peaks, so that they are not all of equal amplitude. Such variation of the reference signal has consequent effects on the sparse signal appearance.

A sparse pattern can be rendered in various forms. Most straight-forward is as a seemingly-random pattern of dots. But more artistic renderings are possible, including those discussed and illustrated above.

Other overt, artistic patterns conveying watermark data are detailed in U.S. patent application Ser. No. 16/129,487 (published as 20190139176). In one detailed approach, a designer creates a candidate artwork design or selects one from a library of designs. Vector art in the form of lines or small, discrete print structures of desired shape work well in this approach. A payload is input to a signal generator, which generates a raw data signal in the form of two-dimensional tile of data signal elements. The method then edits the artwork at spatial locations according to the data signal elements at those locations. When artwork with desired aesthetic quality and robustness is produced, it is applied to an object, e.g., by laser marking.

Other techniques for generating visible artwork bearing a robust data signal are detailed in assignee's U.S. patent application Ser. No. 16/212,125, filed Dec. 6, 2018 (published as 20190213705), and 62/841,084, filed Apr. 30, 2019. In some embodiments, a neural network is applied to imagery including a machine-readable code, to transform its appearance while maintaining its machine readability. One particular method trains a neural network with a style image having various features. The trained network is then applied to an input pattern that encodes a plural-symbol payload. The network adapts features from the style image to express details of the input pattern, to thereby produce an output image in which features from the style image contribute to encoding of the plural-symbol payload. This output image can then be used as a graphical component in product packaging, such as a background, border, or pattern fill. In some embodiments, the input pattern is a watermark pattern, while in others it is a host image that has been previously watermarked.

Other such techniques do not require a neural network. Instead, a watermark signal block (i.e., reference plus message signals) is decomposed into sub-blocks. A style image is then analyzed to find sub-blocks having the highest correlation to each of the watermark signal sub-blocks. Sub-blocks from the style image are then mosaiced together to produce an output image that is visually evocative of the style image, but has signal characteristics mimicking the watermark signal block.

In addition to the references cited elsewhere, details concerning watermark encoding and reading that can be included in implementations of the present technology are disclosed in applicant's previous patent filings, including US patent documents U.S. Pat. Nos. 5,850,481, 6,122,403, 6,590,996, 6,614,914, 6,782,115, 6,947,571, 6,975,744, 6,985,600, 7,044,395, 7,065,228, 7,123,740, 7,130,087, 7,403,633, 7,763,179, 8,224,018, 8,300,274, 8,412,577, 8,477,990, 8,543,823, 9,033,238, 9,349,153, 9,367,770, 9,521,291, 9,600,754, 9,749,607, 9,754,341, 9,864,919, 10,113,910, 10,217,182 and US20160364623, and in pending U.S. application Ser. No. 16/141,587, filed Sep. 25, 2018 (published as 20190266749), Ser. No. 16/270,500, filed Feb. 7, 2019 (now U.S. Pat. No. 10,958,807), Ser. No. 62/814,567, filed Mar. 6, 2019, Ser. No. 62/820,755, filed Mar. 19, 2019, Ser. No. 62/824,934, filed Mar. 27, 2019, and Ser. No. 16/405,621, filed May 7, 2019 (published as 20190332840).

While the just-detailed technologies are often described in the context of print watermarking, the same techniques can be used for 3D texture/shape-based watermarking. The sparse dot and line elements of binary marks can be represented by protrusions (or depressions) in a 3D surface.

Similarly, the positive and negative variations in pixel values associated with continuous-tone watermarks can be represented by spatial variations in 3D surface height. In some arrangements, the surface is changed in only one direction, e.g., by protrusions up from the surface. In other arrangements, the surface may be changed in reciprocal directions, by both protrusions up from, and depressions (pits) down into, the 3D surface.

When the surface is changed in only one direction, one implementation disregards negative variations in watermark values; the surface is changed only by positive variations. Another implementation disregards positive variations in the watermark signal; the surface is changed only by negative variations. In both such implementations, the surface changes may be either in the positive, protrusion direction, or in the negative, depression direction.

In still other implementations, the most negative variation (extremum) of the continuous watermark signal maps to no change in the surface, while increasingly-positive variations from this extremum map to increasingly greater surface changes (either protrusions or depressions). In yet other implementations, the most positive variation of the continuous watermark signal maps to no change in the surface, while increasingly-negative variations from this value map to increasingly greater surface changes (again, either protrusions or depressions).

When the surface is changed in two directions, negative values of a continuous-tone watermark signal can map to depressions into the surface (with depth depending on negative signal value), while positive values of the watermarks signal can map to protrusions from the surface (with height depending on positive signal value). In other embodiments, the polarities can be switched, with positive values of the watermark signal mapping to depressions into the surface, and vice versa. The depths of the deepest depressions, and the heights of the highest protrusions may be equal, but they need not be. Ditto the average depression depth and the average protrusion height. The depths/heights may be asymmetrical—as if a DC offset was applied to the continuous-tone watermark signal In cases where the surface is changed in two directions, both depressions and protrusions desirably convey watermark payload information (unlike the arrangement of US20180345323, which teaches that only one or the other conveys payload information).

CONCLUDING REMARKS

Having described and illustrated the principles of our inventive work with reference to illustrative examples, it will be recognized that the technology is not so limited.

For example, while the described embodiments involve imagery captured using visible illumination, this is not essential. Other forms of illumination, such as ultraviolet and infrared, can alternatively be used.

Although plastic bottles are described as including both printed watermarks and texture watermarks, it will be recognized that certain of the present technologies constitute improvements to texture watermarks—regardless of the presence or absence of printed watermarks. Thus, for example, plastic bottles encoded with recycling information using patterns like those shown in the figures are improvements over prior art marking of plastic containers with recycling data (which marking tends to be more conspicuous and detract from package aesthetics). Similarly, other improvements are applicable to watermarking generally, such as the detailed clues for distinguishing empty conveyor from non-empty conveyor.

Although the printed and textured watermarks in the detailed embodiments employ reference signals comprising peaks of different spatial frequencies, this is not essential to avoid confusion. In other embodiments, both watermarks employ reference signals comprising peaks of the same spatial frequencies. Or the reference signal of one watermark can employ peaks at spatial frequencies that are a subset of the peaks used in the reference signal of the other watermark.

If the two watermarks' reference signals share some or all spatial frequency peaks in common, the peaks in one reference signal may be assigned phases different than the peaks in the other reference signal, in order to avoid confusion. If differentiation of the two watermarks by peak phases does not yield adequate false-positive behavior, additional testing can be done. For example, phases may be checked twice, on two different counterparts of the captured image. These counterparts may be successive image frames, or they can be a single image frame that is processed to yield two images. For example, gaussian noise can be added to yield a second image. Or a second image can be generated by discarding even rows and columns of pixel data from the first image. Numerous such possibilities exist. Only if the two phase-based identifications of the watermark signal from the two counterpart images agree is the result trusted.

In still other embodiments, the two watermarks employ different scrambling keys, or different spreading keys, or different scattering tables, to avoid confusion.

In embodiments in which the two watermarks' reference signals employ spatial frequency peaks in common, the processing arrangements can be simplified. For example, scale and rotation synchronization for both watermarks can be performed by a common processing stage, since such synchronization involves a common set of reference signal peaks. Such methods are detailed, e.g., in patent applications 62/834,260, filed Apr. 15, 2019, and 62/834,657, filed Apr. 16, 2019.

In one particular detector, a "supergrid" reference signal construct is employed, including all peaks from both reference signals. Scale and rotation of the input imagery is determined by synchronizing with such a composite reference signal. Once such synchronization is achieved, it is straightforward to determine whether the input imagery includes one reference signal or the other, e.g., by examining for peaks or phases that are unique to one of the two reference signals.

Thus, it will be understood that an embodiment incorporating certain aspects of the present technology comprises a plastic sorting system that includes first and second watermark extraction modules. The first watermark extraction module uses the methods disclosed herein to extract first digital data from patterns of a first format formed in the surfaces of textured plastic objects. The first watermark extraction module has an output coupled to a sorting mechanism, enabling the sorting mechanism to sort the objects based on the first digital data. The second watermark extraction module uses the methods disclosed herein to extract second digital data from patterns of a second, different, format printed on the textured plastic objects. The second watermark extraction module has an output coupled to said sorting mechanism, enabling the sorting mechanism to sort the objects based also on the second digital data. The second watermark extraction module is unable to extract digital data from patterns of the first format. FIG. 14 depicts one such embodiment.

Although the described embodiments employ a reference signal comprised of peaks in the Fourier magnitude domain, it should be recognized that reference signals can exhibit peaks in different transform domains.

Relatedly, it is not necessary for a digital watermark signal to include a distinct reference signal for geometrical synchronization purposes. Sometimes the payload portion of the watermark signal, itself, has known aspects or structure that allows geometrical synchronization without reliance on a separate reference signal.

While a GTIN payload data field from the label watermark in the FIG. 13 embodiment is used to access corresponding plastic type, etc., information from a database, this is not required. Other fields of the label watermark can be used for this purpose, e.g., detailing the various data types referenced herein. Indeed, the use of a database in conjunction with label watermarks is not essential; the payload can convey plastic data directly, such as in one of the Application Identifier key value pairs.

Although the specification particularly describes 2D image sensors, 2D sensors are not required. Image sensing can instead be performed by a linear array sensor that captures line scan images at a suitably-high rate.

While the surface shaping shown in some of the figures employs primarily straight lines, this is, in part, a drafting expedient. Commonly the surface texturing effects curved, tapered shapes.

Reference was made to processing patches of captured imagery of specified sizes in waxels. While the exact waxel-size of a patch cannot be determined until its scale is assessed (e.g., using the cited direct least squares method), the encoding scale of each watermark that the system might encounter is known in advance, and the imaging distance is fixed, so the scale-correspondence between captured pixels and encoded waxels is roughly known, which is adequate for the present purposes.

The image processing described herein is typically performed on data that has previously been "oct-axis" (or "criss-cross") filtered, as described in the cited references. In an illustrative embodiment, oct-axis-filtered data can have any integer value in the range of −8 to 8.

In some embodiments, after the affine parameters characterizing item pose have been discerned, an estimate of the reference signal is subtracted from the captured image, since the reference signal then serves only a noise. Oct-axis processing can then be applied to the remaining signal.

Although this specification has repeatedly referenced plastic bottles, it will be recognized that the technology can be used in conjunction with any items, e.g., trays, pouches, cups, transport containers, etc.

Figure 25:
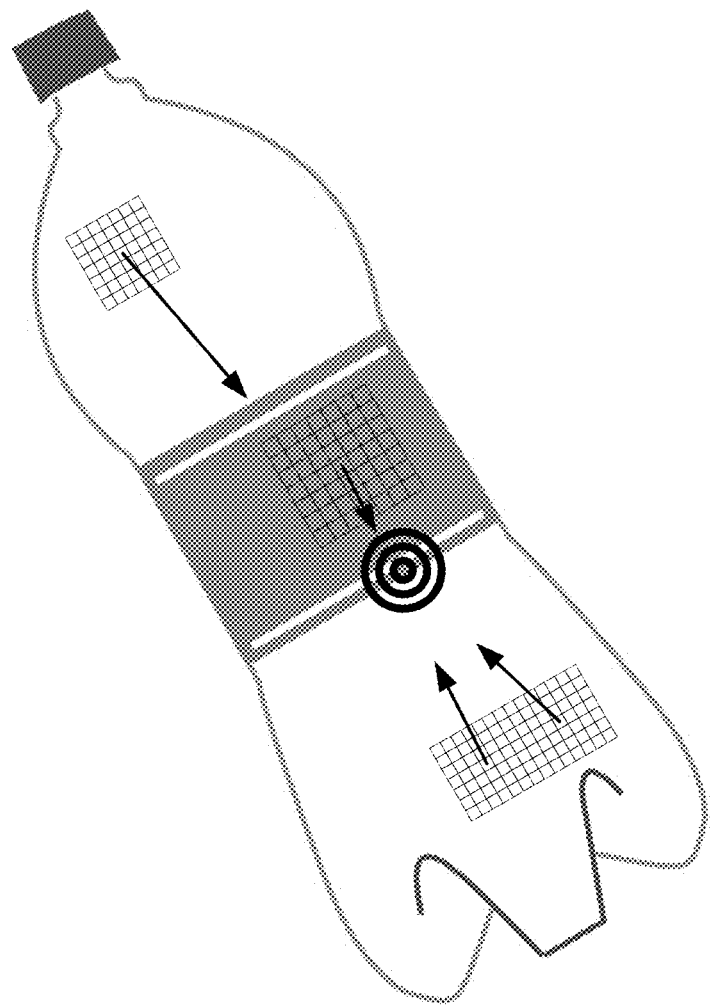
FIG. 25 illustrates determining the center of gravity of an object (here a transparent, clear, beverage bottle), by positions of blocks in which watermark reference signals are detected.

For best diverter performance, a center of gravity of detected plastic items is estimated, and this position is used in controlling operation of the diverter mechanism (e.g., this position is the target for a jet of compressed air). Each detection of a watermark block serves as a data point in estimating the center of gravity. In one example, the coordinates of the center of each watermark block are determined in the coordinate system of the image in which blocks are detected. These coordinates, in x- and y-directions, are respectively averaged, to yield a center of gravity for the object within that image frame. For example, in FIG. 25, these coordinates average to indicate the position shown by the bullseye. The spatial relationship between the camera field of view and the diverter assembly is known, as is the speed of the belt, enabling the diverter to be activated at an instant, and aimed at a location, calculated to best divert the item from the belt.

(If the belt is crowded with objects, watermark blocks can be checked for payload consistencies before their locations are averaged. If one watermark indicates one type of plastic, and a nearby block indicates a different type of plastic, then they are known to mark different items, and their coordinates should not both be employed in a common average.)

There is a short interval of time between the moment an item is imaged by the camera(s), and the moment the item is positioned for diversion from the conveyor. This interval is generally adequate to enable cloud processing. For example, captured imagery (or derivatives of such imagery) can be transmitted to a remote cloud computer service, such as Microsoft Azure, Google Cloud, Amazon AWS. The cloud processor(s) can perform some or all of the processing detailed herein, and return result data to the waste processing system—in time to control the diverters accordingly.

Likewise, in a waste stream in which some items literally include plastic recycling codes in their payloads, while recycling codes for other items must be obtained from a database (e.g., based on a look-up from decoded GTIN identifiers), the short interval of time prior to diversion allows time to consult a cloud database for the needed recycling codes for the latter items.

It will be recognized that recycling systems employing aspects of the present technology do not require a conveyor belt per se. For examples, articles can be transported past the camera system and to diverter systems otherwise, such as by rollers or by free-fall. All such alternatives are intended to be included by the term "conveyor belt."

While reference was made to processing captured imagery with an unsharp mask filter, other filters (linear or non-linear) can similarly be employed to emphasize high-frequency components of the imagery (or, similarly, to de-emphasize low-frequency components).

Although most of the detailed arrangements operate using greyscale imagery, certain performance improvements (e.g., more reliable identification of empty belt, and more reliable watermark encoding) may be achieved by the greater-dimensionality of multi-channel imagery. RGB sensors can be used. However, half of the pixels in RGB sensors are typically green-filtered (due to prevalence of the common Bayer color filter). Still better results can be achieved with sensors that output four (or more) different channels of data, such as R/G/B/ultraviolet. Or R/G/B/infrared. Or R/G/B/polarized. Or R/G/B/white.

While described in the context of plastic items, it will be recognized that many aspects of the present technology are applicable with other items, such as items made of glass or metal.

Similarly, while the technology has been described in the context of digital watermarks, it will be recognized that any other machine-readable marking can be used, such as Dot-Code and dot peen markings (although certain benefits, such as readability from different viewpoints, may be impaired). Document U.S. Pat. No. 8,727,220 teaches twenty different 2D codes that can be embossed or molded into an outer surface of a plastic container.

As noted, image blocks in some embodiments are analyzed for clues that suggest whether the blocks depict conveyor belt or not. If not, further analysis is undertaken, such as analysis of a block for a watermark reference signal. In other embodiments, blocks are initially analyzed for the presence of a watermark reference signal, and detection of such a reference signal serves as a clue. Such reference signal detection triggers further analysis, such as analysis of the block for payload data, and/or analysis of nearby blocks, or spatially-displaced blocks in subsequent image frames, for reference signals. (Typically, the type of reference signal that is detected indicates whether the associated watermark is likely of the printed or textured variety, so that a corresponding decoding algorithm can be applied.)

As noted, the two watermarks contemplated by most embodiments of the present technology differ in three respects: form, payload, and signaling protocol. For the avoidance of doubt, it should be understood that each of these attributes is distinct. Two watermarks may differ in form (printed vs. textured), yet be identical in signaling protocol and payload. Likewise, two watermarks may differ in payload, yet be identical in form and signaling protocol. Similarly, two watermarks may differ in signaling protocol, yet be identical in form and payload. (Signaling protocol encompasses all aspects of a watermark except its form and payload, e.g., including reference signal, encoding algorithm, output data format, payload length, syntax, etc.)

While reference is often made to watermark blocks that are square in shape, it will be recognized that printed or textured surfaces can likewise be tiled with watermark blocks of other shapes. For example, a hexagonal honeycomb shape may be composed of triangularly-shaped waxels.

Although the technology is described with reference to detection of a watermark synchronization (reference) signal using a direct least squares and phase deviation approach, other techniques can also be used. One example is a coiled all-pose arrangement, as detailed in WIPO patent publication WO2019/067730. Another option is to use an impulse matched filter approach, (e.g., correlating with a template comprised of peaks), as detailed in patent documents U.S. Pat. Nos. 10,242,434 and 6,590,996.

It will be recognized that processing a surface to effect a matte, or frosted, finish is a form of 3D surface shaping/texturing, albeit on a very small scale. Generally, any non-inked treatment that changes a surface's bidirectional reflectance distribution function (BDRF) is regarded as a 3D shaping/texturing operation herein.

Although the curved surfaces shown, e.g., in FIGS. 1H-1L, are sections of spheres, and/or are symmetrical in cross-section, neither is required. Sections of ellipsoids and more complex (higher order) surfaces can more generally be employed. Some such surfaces, when cross-sectioned by a plane normal to a nominal surface of the plastic item, may have non-symmetrical shapes. Indeed, some such surfaces are characterized in that they have no cross-section, normal to the nominal plastic surface, that is symmetrical.

It will be understood that the methods and algorithms detailed above can be executed using computer devices employing one or more processors, one or more memories (e.g. RAM), storage (e.g., a disk or flash memory), a user interface (which may include, e.g., a keypad, a TFT LCD or OLED display screen, touch or other gesture sensors, together with software instructions for providing a graphical user interface), interconnections between these elements (e.g., buses), and a wired or wireless interface for communicating with other devices.

The processes and system components detailed in this specification can be implemented as instructions for computing devices, including general purpose processor instructions for a variety of programmable processors, such as microprocessors and systems on a chip (e.g., the Intel Atom and i9 series, the ARM A8 and Cortex series, the Qualcomm Snapdragon, and the nVidia Tegra 4). Implementation can also employ a variety of specialized processors, such as graphics processing units (GPUs, such as are included in the nVidia Tegra series, and the Adreno 530—part of the Qualcomm Snapdragon processor), and digital signal processors (e.g., the Texas Instruments TMS320 and OMAP series devices, and the ultra-low power Qualcomm Hexagon devices, such as the QDSP6V5A), etc. These instructions can be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data can also be distributed among different processor and memory devices. Cloud computing resources can be used as well. References to "processors," "modules" or "components" should be understood to refer to functionality, rather than requiring a particular form of implementation.

Implementation can additionally, or alternatively, employ special purpose electronic circuitry that has been custom-designed and manufactured to perform some or all of the component acts, as an application specific integrated circuit (ASIC).

Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. Different tasks can be performed exclusively by one device or another, or execution can be distributed between devices. In like fashion, description of data being stored on a particular device is also exemplary; data can be stored anywhere: local device, remote device, in the cloud, distributed, etc.

Other recycling arrangements are taught in patent documents U.S. Pat. Nos. 4,644,151 5,965,858, 6,390,368, US20060070928, US20140305851, US20140365381, US20170225199, US20180056336, US20180065155, US20180349864, and US20190030571. Alternate embodiments of the present technology employ features and arrangements from these cited documents.

This specification has discussed various embodiments. It should be understood that the methods, elements and concepts detailed in connection with one embodiment can be combined with the methods, elements and concepts detailed in connection with other embodiments. While some such arrangements have been particularly described, many have not—due to the number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, applicant incorporates-by-reference each of the documents referenced herein. (Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the invention.

The invention claimed is:

1. A recycling method that includes the acts of:
capturing imagery depicting items in a material stream;
extracting first digital watermark payload data, comprising plural symbols, from imagery depicting a first item in said material stream and, based on the first digital watermark payload, determining that the first item is made with a first type of plastic;
extracting second digital watermark payload data comprising plural symbols, from imagery depicting a second item in said material stream and, based on the second digital watermark payload data, determining that the second item is made with a second type of plastic; and
sorting said first and second items from the material stream based on said determined types of plastic;
wherein the captured imagery comprises image frames, each frame comprising plural pixel blocks and each pixel block comprising plural sub-blocks, and the method further includes the acts of:
analyzing pixel blocks in image frames to detect a clue suggesting presence of watermark data in said pixel blocks, and undertaking further image analysis of pixel blocks in which a clue was detected, wherein the first digital watermark payload data is extracted as a consequence of finding a first clue, and the second digital watermark payload data is extracted as a consequence of finding a second clue; and
detection of the first clue includes (a) computing, for each of the plural sub-blocks in a pixel block, an average value of pixels in the sub-block, to thereby yield plural sub-block average values for said pixel block, and (b) determining whether a majority of said average values for the pixel block is within 1, 2, 3 or 4 digital values of a peak value of a histogram of average values for said pixel block computed from plural previous frames.

2. The method of claim 1 in which the first type of plastic is polyethylene terephthalate, and the second type of plastic is high-density polyethylene.

3. The method of claim 1 that includes extracting the first digital watermark payload data from imagery depicting a label on the first item.

4. The method of claim 1 that includes extracting the second digital watermark payload data from imagery depicting a 3D surface texture on the second item.

5. The method of claim 1 in which the first digital watermark payload data extracted from the depiction of the first item includes a fixed message portion and a variable message portion, and said variable message portion includes plural fields, wherein one of said fields is a global trade item number (GTIN) field.

6. The method of claim 1 in which the first watermark payload data includes a code identifying a plastic used in the first item, and the second digital watermark payload data includes linking data, wherein the method further includes obtaining a code identifying a plastic used in the second item from a database, through use of said linking data.

7. The method of claim 1 in which the first clue comprises an output from a classifier indicating that a pixel block likely depicts a plastic item.

8. The method of claim 1 in which the first clue comprises an output from a classifier indicating that a pixel block likely does not depict a conveyor belt.

9. The method of claim 1 in which the material stream is moved by a conveyor belt past a camera, wherein items on the conveyor belt enter a camera frame field of view along a first edge of the camera frame, and the method includes analyzing plural overlapping blocks spanning said first edge of the camera frame for clues indicating possible presence of watermark data, and undertaking further image analysis, including searching for a digital watermark orientation signal, after a clue is found.

10. The method of claim 1 in which the first digital watermark is a watermark encoded according to a signaling protocol that represents payload data using a tile of 128×128 elements, and in which the second digital watermark is a watermark encoded according to a second, different, signaling protocol, which represents payload data using a tile of N×N elements, where N<128.

11. The method of claim 1 that includes:
assessing first and second pixel patches in the captured imagery to determine whether said patches likely depict a conveyor belt;
watermark-processing the first pixel patch as a consequence of said assessing determining the first pixel patch likely does-not depict the conveyor belt; and
not watermark-processing the second pixel patch as a consequence of said assessing determining that the second pixel patch likely does depict the conveyor belt;
wherein the first digital watermark is extracted from imagery comprising the first pixel patch.

12. The method of claim 1 that includes illuminating a first region of the material stream with a first illumination source, and illuminating a second region of the material stream with a second illumination source of a type different than the first illumination source, wherein the first digital watermark is extracted from depiction of the first item captured when illuminated by the first illumination source, and the second digital watermark is extracted from depiction of the second item captured when illuminated by the second illumination source.

13. The method of claim 1 in which extracting the first digital watermark payload includes:
determining first affine parameters characterizing pose of the first item as depicted in the first imagery by an iterative process started with a first initial set of affine parameters, and thereafter employing said determined first affine parameters in extracting the first digital watermark payload data; and
determining second affine parameters characterizing pose of the second item as depicted in the second imagery by an iterative process started with a second initial set of affine parameters different than said first initial set, and thereafter employing said determined second affine parameters in extracting the second digital watermark payload data.

14. The method of claim 1 in which the material stream is moved by a conveyor belt at a speed, and the captured imagery comprises an image sequence captured at a frame rate, the sequence including first, second and third frames, the method includes the acts:
- analyzing plural image blocks in the first frame for a watermark clue;
- detecting a watermark clue in a first image block of the first frame; and
- identifying, in the second frame, one or more second image blocks for analysis based on said conveyor belt speed and said frame rate.

15. The method of claim 1 in which the first digital watermark includes a first reference signal and the second digital watermark includes a second reference signal, wherein the first reference signal has a correlation $0.2>r>-0.2$, when confusion-tested with the second reference signal over a full range of affine transformations, namely with scales of the first reference signal ranging between 0.5 and 2.0 in increments of 0.02, and with rotations of the first reference signal ranging between
- −90 degrees through +90 degrees in increments of 1 degree, and with translations of the first reference signal ranging across every pixel of possible relative translation.

16. The method of claim 1 in which one of said digital watermarks comprises a traveling salesman line path that visits a hundred or more points, once only, and changes direction at a majority of said points.

17. The method of claim 1 in which in which one of said digital watermarks comprises a pattern of multiple curved segments, plural of which are compound-curved with multiple turns along their length, in which some segments cross others, while other segments do not cross others.

18. The method of claim 1 in which each of said first and second items is marked with two different types of watermarks, namely (a) a first type of watermark printed on either the item or on a label applied to the item, said first type of watermark employing a first signaling protocol, and (b) a second type of watermark formed as a 3D texture in the surface of the item, said second type of watermark employing a second signaling protocol different than the first signaling protocol;
- wherein the method includes applying first and second different watermark reading algorithms to the captured imagery, the first watermark reading algorithm being adapted to read watermarks employing the first signaling protocol, and the second watermark reading algorithm being adapted to read watermarks employing the second signaling protocol;
- wherein the method can sort the first and second items from the material stream based on either the first or second types of watermarks that mark said items, by payload data extracted by said respective first or second watermark reading algorithms.

\* \* \* \* \*

UNITED STATES PATENT AND TRADEMARK OFFICE
CERTIFICATE OF CORRECTION

PATENT NO. : 12,348,840 B2  
APPLICATION NO. : 18/635783  
DATED : July 1, 2025  
INVENTOR(S) : Sharma et al.

Page 1 of 1

It is certified that error appears in the above-identified patent and that said Letters Patent is hereby corrected as shown below:

In the Claims

Column 52, Line 3, "claim 1 in which in which one of" should read --claim 1 in which one of--.

Signed and Sealed this  
Eleventh Day of November, 2025

John A. Squires  
*Director of the United States Patent and Trademark Office*